US008912001B2

United States Patent
Rajchel et al.

(10) Patent No.: US 8,912,001 B2
(45) Date of Patent: Dec. 16, 2014

(54) PROCESS FOR HIGH CONCENTRATION CATION EXCHANGES METATHESIS

(75) Inventors: Marcus Rajchel, Arvada, CO (US); Michael F. Ray, Spring Branch, TX (US)

(73) Assignee: Cyanco Holding Corporation, Reno, NV (US)

( * ) Notice: Subject to any disclaimer, the term of this patent is extended or adjusted under 35 U.S.C. 154(b) by 42 days.

(21) Appl. No.: 13/084,746

(22) Filed: Apr. 12, 2011

(65) Prior Publication Data
US 2011/0250696 A1 Oct. 13, 2011

Related U.S. Application Data

(60) Provisional application No. 61/323,096, filed on Apr. 12, 2010.

(51) Int. Cl.
*G01N 33/44* (2006.01)
*G01C 3/10* (2006.01)
*C01F 11/24* (2006.01)
*B01J 39/04* (2006.01)
*B01J 49/00* (2006.01)

(52) U.S. Cl.
CPC . *G01C 3/10* (2013.01); *C01F 11/24* (2013.01); *B01J 39/043* (2013.01); *B01J 49/0008* (2013.01)
USPC .............................. 436/85; 210/681; 210/683

(58) Field of Classification Search
USPC .............. 436/85; 423/371, 379; 210/681, 683
See application file for complete search history.

(56) References Cited

U.S. PATENT DOCUMENTS

| | | | |
|---|---|---|---|
| 4,321,145 A * | 3/1982 | Carlson ......................... | 210/678 |
| 4,836,937 A | 6/1989 | Homer | |
| 4,837,315 A | 6/1989 | Kulprathipanja | |
| 4,950,332 A | 8/1990 | Stringfield et al. | |
| 2002/0044905 A1 * | 4/2002 | Ray et al. ...................... | 423/379 |
| 2004/0204509 A1 * | 10/2004 | Bollinger et al. ............... | 521/25 |
| 2011/0030967 A1 * | 2/2011 | McGuire ....................... | 166/369 |

OTHER PUBLICATIONS

Ion Exchange and Inorganic Adsorption, Water Quality and Treatment—A Handbook of Community Water Supplies. 1999 Dennis A. Clifford.*
Dowex Ion Exachange Resins, Fundamentals of Ion Exchange, Jun. 2000.*
Dowex Marathon C Ion Exchange Resin, May 2002.*
Perry et al., (Perry's Chemical Engineering Handbook.' McGraw-Hill Professional; 8th edition (Dec. 1, 2007) (online) (downloaded from the Internet Aug. 7, 2011) URL: <http://www.ebah.com.br/content/ABAAAASywAD/perrys-chemical-engeneers-handbook>.

* cited by examiner

*Primary Examiner* — Krishnan S Menon
*Assistant Examiner* — Dwan A Gerido
(74) *Attorney, Agent, or Firm* — Kirton McConkie; Evan R. Witt

(57) ABSTRACT

Provided is a method for high concentration cation exchange metathesis of divalent ions such as calcium with univalent ions such as sodium or potassium. Due to the difference between ionic valences between the exchanged ions, the provided process behavior is strongly dependent upon the selection of resin properties and to total solution normality. A combination of resin properties and solution normality is provided to achieve the cation exchange.

31 Claims, 12 Drawing Sheets

PROCESS FOR HIGH CONCENTRATION CATION EXCHANGES METATHESIS

CROSS-REFERENCE TO RELATED APPLICATIONS

This application claims priority to U.S. provisional patent application Ser. No. 61/323,096 filed on Apr. 12, 2010 which is hereby incorporated by reference.

BACKGROUND OF THE INVENTION

There are many ion exchange ("IX") metathesis processes used commercially. Current commercial processes exchange univalent ions with other univalent ions or divalent ions with other divalent ions to generate their metathesis products. None of these processes are useful for high concentration cation exchange of univalent ions with divalent ions to produce both high concentration univalent and divalent salt products.

In typical water softening applications, where hardness minerals are removed from aqueous streams using cation exchange media, regeneration, typically using sodium chloride or hydrochloric acid, uses relatively large stoichiometric excesses of the regenerating ions. For example, sodium chloride regeneration is often applied at 2.5 times the resin active capacity. The cost of the excess required reagent NaCl is typically not recovered and results in an effluent stream from the IX regeneration process that typically consists of a non-useful mixture of univalent and divalent counter ions (e.g., $Na^+$ and $Ca^{++}$). The spent regenerating solution is typically of no value and must be disposed of at some additional cost. The typical regeneration effluent normally leaves the process at relatively lower concentrations and naturally translates to large volumes of waste brine that further serves to increase operating costs.

Other commercial ion exchange metathesis processes exchange univalent ions, such as $Na^+$, $H^+$, and $K^+$, making the requirements for resin selection and operating conditions for such processes less demanding. These processes include: the Mono-Potassium Phosphate process ($H^+$ exchange with $K^+$ to give $KH_2PO_4$), the Vicksburg Chemical "K-Garb" Process ($NH_4^+$ with $K^+$ to give $K_2CO_3$), the Nalco Silicic Acid Production ($Na^+$ with $H^+$ to give $H_2SiO_3$), and the Potassium Nitrate/HCl Production Process (exchanging $H^+$ with $K^+$ to give $KNO_3$).

Other IX metathesis processes, such as described in U.S. Pat. No. 6,649,136 have been proposed for commercial preparation of a sodium cyanide product from a calcium cyanide feed along with a high purity calcium chloride product from the sodium chloride regeneration process. This and allied processes require a process design and operating methodology that allows both high concentration and high purity for each IX effluent (product) stream. The current invention provides a means of selecting the optimum resin and operating requirements for the metathetical exchange of univalent and divalent ionic species.

SUMMARY OF THE INVENTION

Provided is a method for high concentration cation exchange metathesis of divalent ions such as calcium with univalent ions such as sodium or potassium. Due to the difference between ionic valences between the exchanged ions, the provided process behavior is strongly dependent upon the physical and chemical properties of the resin and to total solution normality. A combination of resin properties selection and solution normality control are provided to achieve high product concentration and purity from the process. Control of these conditions is important in the method to control the separation coefficient, $K'$, for the resin-solute system and maximize ion exchange reaction rates (kinetics) in order to make the system technically practical.

The method of this invention significantly and separately improves the achievable purity and concentration of each of the two products (sodium cyanide salt and calcium chloride, for example) from the process.

It has been discovered that resin thermodynamics and operating requirements should be controlled for the exchange of univalent ions with divalent ions to produce two high concentration, high purity products. The discovery uncovers distinct opportunities not afforded in univalent-only exchange. They include the ability to achieve high purity and high product concentration in both IX products. The choice of cation exchange, however, brings with it stringent requirements on resin selection and operating conditions in order to take advantage of the benefits.

Fundamental differences in properties between typical polymeric anion and cation exchange resins lead to higher achievable product concentrations when using cation exchangers. Another key development of this invention is the method of resin evaluation and its application to process design.

In an embodiment, provided is a method of cation exchange comprising: contacting a divalent cation-feed solution with a strong acid cation ion exchange resin having a crosslinking of between 4 and 15% divinylbenzene (DVB) that has been loaded with a univalent charged counter ion, wherein the divalent cation-feed solution has a concentration and resin activity such that the separation coefficient, $K'$, is greater than 1.0, where $K'$ is defined by the ion exchange reaction of divalent ion with univalent-loaded ion exchange media; exchanging the divalent cation with the univalent charged counter ion on the resin to produce a univalent counter ion-product solution and a divalent cation loaded resin; advancing the resin counter currently with respect to solution flow through a rinse zone wherein unreacted feed solution is recovered; advancing the resin to a regeneration zone where the divalent cation loaded resin is contacted with a solution having a univalent exchangeable cation, said solution having a univalent exchangeable cation having a concentration and resin activity such that the separation coefficient, $K'$, is minimized, where $K'$ is defined by the ion exchange reaction of divalent ion with univalent-loaded ion exchange media; and exchanging the divalent cation on the divalent cation loaded resin with the univalent exchangeable cation, producing a resin loaded with the univalent cation and a divalent cation solution.

More specifically, in an embodiment, provided is a method of cation exchange comprising: contacting a divalent cation-feed solution having a concentration of between >0 eq/L and 6.5 gram-equivalents per liter (eq/L) with a strong acid cation ion exchange resin having a crosslinking of between 4 and 15% divinylbenzene (DVB) that has been loaded with a univalent charged counter ion; exchanging the divalent cation with the univalent charged counter ion on the resin to produce a univalent counter ion-product solution and a divalent cation loaded resin; advancing the resin counter currently with respect to solution flow through a rinse zone wherein unreacted feed solution is recovered; advancing the resin to a regeneration zone where the divalent cation loaded resin is contacted with a solution having a univalent exchangeable cation, said solution having a univalent exchangeable cation having a concentration of preferably between 5.0 and 6.5 eq/L or saturation; exchanging the divalent cation on the divalent cation loaded resin with the univalent exchangeable cation, producing a resin loaded with the univalent cation and a divalent cation solution.

As is further discussed below, the concentration of the solution having a univalent exchangeable cation used in the process is determined in an embodiment, by the desired K' value and other variables. In an embodiment, the concentration of the solution having a univalent exchangeable cation is above 5.0 eq/L. In an embodiment, the concentration of the solution having a univalent exchangeable cation is above 5.5 eq/L. In an embodiment, the concentration of the solution having a univalent exchangeable cation is above 6.0 eq/L. As is known in the art, the values provided have some error associated based on measuring errors and other parameters. Therefore, unless otherwise indicated, values within ±10% are considered to be equivalent and are included in the processes described herein.

In an embodiment, the strong acid cation ion exchange resin has been loaded to 100% of the resin capacity with the univalent charged counter ion. In an embodiment, the strong acid cation ion exchange resin has been loaded to greater than 98% of the resin capacity with the univalent charged counter ion. In an embodiment, the strong acid cation ion exchange resin has been loaded to greater than 90% of the resin capacity with the univalent charged counter ion. In an embodiment, the strong acid cation ion exchange resin has been loaded to greater than 95% of the resin capacity with the univalent charged counter ion. In an embodiment, before the last exchanging step, the divalent cation loaded resin is loaded to its full capacity in the divalent-ion form. Resin that is loaded to less than 100% capacity is useful, although the impact on product purity will, at maximum match the impurity level of the resin feeding the process.

In an embodiment, before the last exchanging step, the univalent-loaded ion exchange resin has a composition that matches the composition required by the desired ion exchange metathesis univalent counter-ion product solution composition. In an embodiment, the value of K' in univalent ion loading onto divalent-form resin is less than or equal to 1.0, but greater than 0.85. In an embodiment, the value of K' in univalent ion loading onto divalent-form resin is greater than 1.0, but less than 1.2. In an embodiment, the resin activity has a value that is within 20 percent of the calculated ideal value. In an embodiment, before the last exchanging step, the divalent cation loaded resin is at least 99% divalent-ion form. In an embodiment, before the last exchanging step, the divalent cation loaded resin has a composition that matches the composition required by the desired ion exchange metathesis divalent cation solution composition. In an embodiment, before the last exchanging step, the divalent cation loaded resin is at least 90% divalent-ion form. In an embodiment, the molar capacity of the resin is matched to the molar concentration of the solution having a univalent exchangeable cation.

In an embodiment, the molar capacity of the resin is matched to the molar concentration of the solution having a univalent exchangeable ion such that the separation coefficient, K', is greater than 1.0, where K' is defined by the ion exchange reaction of divalent ion with univalent-loaded ion exchange media, using a strong acid cation ion exchange resin. This relationship is described in further detail elsewhere herein. In an embodiment, in consistent units, the resin capacity Q, resin bulk density pr, resin mass action equilibrium constant K for the ion exchange equilibrium defined by absorption of the divalent ion on univalent-form ion exchange media; and the total normality $C_0$ of all cations in the divalent cation feed solution are given by:

$$K' = K \frac{Q\rho_r}{C_0} \quad \text{(Eq. 1)}$$

where K' is:

$$K' = \frac{\left(1 - \frac{C_{Ca}}{C_0}\right)^2 \left(\frac{q_{Ca}}{Q}\right)}{\left(\frac{C_{Ca}}{C_0}\right)\left(1 - \frac{q_{Ca}}{Q}\right)^2} \quad \text{(Eq. 2)}$$

wherein $C_{Ca}$ is the normality of the divalent cation in the divalent cation feed solution and $q_{Ca}$ is the concentration of divalent species in the resin phase.

In an embodiment, K' is controlled to be greater than or equal to 1.0 when exchanging divalent ions onto the resin and K' is controlled to be less than or equal to 1.0 when exchanging univalent ions onto the resin. In an embodiment, K' is minimized when exchanging univalent ions onto divalent-loaded resin by maximizing the concentration of the univalent ions in the feed solution. In an embodiment, K' is minimized when the total normality, $C_0$, of the univalent feed solution is limited by the maximum achievable concentration of the univalent ion feed solution. The control of this relationship is described elsewhere herein.

In an embodiment, the resin activity ($A_r = Q\rho_r$) is provided by:

$$Q = \frac{K'C_0}{K\rho_r} (\text{eq}/\text{kg}), \text{ or equivalently,} \quad \text{(Eq. 3)}$$

$$A_r = \frac{K'C_0}{K} (\text{eq}/\text{L}) \quad \text{(Eq. 4)}$$

where K' is set to unity and K and $\rho_r$ are known, and $C_0$ is set by the desired feed conditions. In an embodiment, the resin has a separation coefficient K'=1.

In an embodiment, the resin has a shrinkage, when placed in brine, that is not greater than 8% as compared to placement in rinse water in the rinse zone and after the regeneration zone. In an embodiment, the resin activity is less than 2.4 equivalents per unit volume. In an embodiment, the resin activity matches the concentration of the solution having a univalent exchangeable cation.

In an embodiment, the divalent cation feed solution is a cyanide solution where the concentration of the cyanide solution is 4-6.5 equivalents per liter solution.

As described elsewhere herein, the properties of the resin are useful in controlling the process. In an embodiment, the resin is sulfonated polystyrene and has a divinylbenzene crosslinking of between 10 and 14%. In an embodiment, the resin is a gel resin. In an embodiment, the resin has a divinylbenzene crosslinking of between 8 and 12% and a volume change of 6-8% as compared after the rinse zone and after the regeneration zone. In an embodiment, the resin has a divinylbenzene crosslinking of 12%±4%. In an embodiment, the resin is contained in a fixed volume column and the resin has a divinylbenzene crosslinking greater than 10%. In an embodiment, the resin is contained in a variable volume resin vessels that contracts the contained resin volume upon shrinkage of the resin, and expands the contained resin volume upon swelling of the resin. In an embodiment, the resin is selected from the group consisting of: Dowex Marathon C; Lewattit MonoPlus S100; Purolite PFC 100; Rohm & Haas Amberjet 1200; Dowex 650C; Dowex C-350; and Rohm & Haas Amberjet 4400. It is recognized to one of ordinary skill in the art that other resins that are not specifically named have similar properties and can be substituted for the named resins. These other resins are intended to be included in the description and invention to the same extent as if they were specifically named.

In an embodiment, the average bead diameter of the resin is less than 1200 microns. In an embodiment, the average bead diameter of the resin is less than 750 microns. In an embodiment, the average bead diameter of the resin is less than 650 microns. In an embodiment, the average bead diameter of the resin is 325+/−25 microns.

As described in further detail elsewhere herein, the properties of the feed solution and regeneration solution are important in providing the required control over the separation coefficient. In an embodiment, the divalent cation feed solution is saturated or nearly saturated. In an embodiment, the solution having a univalent exchangeable cation is sodium chloride. In an embodiment, the feed solution is heated to between 25 degrees C. and 120 degrees C. In an embodiment, the divalent cation in the divalent cation feed solution is calcium. In an embodiment, the univalent exchangeable cation in the solution having a univalent exchangeable cation is selected from sodium or potassium.

Also provided is a method of resin evaluation, comprising:
(a) loading a known volume of water-washed resin with a known activity into a test column;
(b) passing a solution with known concentration of the ion to be exchanged over the resin for an initial period of time;
(c) repeating steps (a) and (b) for a different period of time than the initial period of time;
(d) calculating the resin conversion X;
(e) calculating the tau value using the equations:

$$t = \tau_{Na}\left(1 - 3(1-X)^{\frac{2}{3}} + 2(1-X)\right) \quad \text{(Eq. 13)}$$

where:

$$\tau_{Na} = \frac{K_d}{C_{Na}} = \frac{\rho_{Ca} R^2}{6 b D_e C_{Na}} \quad \text{(Eq. 14)}$$

where, in consistent units, t is the time it takes to achieve a given resin conversion X, in minutes; $\rho_{Ca}$ is the molar density of the divalent ion loaded resin in meq/mL; R is the resin particle radius; $D_e$ is the interparticle diffusion coefficient; and $C_{Na}$ is the concentration of the univalent counter ion in the divalent cation feed solution. In an embodiment, wherein the bulk resin activity for the selected resin is as close to 2.0 eq/L as possible where the solution having a univalent exchangeable cation is saturated NaCl.

DETAILED DESCRIPTION OF THE INVENTION

Figure 1:
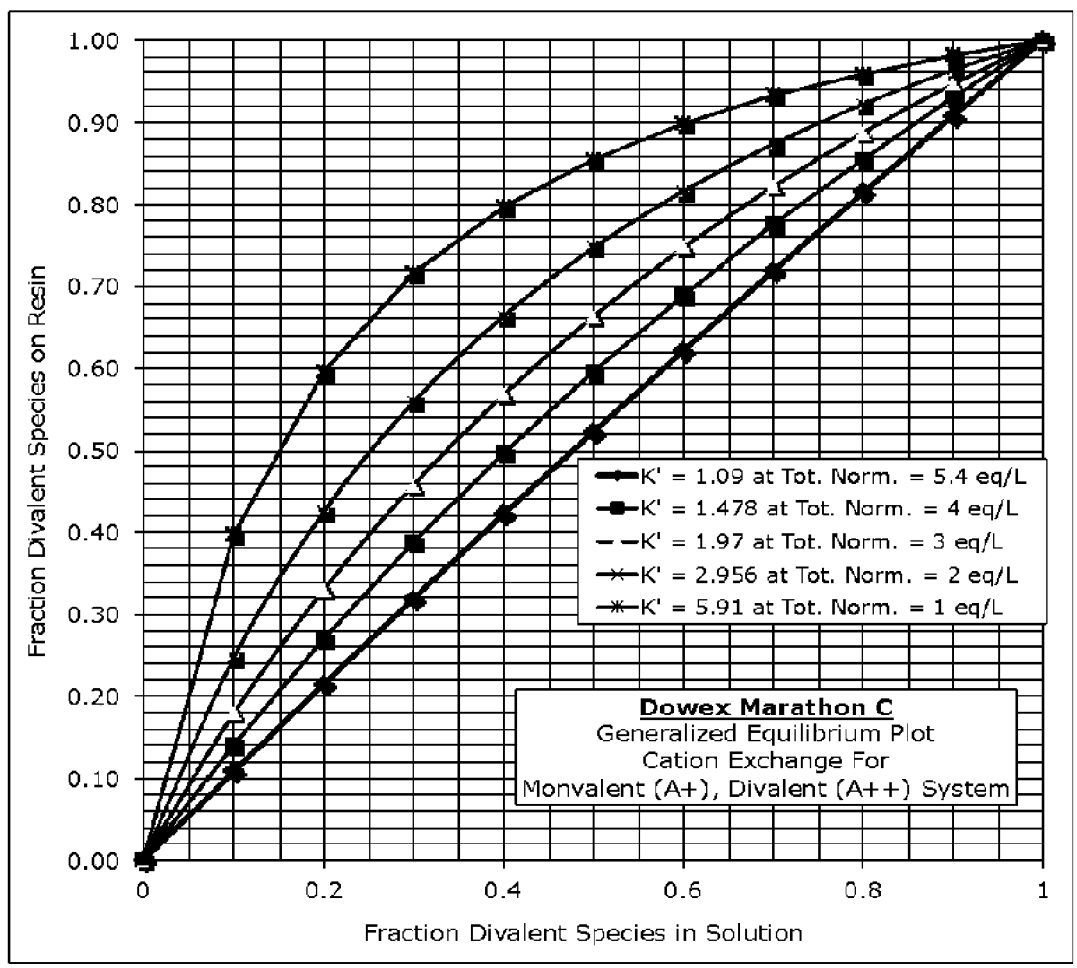
FIG. 1 shows equilibrium properties computed by Eq. 1 and 2, using the properties for Dowex Marathon-C resin at several different cationic brine total normality.

The following discussion refers to a non-limiting example of high concentration univalent-divalent cation exchange as described herein. The process is described in detail using calcium cyanide and sodium chloride feed solutions to produce sodium cyanide and calcium chloride products. This example and the chemicals and conditions used are not intended to be limiting. The process described here can be easily applied to other ion exchange metathesis and water treatment processes as will be evident to those of ordinary skill in the art using other chemical feed solutions and resins, for example. All these additional embodiments are intended to be included to the same extent as if they were specifically included.

In the following discussion, calcium cyanide solution is a divalent cation feed solution to the described IX metathesis process where calcium ions are exchanged for sodium ions to produce an aqueous NaCN product solution. Regeneration of the ion exchange resin with sodium chloride produces a calcium chloride co-product solution. The two operations are separated by counter-current rinse zones that effectively separate the two ion exchange zones from cross contamination.

The ion exchange metathesis chemistry below:

$$Ca(CN)_2 + 2NaCl \rightarrow CaCl_2 + 2NaCN \quad \text{Reaction (1.0)}$$

will occur on any cation exchanger and can be summarized in Reactions 1.1 and 1.2 below:

$$Ca(CN)_2 + 2R\text{---}Na \leftrightarrow 2NaCN + R_2\text{---}Ca \quad \text{Reaction (1.1)}$$

$$2NaCl + R_2\text{---}Ca \leftrightarrow CaCl_2 + 2R\text{---}Na \quad \text{Reaction (1.2)}$$

The same metathesis will occur on any anion exchanger, summarized by:

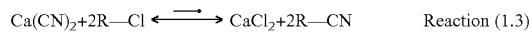
$$Ca(CN)_2 + 2R\text{---}Cl \leftrightarrow CaCl_2 + 2R\text{---}CN \quad \text{Reaction (1.3)}$$

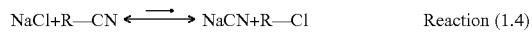
$$NaCl + R\text{---}CN \leftrightarrow NaCN + R\text{---}Cl \quad \text{Reaction (1.4)}$$

where, for example "R—Na" represents the immobile resin-counter-ion complex and the others compounds are dissociated aqueous ionic species. In Reaction (1.1), the counter-ion to $Na^+$ is $Ca^{++}$ and the co-ion is $CN^-$. The reactions are driven to the right by the advancing resin counter-currently to solution flow. Though the chemistry is valid for either the Anion Process or the Cation Process, the Cation Process is favored since cation resins are capable of exhibiting: (1) higher volumetric capacity, leading to higher product solution concentrations, (2) smaller shrink-swell cycle, leading to higher product purity as a result of reduced axial dispersion and channeling, and (3) greater durability particularly regarding resistance to resin functional group oxidation, (4) a means of manipulating the separation coefficient through combination of operating parameters in order to achieve both high concentrations and high purities in each of the ion exchange products.

It is known to one of ordinary skill in the art that the cations and anions listed and described can be replaced with other cations and anions having the same charge. Thus for example, potassium can be used where sodium is described and magnesium ions can be substituted for calcium. Other replacements can be made and are intended to be included in the description and invention.

Further it is known to one of ordinary skill that one of the two IX loading zones may be operated using concentrated solutions while the other is operated using dilute solutions. For example in the case of treating a dilute stream of divalent ions such as calcium (for example, 100 ppm $Ca^{++}$) wherein a useful divalent product, such as the fertilizer calcium nitrate were desired, the process of this invention can be applied for the univalent ion exchange with bivalent ions by first absorbing calcium onto a sodium-form resin to produce a soft-water product and alternately regenerating the resin with a sodium nitrate solution by the method of this invention, where resin properties and univalent solution concentration are chosen to operate at the "ideal" or "near-ideal" value of K' as computed by Eq. 3 or Eq. 4, to produce a highly concentrated calcium nitrate fertilizer product. By the same method, using the same process equipment, an additional product, for example concentrated calcium chloride solution can be produced by switching the regenerant feed from concentrated sodium nitrate to concentrated sodium chloride. In either of case of this example, the univalent product would be softened water.

In an embodiment, the process is carried out using a counter-current ion exchange (CCIX) apparatus, of which many different designs exist. Examples of such equipment are the Puritech Ionex technology or the Calgon ISEP technology. The preferred process utilizes resin rinse zones, but can be operated in a "true" simulated moving bed configuration that includes only two influent and two effluent streams (two feed streams and two product streams) and without intermediate rinse zones between the two IX loading zones. These modifications are known to one of ordinary skill in the art without undue experimentation.

More specifically, in a particular embodiment, provided is a method of cation exchange comprising: contacting a divalent cation-feed solution having a concentration of between >0 eq/L and 6.5 gram-equivalents per liter (eq/L), and at a concentration that maintains the separation coefficient, K', greater than 1.0, with a strong acid cation ion exchange resin preferably having a crosslinking of 12%±3% divinylbenzene (DVB) that has been loaded to completion (preferably 100%, but greater than 98% of the resin's capacity) with a univalent charged counter ion; exchanging the divalent cation with the univalent charged counter ion on the resin to produce a univalent counter ion-product solution; at the point of addition of the solution of divalent cations, the resin phase will have been substantially (preferably 100%, but greater than 99% of the resin's capacity) to the divalent-ion form; advancing the resin counter currently with respect to solution flow through a rinse zone wherein unreacted feed counter ion solution is recovered; advancing the resin to a regeneration zone where the divalent cation loaded resin is contacted with a solution having a univalent exchangeable cation, said solution having a concentration of preferably between 5.0 eq/L and saturation, and preferably at a concentration that minimizes the separation coefficient; exchanging the divalent cation on the resin with the univalent exchangeable cation, producing a resin loaded with the univalent cation and a divalent cation solution. In the case that the resin does not achieve full, 100% conversion to either the univalent or divalent form, the maximum product purity when eluting from the impure is diminished by as much as the degree of impurity; for processes that require lesser purity, the requirement for 100% conversion to either univalent or divalent form can be relaxed to match the requirement of the product. For example a resin that has composition that is 98% univalent-form and 2% divalent form can be expected to yield a concentrated univalent product that is at least a 98% pure.

In the countercurrent process, prior to entering either ion exchange loading zone, the uni- or divalent loaded resin has been immersed and saturated in fresh water. To avoid dilution of product solutions with this entrained rinse water, a single displacement volume of ion exchange product solution is used to displace and reject the water from the resin prior to entry. In an embodiment, the system utilizes one or two stages of "Entrainment Rejection" ("ER") to replace both resin bead-contained fresh water as well as entrained bed interstitial fresh water with concentrated brine. The ER process requires only a single stage, but an incremental product concentration benefit is derived from additional residence time by including a second stage.

Resin leaving either loading zone is rinsed with fresh water to recover unreacted feed solution and to remove feed solutes prior to advancing the resin to the opposite loading zone. This invention utilizes in an embodiment three series-connected columns or in an embodiment, four series-connected columns to allow for very low countercurrent rinse rates which both displaces feed solution entrained in the resin interstitial void space and allows sufficient residence time for resin sorbed solutes to diffuse into the rinse water. The recovered rinse solutions consist of substantially pure feed, diluted only to the extent required to maintain solute travel with the solution phase, collected separately and recycled to prepare new process feed solutions.

In an embodiment, Strong Acid Cation (SAC) Gel-Type resins are used and provide useful ion exchange media. Strong Acid Cation Exchangers with a relatively high degree of cross-linking (12%+/−2% DVB, for example) exhibit similar shrink-swell volume cycles for both the sodium and calcium forms. Weak acid cation exchangers do not perform well in these processes due to large shrink/swell cycle between loaded and washed forms of resin.

SAC resins that have overly high cross linking (e.g., above 15% DVB) exhibit very low water retention in the beads, leading to low kinetic rates at the high solution concentrations of this invention. SAC resins with low cross linking (e.g. <4% DVB) exhibit a large shrink-swell cycle between concentrated solution loading and rinsing, limiting their utility in the process as a result of back-mixing in the freeboard created above the resin from contraction of the bed in highly concentrated solutions. In separate embodiments, SAC resins having crosslinking of greater than 4% and equal to or less than 15% DVB are used. SAC's with too high activity (e.g., >2.4 equivalents per liter of exchange capacity) exhibit electroselectivity that is too high toward the divalent ions to be ideal in this process and are not preferred.

Optimized Equilibrium Properties of Resin

An element that is useful to make the process practical, namely to provide products with high purity and high concentration is manipulation of conditions such that a resin with a capacity of Q (eq/kg), and having a density of $\rho_r$ (kg/L), and a mass action equilibrium constant (also referred to as the molar selectivity coefficient) of K, is matched to the total normality ($C_0$, eq/L) of the solution according to Eq. 1 and Eq. 2 below:

$$K' = K \frac{Q\rho_r}{C_0} \quad \text{(Eq. 1)}$$

where K' is defined by:

$$K' = \frac{\left(1 - \frac{C_{Ca}}{C_0}\right)^2 \left(\frac{q_{Ca}}{Q}\right)}{\left(\frac{C_{Ca}}{C_0}\right)\left(1 - \frac{q_{Ca}}{Q}\right)^2} \quad \text{(Eq. 2)}$$

where $C_{Ca}$ is the concentration of divalent cations in solution and $q_{Ca}$ is the concentration of divalent cations on the resin and the total normality, $C_0$, in Eq. 1 is set such that K'≥1.0 when exchanging divalent ions onto the resin and K'≤1.0 when exchanging univalent ions onto the resin.

Though the ion exchange process chemistry will function over a wide range of resin composition, preferred performance is achieved in this invention with the ideal resin activity ($A_r=Q\rho_r$) in gram-equivalents-per-liter of bulk resin volume and is determined according to the relationship in Eq. 3 below:

$$Q = \frac{K'C_0}{K\rho_r} \text{(eq/kg), or equivalently,} \quad \text{(Eq. 3)}$$

$$A_r = \frac{K'C_0}{K} \text{(eq/L)} \quad \text{(Eq. 4)}$$

where K' is set to unity and K is known, and $C_0$ is set by the desired concentration of the feed solution.

Optimized Equilibrium Properties—Resin Activity

Resin for this process is chosen such that the activity of the resin (e.g., equiv-per-liter of exchange capacity of the bulk resin) matches the concentration of the univalent exchangeable ions in solution. The following discussion explains this discovery.

Countercurrent operations rely on phases moving in opposite directions that are continuously tending toward equilibrium. Since this is a continuous counter current ion exchange process that operates with highly concentrated ionic solutions in both exchange operations (in this example, producing NaCN and $CaCl_2$ products), the ideal resin will be one that allows control over the absorption equilibrium properties for exchange of either univalent ions onto divalent-loaded resin and divalent ions onto univalent-loaded resin. In a preferred embodiment, the absorption equilibrium can be controlled such that in either absorption process, the resin shows no preference for either the univalent ion (for example, sodium) or the divalent ion (for example, calcium). Cation resin thermodynamic properties affect the separation coefficient, K', also referred to as the separation factor, defined in Eq. 1 and 2, which are derived from the thermodynamic mass action equilibrium coefficient, K, which for sulfonated polystyrene ion exchange resins falls in the range of K=2.6-3.0. A specific example that is used for reference in the balance of discussion of this invention, using the exchange of divalent calcium solutes for resin absorbed sodium, defines K' for this invention:

$$K = \frac{[Na^+]^2[R_2Ca]}{[Ca^{+2}][RNa]^2} = 2.6 \text{ to } 3.0 \quad \text{Eq. 5}$$

which can be expressed as:

$$K = \frac{C_0\left(1 - \frac{C_{Ca}}{C_0}\right)^2\left(\frac{q_{Ca}}{Q}\right)}{Q\rho_{Ca}\left(\frac{C_{Ca}}{C_0}\right)\left(1 - \frac{q_{Ca}}{Q}\right)^2} \quad \text{Eq. 6}$$

which can be expressed in terms to define the separation coefficient, K':

$$K' = \frac{\left(1 - \frac{C_{Ca}}{C_0}\right)^2\left(\frac{q_{Ca}}{Q}\right)}{\left(\frac{C_{Ca}}{C_0}\right)\left(1 - \frac{q_{Ca}}{Q}\right)^2} \quad \text{Eq. 7}$$

where, $$K' = K\frac{Q\rho_{Ca}}{C_0} \quad \text{Eq. 8}$$

where, in consistent units, for example: $C_{Ca}$ is the concentration of $Ca^{++}$, and $C_0$ is the total concentration of all ionic species (eq/L), $q_{Ca}$ is concentration of active sites occupied by $Ca^{++}$ ions and Q is the total capacity of the resin in eq/kg, and resin dry Ca-form bulk density of $\rho_{Ca}$ in kg/L. By inspection, the value of K' depends upon both solution and resin properties. In practice, the value of $C_0$ is used as the concentration of the feed solution, $Ca(CN)_2$ in eq/L. A separate similar relationship with inverse properties in all aspects can be derived for exchange of sodium ions onto calcium-form resin. To avoid confusion, the balance of the discussion of resin properties and equilibrium will refer to the stoichiometry of Reaction 1.1, the equilibrium constant K defined in Eq. 5, and K' from Eq. 7 and 8.

To explore the effect of operating conditions on the ion exchange process, the expressions need to be evaluated for specific conditions. The separation factor decreases with increasing total solution normality. In the countercurrent ion exchange metathesis process, to provide highest product purity, the ideal resin can provide a separation coefficient, K'≥1.0 in Reaction 1.1 and K'≤1.0 in Reaction 1.2. The process of the invention is also optimized for either absorption process whenever conditions are controlled to provide a separation coefficient of K'=1.0, indicating no absorption preference for either ion.

If, for example, K' were 2.0, absorption of $Ca^{++}$ would be preferred. A high conversion of R—Na to $R_2$—Ca would be preferred and high purity NaCN product would be easily achievable. The reverse however, high conversion of $R_2$—Ca to R—Na, would not be achievable at K'=2.0, because eluted $Ca^{++}$ would tend to re-load onto the resin, and thus lead to cross-contamination with the univalent sodium ions in the product even in counter-current operation. The remedy for achieving pure calcium or divalent salt products is through manipulation of K' with proper selection of resin and sodium or other univalent eluent salt concentration.

Figure 10:
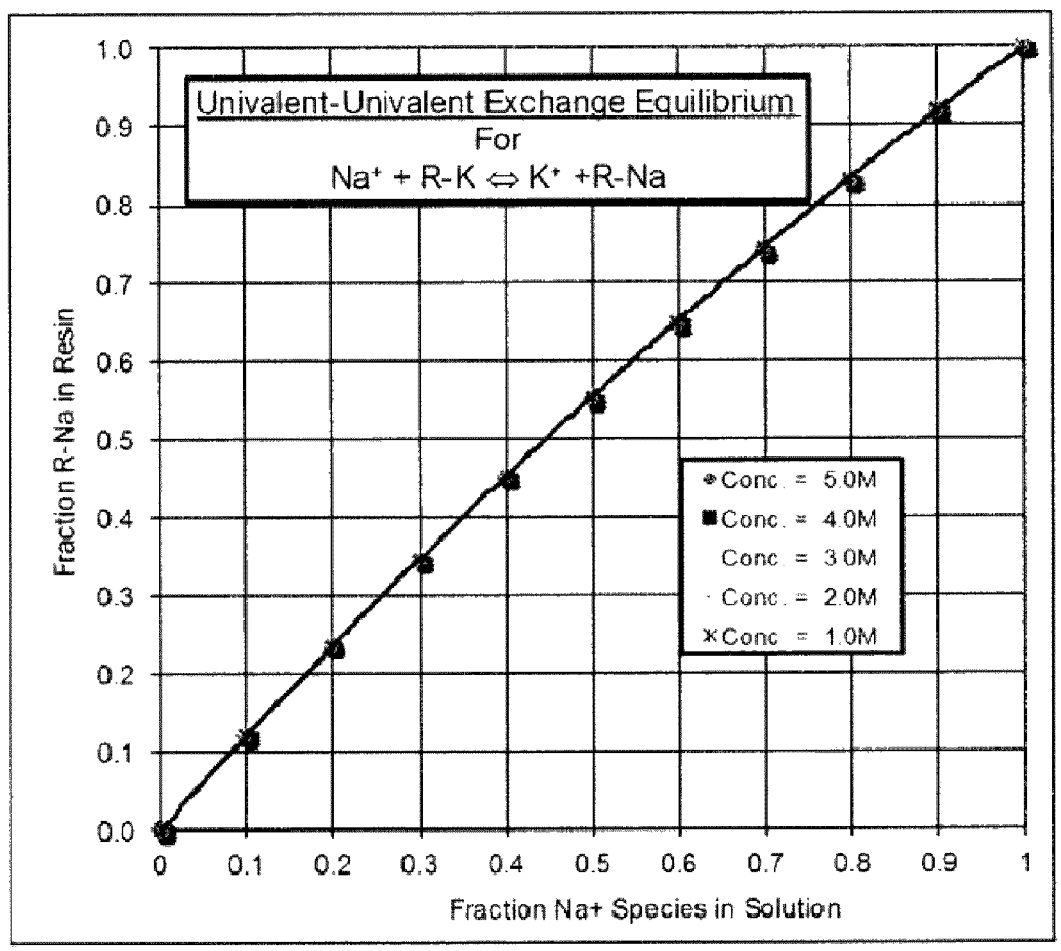
FIG. 10 shows the independence of ion exchange equilibrium in univalent-univalent ion exchange processes.

To contrast the process of this invention with other, univalent-univalent IX metathesis processes, as further here described, it is not possible to control absorption preference (i.e., equilibrium properties of the exchange) in univalent-univalent ion exchange; for example exchange of sodium ions for potassium ions. In univalent-univalent ion exchange processes, there is no similar ability to manipulate the separation coefficient since the equilibrium curve is independent of concentration. For univalent-univalent exchange, a similar treatment of the mass action equilibrium expression for an arbitrary univalent component "a", yields in Eq. 9:

$$\frac{q_a}{Q} = \frac{K\frac{C_a}{C_0}}{\frac{C_a}{C_0}(K-1)+1} \quad \text{Eq. 9}$$

which gives a single equilibrium line regardless of solution total normality, $C_0$, for a given resin activity, Q. FIG. 10 illustrates the relationship at several different solution total normality for a typical resin.

FIG. 1 shows equilibrium properties computed by Eq. 1 and 2, using the properties for Dowex Marathon-C resin at different feed concentrations. When placed in concentrated ionic solutions, Marathon C has a resin activity of about 2.15 eq/L. The plot shows that for a solution total normality ($C_0$) of 5.4 N (equivalent to saturated NaCl at 26.4 wt. %), the equilibrium line is very nearly straight, meaning that Marathon-C provides very little preference for, for example, calcium over sodium. By contrast, when the total normality is 1.0 eq/L, K' is 5.59. The resin has a strong preference for the divalent ion in this environment. Even with counter-current resin column operations, the divalent product solution will necessarily contain unwanted univalent ion contaminants due to re-loading of the divalent ion during exchange. In countercurrent operations, when K' is controlled to be unity (or nearly so) both the univalent loading and divalent loading sections will perform with similar efficiency with regard to product purity and strength.

Figure 2:
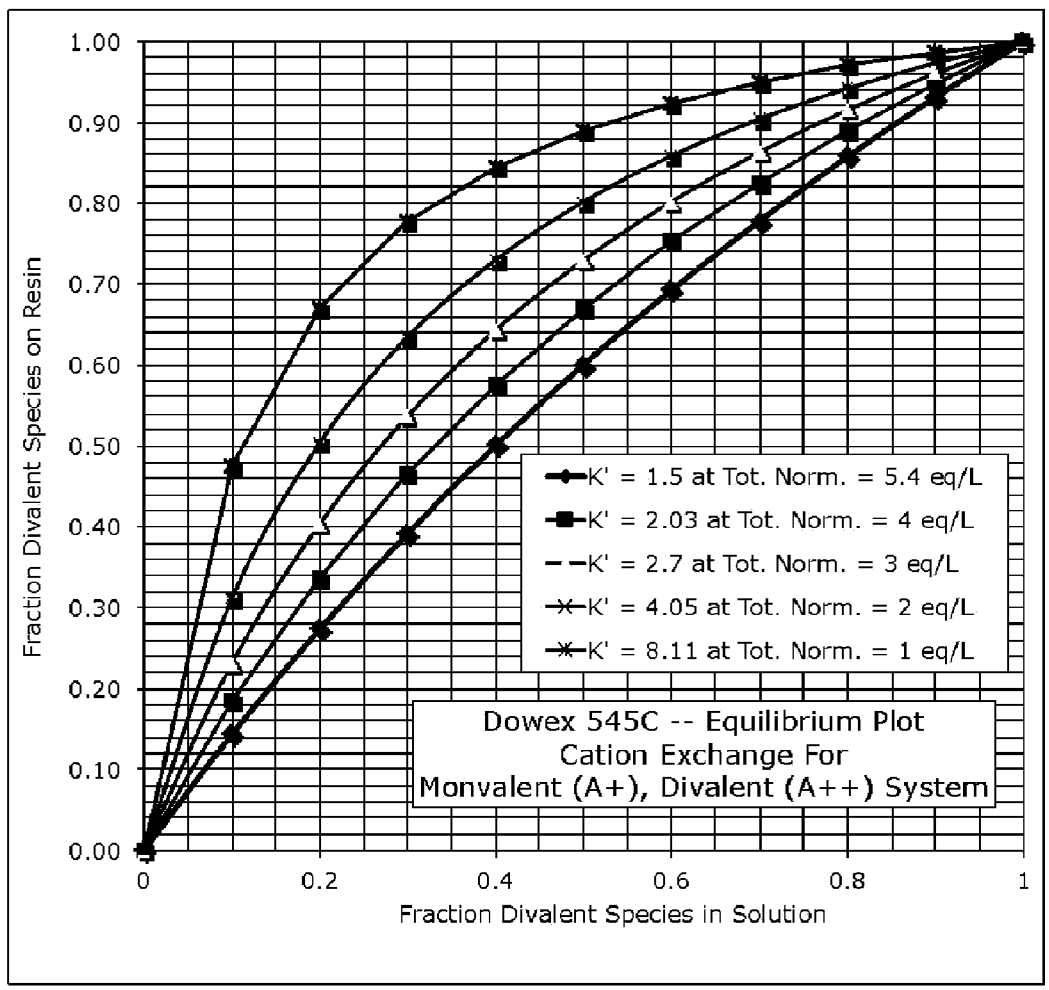
FIG. 2 shows the equilibrium properties of Dowex 545C resin at several different cationic brine total normality.

The importance of resin selection with regard to activity is better understood when comparing with a similar plot for a resin that has significantly different (and higher) activity. FIG. 2 below shows the equilibrium properties of Dowex 545C, having an activity of 2.65 eq/L in concentrated brine. Even in saturated sodium chloride, the curvature in the equilibrium line indicates a strong preference for absorption of divalent ions on the resin, meaning that there is no condition that would favor obtaining a pure divalent product solution.

To contrast the impact of resin activity for the benefit of the invention, consider that when placed in 5.4N, 50-50% $Ca^{++}$/$Na^+$ solution, Dowex 545C will load 60% Ca, 40% Na whereas Marathon-C will load 50.8% Ca, 49.2% Na.

Note also in both FIGS. 1 and 2, how solution normality affects K' for either resin. The consequence is that in the rinse zones, or wherever the concentrated solutions experience dilution, calcium in solution will be preferably absorbed in any cation exchanger. To avoid cross-contamination of unwanted counter ions in the products, the resin must be fully (or nearly fully) converted to its univalent form at the point of feed addition the univalent loading zone and converted to its divalent form at the point of feed addition in the divalent loading zone.

Figure 3:
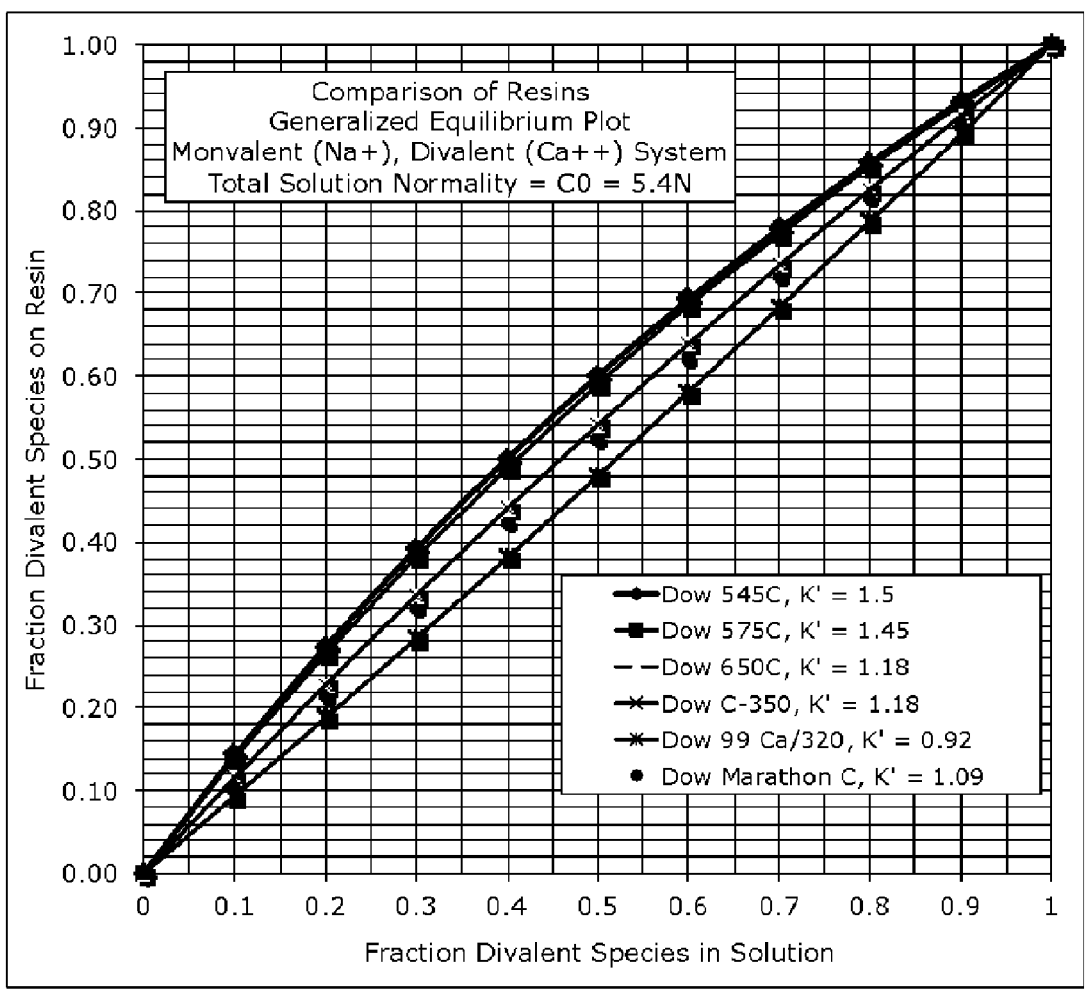
FIG. 3 shows a comparison of equilibrium properties at a total normality of 5.4N cationic strength between several resins examined in laboratory and pilot programs.

FIG. 3 shows a comparison of equilibrium properties at 5.4N ionic strength between several resins examined in laboratory and pilot programs.

The preferred resin from the perspective of equilibrium properties is the one with the straightest line in the plot of Fraction divalent species in solution v. fraction divalent species on resin. In the examples shown in FIG. 3, the straightest line is Marathon-C. Dowex 650C and C-350 show next-best equilibrium properties. These resins and others with similar properties are also useful in the invention. It is evident to those of ordinary skill in the art that resins with these properties that are produced by other manufacturers will behave similarly and are useful in the methods described here.

When using sodium chloride in the ion exchange reaction, the maximum normality of the solution is 5.43 gram-eq/L due to maximum solubility of sodium chloride in water. This is the limiting solution variable for optimizing IX processes that utilize sodium chloride. If higher NaCl concentrations were possible, much greater freedom in the choice of resin properties would be available. If for example a 5.75N or greater sodium iodide (which is more soluble than NaCl) solution were used, then the value of K' would be less than 1.0 and univalent absorption would be favored over divalent absorption, yielding better control over univalent product purity. These aspects are known in the art, and substitutions for sodium chloride are useful and included in the description.

Optimized Equilibrium Properties—Calculation of Ideal Resin Activity

The activity of the resin in this invention is selected such that both ion exchange processes can be optimized. For the exchange processes of this invention, where bi-valent (calcium, for example) ions are being exchanged with univalent (sodium, for example) ions, resin activity should closely match that of the univalent ion. The separation coefficient, K' is dependent upon both resin properties as well as solution concentration. The ideal resin activity is therefore specific to the solution environment and can be calculated. For a given feed solution concentration, Eq. 8 can be rearranged to give:

$$Q = \frac{K'C_0}{K\rho_b} \text{ and} \quad \text{Eq. 10}$$

$$A_r = \frac{K'C_0}{K} \quad \text{Eq. 11}$$

For example, for a resin with a mass-action equilibrium (i.e., selectivity coefficient) K=2.7 with a calcium-form solvent-free bed density of $\rho_b$ of 0.43 kg/L, and setting K'=1 and using the maximum NaCl concentration, $C_0$ of 5.43 eq/L, the thermodynamically ideal resin should have a capacity, Q, of 4.6 eq/kg or an activity $A_r$ (from Eq. 11) of 2.01 eq/L.

It is recognized that even if an "ideal" resin is not available based on properties or other factors, a resin that has a capacity or activity that is near the ideal desired property will be useful and function in the methods described here. In an embodiment, a "near" ideal resin is one that is within 20% of the calculated value.

Optimized Equilibrium Properties—Maximum Solution Concentration

The maximum concentration of pure product solutions that can be generated from a resin is a function of the resin activity and inter-particle void fraction of the bulk resin. The mobile phase is the solution that passes through the bed and since ions that are exchanged are carried with the mobile solution, the maximum concentration of the solution is the number of mole-equivalents that are contained in a bulk volume (e.g., liter) of resin. With the calcium-sodium IX process example, the most highly concentrated solution that can be produced in an ion exchange metathesis process is calculated as:

$$C_0 = C_{Ca^{++},Feed} = C_{Na^+,Feed} = \frac{A_r}{X_r} \qquad \text{Eq. 12}$$

where $X_r$ is the volume fraction of the bulk resin that is particle-particle interstitial void volume.

For example, the void fraction $X_r$ for monospheric resins generally falls in the range of 0.33 to 0.37 and the concentration of saturated feed NaCl, $C_0=C_{Na}$, is 5.43 N (26.4 weight percent). Therefore the maximum concentration for the $CaCl_2$ product of this ion exchange would be 5.43N (24.6 weight percent $CaCl_2$) when the optimum resin activity, $A_r$, of 1.8 to 2.0 eq/L is used.

Optimized Equilibrium Properties—Effect of Resin Shrink-Swell on Activity

Resin shrinkage when placed in concentrated brine affects product purity by effectively modifying the resin activity (meg/mL) to increasing the separation coefficient.

Equilibrium properties of the resin-solute system are affected to varying degrees by the magnitude of shrinkage that occurs during resin loading (when the resin is immersed in concentrated brine) and swelling during rinsing (when the brine is replaced fresh water). There is also a slight volumetric difference between univalent (sodium, for example) and divalent (calcium, for example) loaded resin forms.

Shrinkage in concentrated brines increases the separation coefficient, $K'$, by increasing the volumetric activity, $A_r$, favoring divalent (calcium, for example) absorption somewhat more.

Since solution concentrations in the process described here are very high relative to the activity of the resin, the volumetric ratio of solution advancing opposite the resin is small; about two-and-a-half to one. At low solution-resin treatment ratios, the magnitude of shrink-swell cycle in fixed volume columns creates relatively larger clear solution freeboard space above the resin bed, creating areas that promote back mixing and therefore increasing axial dispersion of solutes in the column (discussed further). For this reason, resins with large shrink-swell cycles are not favored. Back-mixing in highly concentrated counter-current systems lead to significantly greater impurity in products, as evident to one of ordinary skill in chemical engineering of plug-flow reaction systems.

Shrinkage is not as pronounced in highly crosslinked resins since the structure is more constrained and the volume change between brine and fresh water environments can be as low as 5%. In very low crosslinked resins, shrinkage can be more than 40%.

For example, rinsed Na-Form Dowex Marathon C has a measured activity of about 2.0 eq/L. Without shrinkage, in concentrated NaCl brine this would give a $K'=0.97$ (which is good). When the resin is placed in concentrated NaCl brine, it shrinks by about 8%, which increases the volumetric activity to about 2.17 eq/L and now yields a $K'=1.09$ (which is still good). Much work was done with Dowex 650 C which exhibits less shrinkage compared to Marathon C; about 6.5% vs 8% between the brine and water environment. Washed Na-form resin gives a $K'$ of 1.09, but in shrinkage in concentrated brine gives $K'=1.16$, showing significant enough preference for calcium to have a small effect on product purity and resin utilization in the sodium ion absorption zone.

Of the resins tested, Dowex 99/Ca shows the greatest impact of shrinkage between brine and fresh water forms; the resin shrinks by 20% and the separation coefficient increases from 0.92 to 1.16 in brine as the environment changes from fresh water to NaCl brine. As discussed further below in the discussion of kinetics, the IX exchange is initially fast, but slows down considerably as the free water is expelled from the beads into the brine; toward the end (complete conversion) of the exchange, the diffusion coefficient decreases to values similar to those of 650C and C-350.

In an embodiment, the separation coefficient in concentrated brine is controlled by selecting a resin with shrinkage not greater than 8% when transferring from the fresh water phase and the concentrated brine phase.

Optimum Resin—Selection Criteria

The foregoing discussion makes specific reference to ionogenic substituted polystyrene resins that are crosslinked to a varying degree with DVB. A key variable found affecting an ion exchange resin's utility in the process described here is its degree of divinyl benzene cross-linking. The value of DVB crosslinking in polystyrene resins affects all of the resin's key properties, namely: (1) resin free water retention, (2) the magnitude of the resin's shrink/swell as solution concentration changes, and (3) ion exchange volumetric capacity (activity) vs. solution ionic concentration. These physical properties affect ion exchange in concentrated solutions in an interrelated way, particularly with regard to ion exchange rates (kinetics).

Optimum Resin—Kinetic Effect of Free Water Retention

Inter-particle diffusion rates increase with increasing free water. When immersed in concentrated brine solutions, the free water retention within a given resin in fresh water (i.e., infinite dilution) is a variable that is substantially dependent upon the degree of crosslinking. Low crosslinked resins (e.g. 4% DVB) retain more free water than highly crosslinked resins (e.g. 20% DVB). The quantity of free water retained further depends upon the solution environment that it is placed in. In a particular embodiment of the process of this invention, the divinyl benzene crosslink percentage in sulfonated polystyrene IX resins is between 10% and 14%, although other degrees of crosslinking are useful.

The highly concentrated solutions (e.g., 4-6 eq/L total normality) utilized in this invention reduce the swelling pressure between the resin and bulk solution to their lowest values owing to the similarity of ionic charge within the resin bead and the bulk solution. As the resin bead shrinks, the quantity of free water that facilitates diffusion of solutes decreases. Further, the bulk solution contains relatively less free water itself since much of the solvent becomes associated with the solutes as hydration shells. Each of these phenomena works to reduce diffusion rates. The ion exchange process, as a result, slows.

Even though low-crosslink resins have very high free moisture in dilute solutions relative to high cross-link resins, the free moisture within a low crosslink resin is expelled in strong brines by concomitant reduction in the Donnan Potential, which results in significant shrink-swell behavior and significantly reduces diffusion rates leading to a substantially diminished utility in the process of this invention.

The two common polystyrene-based ion exchange resin structures are (1) gel and (2) macroporous (macroreticular). As described elsewhere herein, in particular embodiments, gel resins are preferred over macroreticular in the methods described herein, however, as is known in the art, other types of resins are useful.

Gel resins are in most applications, kinetically faster. The resin phase is continuous and impervious to fouling with salts. It was discovered that very highly crosslinked resins are kinetically much slower than medium crosslinked resins. The explanation for slow kinetics is that the highly constrained matrix has very low free moisture, which drives the interparticle diffusion coefficient downward. These resins show the least amount of shrinkage in concentrated brines due to their highly constrained matrix, which would be beneficial if the kinetics were not significantly slower. In addition, high-crosslink resins also have higher activity, which is another drawback since it drives the selectivity coefficient too high for processes that utilize sodium chloride regenerant, favoring divalent absorption over univalent absorption in all cases.

It was discovered that lightly crosslinked resins (e.g., less than 6% DVB) are fast initially, but slow as down to a similar rate to the medium cross-linked resins in strong brines. The observation is that in strong brines, lightly crosslinked resins dehydrate and shrink to the same degree as resins with greater crosslinking. Such a resin may shrink by 20% when placed in concentrated brine. The large shrink-swell cycle of such resins lead to poor performance in fixed volume resin vessels in the process of this invention.

Highly crosslinked resins tested in laboratory and pilot work by the inventors, though they possess a favorably small shrink-swell cycle, have very low moisture levels, leading to low diffusion rates and too-high activity, which leads to poor equilibrium properties and as a result lead to poor performance in the process of this invention.

It was discovered that medium crosslinked resins, particularly in the range of 10-14% DVB, show shrink-swell that is only slightly greater than the very high crosslink resins, therefore retaining higher free moisture and as a result are kinetically significantly faster and have better equilibrium properties in the concentrate brines of this process. Resins with such properties are employed in certain embodiments of this invention.

The optimum resin seeks highest free moisture content and the smallest shrink-swell cycle. The resins that fall in the range of 10-12% DVB cross-linking, lead to free moisture contents in the washed loaded resin beads of 38-48 weight percent and display volume changes in the range of 6-8% in their shrink-swell cycles. Resins with these properties are especially useful in certain embodiments of this invention.

Optimum Resin—Undesirability of Macroporous Resins

Macroporous (also referred to in the industry as "macroreticular", MR) resins are synthesized from an agglomeration of small, very highly cross-linked gel-resin particles and as a result have small, physical channels.

Since the solutions in this process have components that are at-or-near their solubility limit, there is significant potential that the pores of the resin can become fouled with precipitated salts.

Kinetics when using MR resins in strong solutions are slow due to a problem unique to MR resins. Measurements by the inventors show that macroreticular resins do not perform well in concentrated solutions due to phenomena in the resin's outer-shell and low free water content that substantially reduces inter-particle diffusion rates. During test work it was found that when working at high concentrations, the macroporous resin would fail to completely load. Kinetic test work showed fast loading of the outer shell of the resin bead followed by a dramatic slowdown of the IX process by about ⅓ of the distance into the particle. In concentrated solutions, the resin would fail to load to its full capacity. This may have been due to both precipitation of eluted salts in the macropores and to diffusion limitations in the highly crosslinked gel-resin agglomerate components of the macroreticular structure. (Very highly crosslinked gel resins also show excruciatingly slow inter-particle diffusion kinetics in strong solutions due to low-free moisture content as described elsewhere.)

MR resins should be avoided in these processes since they do not perform well kinetically and due to the potential for fouling and damage by inter-particle solute precipitation.

Optimized Kinetics—Preferred Resin Size and Size Distribution

The invention is not reliant on a specific resin size in order to function, but performance is improved through the use of smaller bead-diameter resins. For example, resin conversion kinetics when using a 350-micron resin is 3.45 times faster than 650-micron resins. Use of smaller bead diameter is made practical in this invention owing to use of highly concentrated IX feeds that reduce the solution flux rate, and therefore, resin bed pressure drop and therefore reduces the volume of resin required to operate the process by the same factor.

For a given ideal resin, the resin size should be the smallest practical size. Decreasing the resin particle size by a factor of two increases the resin solute reaction rate by a factor of four. The particle size distribution should be as narrow as possible, with monospheric being ideal. The process of this invention utilizes low solution-to-resin treatment ratios that keep pressure drop per foot of bed depth (dP/ft) low and allow small particle size resins to be utilized. In a preferred embodiment, the preferred resin particle diameter is 325+/−25 microns.

The above discussion refers to uniform composition resins that are fully functionalized with ionogenic groups throughout. As an alternative to such resins, the kinetic benefits of small particle diameter can be met by using inert core resins.

Optimum Resin—Effect of Resin Shrink-Swell on Axial Dispersion

The magnitude of resin shrinkage affects product purity by influencing the magnitude of axial dispersion. Ideally, both eluent and eluted solutes are only radially dispersed in the IX column, perpendicular to resin-solution counter flow. Axial dispersion is undesirable in plug-flow systems. Perfect plug flow is the ideal for IX systems. The consequence of axial dispersion is that portions of the trailing solutes are not moving fast enough to prevent being carried in the reverse direction with the counter flow of resin. Resin shrinkage can significantly increase axial dispersion of solutes by creating a clear void above the bed that allows an area for solution back mixing. Interstage back mixing leads to increased axial dispersion of solutes within the aggregate ion exchange bed and is to be avoided to the greatest extent possible. Eluted solutes that travel (are carried) with the resin contribute both to inefficient resin utilization and product impurity.

A high degree of axial dispersion can reduce product purity in this process. Back mixing of solutions in the column freeboard and associated column piping leads to lengthening of the solute front and tail. Back mixing widens (increases) the residence time distribution of the reacting solutes and contributes to impurity in the products. When back mixing in each stage is not controlled, the residence-time distribution widens, resulting some of the feed solution being carried in the reverse direction with the resin. The result is incomplete conversion of resin and contamination of the feed with unwanted counter-ions. Axial dispersion is significantly controlled in this process through proper resin selection.

The degree of shrinkage in IX resins is related to the percentage of crosslinking of the polystyrene structure with divinyl benzene. It was found that Marathon-C had shrink-swell characteristics consistent with a 10.5% DVB resin, giving rise to shrinkage between concentrated brine and fresh water of about 7.5% (i.e., the pilot columns with a 47.25 inch bed shrunk by about 3.5 inches each load-rinse cycle). Dowex 650C and C350 gave slightly less shrinkage, about 6.25%, consistent with about 13% DVB. Although Dowex 99/Ca is easily the fastest kinetically, its shrinkage is 20% owing to a very-low degree of crosslinking that is consistent with about 3% to 4% DVB. The large shrink-swell cycle of low DVB crosslinked resins do not favor their use in this invention. By contrast, Dowex 545C showed less than 5% shrinkage, consistent with DVB crosslinking of about 20%. The very-high-DVB crosslinking in Dowex 545C lead to very slow IX rates and therefore do not favor their use in this invention. As is described herein, various factors are interrelated and must be balanced in the choice of a particular resin type or characteristics of the resin.

It was found that large void volumes above the resin bed in each column contributed to increased eluted solute travel in the direction of resin travel. In fixed volume columns, the optimal resin to prevent excessive axial dispersion of solutes has DVB crosslinking that is greater than 10% since shrinkage is favorably similar to very-high-DVB resins when compared to low-DVB resins that facilitate greater axial dispersion.

Mitigating Axial Dispersion in High Concentration Ion Exchange Metathesis with Variable Volume Resin Vessels The effect of the shrink/swell cycle on axial dispersion of solutes during IX metathesis can be mitigated if a physical means of eliminating the void space above the resin is employed.

Axial dispersion of solutes in each loading zone due to back mixing in resin column clear solution freeboard that develops when the resin is immersed in concentrated brines is substantially eliminated by utilizing a variable volume resin chamber. There are various ways of implementing this factor, including an annular bladder that expands as resin shrinks in concentrated brines. An example of such a column is constructed from a rigid carbon steel column with an annular rubber lining. Resin fills the interior of the bladder and includes resin containment and liquid distribution and collection at each end (for example, wedge wire screens). The annular bladder is inflated from the outside using a fluid such as compressed air, which effectively reduces the volume of the resin chamber Employment of a variable volume resin chamber, though not required for the process, is useful since it mitigates, but does not eliminate process inefficiencies owing to the resin shrink-swell cycle.

Resin Kinetic Evaluation for Process Optimization

A discovery of this invention that allows for proper process design is the means to fully load the ion exchange media in each loading zone. In order to design the process of this invention, the kinetics of the ion exchange reactions are required to determine the size of processing equipment. Specifically, the process requirements to completely load the resin under process conditions for a given feed flow, a given solute concentration, resin activity, and bead size must be known in order to determine the required number and size of the resin columns in each zone of the process of the invention. Typical IX kinetic tests (e.g., Breakthrough Analysis) are suited for equipment sizing in typical dilute water treatment applications where the volumetric treatment ratio of solution to resin is large; in the range of five to several thousand bed volumes (BV) of liquid per BV of resin. This method is not adequate to evaluate the resin kinetic properties in the concentrated brine conditions of this invention. The following describes the method of this invention and procedure to evaluate resin properties and performance for this process of this invention.

Cation exchange is kinetically limited by interparticle diffusion rates. For a flow system, the behavior for exchanging univalent (for example, sodium) ions on a divalent loaded (for example, calcium) resin can be described by the relationship:

$$t = \tau_{Na}\left(1 - 3(1-X)^{\frac{2}{3}} + 2(1-X)\right) \quad \text{(Eq. 13)}$$

where:

$$\tau_{Na} = \frac{K_d}{C_{Na}} = \frac{\rho_{Ca} R^2}{6 b D_e C_{Na}} \quad \text{(Eq. 14)}$$

where t is the time it takes to achieve a resin conversion, X, in minutes, $\rho_{Ca}$ is the molar density of the divalent ion loaded resin in meq/mL, R is the particle radius, $D_e$ is the interparticle diffusion coefficient, and $C_{Na}$ is the concentration of the univalent sodium counter ion in the feed solution. If all calculations are done in meq/mL instead of mmol/mL, the stoichiometric constant, b, is unity. By inspection, it is evident that τ is numerically equal to the time it takes to achieve 100% conversion. In many solid fluid systems, all terms that comprise τ are constants except for the concentration of reactant "A". $K_d$ is therefore, usually a constant.

Experimental evaluation of resins using this expression aids in both the determination resins suitable for use in this process as well as in determining the quantity of resin required for the commercial process. Application of this approach also allows understanding of the relative kinetic differences between resins and provides useful that knowledge as an aid in selecting appropriate resins. The method of evaluating these factors was to select resins that separate these independent variables and measure the rates of ion exchange. The rate of ion exchange was measured using small quantities of resin in a column flow apparatus (See FIG. 4).

The experimental method consists of loading a known volume of water-washed resin, with a known activity, into the test column and passing a solution with known concentration of the ion to be exchanged for some fixed amount of time. The test is generally repeated over several different total contact time intervals. The amount of solute loaded is measured. The resin conversion, X, is computed and substituted into Eq. 13 and the value of tau (τ) computed. With τ and the concentration of the feed solution, $C_{Na}$ in this example known, the other values (e.g., $K_d$ and $D_e$) can be computed.

The expressions in Eq. 13 and Eq. 14 are similar for exchanging divalent ions with a univalent loaded resin. When using this expression, it is convenient to express all concentrations in terms of charge normality; for example a 2.5M $CaCl_2$ solution is 5N. The values for the constant τ can be evaluated experimentally in a laboratory flow apparatus. For a specific resin and feed solution concentration, the ratio of $\tau_{Na}/\tau_{Ca}$ gives an experimental measure of the separation coefficient, K' to allow for determination of the suitability of a resin to be used in this process. For example, Resin "A" has a ratio of $\tau_{Na}/\tau_{Ca}$ of 2.0 and Resin "B" has a ratio of 1.0, Resin "B" is the preferred resin and should be selected for the process. The value of τ can also be used to estimate the quantity of resin required in the commercial process. For example, if resin "X" yields a value of τ of 40 minutes and Resin "Y" has a τ of 20 minutes, a process using resin "Y" will require half of the total resin in the commercial process.

From tests by the inventors using this apparatus, values of the intra-particle diffusion coefficient were be measured, resin capacity verified, and comparative time to achieve complete conversion of resin from one form to another calculated. The results showed the following:

A. Significant Kinetic Differences Between Resins

There was a wide variability from slow (highest crosslink resin, Dowex 545C, takes almost two hours for conversion to the sodium form) to very fast (Dowex 99/Ca, a small particle, low crosslink resin that achieves complete conversion in around fifteen minutes). As an example, Table 1 below lists values of $K_d$ and tau ($\tau$), showing wide differences in ion exchange rates between resins in highly concentrated solutions.

TABLE 1

Values of Kd and Tau Derived from Small Column Kinetic Tests at ca. 5.4N

| Resin | Resin Ionic Capacity (meq/mL) | Solution Concentration (meq/mL) | Bead Size (mm) | $K_d$ (min-mL/meq) | $\tau$ (min) |
|---|---|---|---|---|---|
| Sodium Loading Kinetic Data Summary | | | | | |
| Dowex 575C | 2.55 | 5.40 | 0.575 | 595 | 110.3 |
| Dowex 650C | 2.32 | 5.40 | 0.650 | 486 | 90.0 |
| Dowex C-350 | 2.32 | 5.44 | 0.350 | 139 | 25.6 |
| Dow Marathon C | 2.18 | 5.40 | 0.585 | 299 | 55.4 |
| Dowex 99 Ca/320 | 1.92 | 5.35 | 0.320 | 83 | 15.5 |
| Calcium Loading Kinetic Data Summary | | | | | |
| Dowex 575C | 2.55 | 5.50 | 0.575 | 353 | 64.1 |
| Dowex 650C | 2.32 | 5.50 | 0.650 | 404 | 73.5 |
| Dowex C-350 | 2.32 | 5.60 | 0.350 | 115 | 20.6 |
| Dow Marathon C | 2.18 | 5.45 | 0.585 | 275 | 50.5 |
| Dowex 99 Ca/320 | 1.82 | 5.40 | 0.320 | 81 | 15.0 |

B. Diffusion Coefficient, $D_e$ Varies with Solution Concentration

The kinetics of gel resins slow down with increasing brine concentration due to lowered inter-particle free moisture content. In other heterogeneous fluid-solid systems where the diffusion coefficient does not change with concentration, the value of $\tau$ normally decreases as concentration increases (making the reaction faster). An example of such a system is diffusion of air through the ash layer of a charcoal briquette. However, kinetic tests on ion exchange resins show that the rate is slowed by a little more than half when concentration increased from 4.0N to 5.5N. The reason is that high concentrations lead to lower osmotic pressure in the resin bead, de-watering the resin, reducing the free moisture content, and shrinking the resin, leading to the inter-particle diffusion coefficients being variable and decreasing with increasing concentration. In dilute IX systems (e.g., water treatment or dilute recovery processes), $D_e$ is very close constant over a wide range of (dilute) concentrations because the physical changes in the resin are much, much less dramatic. Table 2 below lists values measured in the laboratory and pilot program.

TABLE 2

Comparative Values of Measured Diffusion Coefficients

| Resin | Soln. Conc. (meq/mL) | $D_e$ (Ca++) (cm$^2$/min × 10$^6$) | $D_e$ (Na+) (cm$^2$/min × 10$^6$) |
|---|---|---|---|
| Dowex 575C | 4.00 | 3.70 | 1.88 |
| Dowex 575C | 5.50 | 1.49 | 0.88 |
| Dowex 650C | 4.00 | 4.66 | 2.98 |
| Dowex 650C | 5.50 | 1.51 | 1.25 |
| Dowex C-350* | 5.60 | 1.54 | 1.27 |
| Dowex 99 Ca/320 | 4.20 | 2.03 | 1.91 |
| Dowex 99 Ca/320 | 5.40 | 1.44 | 1.47 |
| Dowex 650C, Ca(CN)2* | 3.20 | 4.38 | |
| Dowex 650C, Ca(CN)2* | 3.70 | 4.42 | |

*Brine feed = calcium cyanide; others were calcium or sodium cyanide

Note for example, in Table 2, note that for Dowex 575C, the interparticle diffusion coefficient is significantly smaller when loaded with a 5.5N solution than it is when loaded with a 4.0N solution.

Also note that Dowex C350, which has the same composition as Dowex 650C except for its bead particle size, gives the same diffusion coefficient. This confirms that the resin chemical properties associated with the degree of free moisture and DVB content are key variables to optimize when selecting a resin for use in this invention.

Highly crosslinked resins (e.g. >15% DVB, e.g. Dowex 545 C) with low free moisture content exhibit extremely low inter-particle diffusion rates (and consequently very slow absorption/desorption kinetics) in concentrated solutions and are therefore not optimal. Low cross-linked resins (e.g. <4% DVB), have higher free moisture, benefiting inter-particle diffusion rates, but exhibit a much higher degree of shrinkage in concentrated solutions, which leads to poorer performance in this process.

C. Highly Active Resins Show Faster Calcium Loading (Relative to Sodium)

One of the variables that affects ion exchange rates is preference for one ion over another. This result is predicted by the mass-action equilibrium expression and is observed in kinetic evaluations by the inventor. The ratio of $\tau_{Na}/\tau_{Ca}$ for sodium vs. calcium loading is a measure of the separation coefficient. A higher preference for calcium is expected for a highly crosslinked resin vs. a medium crosslink resin since it has a higher unit capacity of active sites; higher concentration of active sites effects a higher contribution to mass action. It was experimentally discovered that the ratios of $\tau$ for one high crosslink resin showed that sodium takes nearly twice as long to load as calcium, whereas on the medium crosslink resin, sodium and calcium load at close to equal rates, as predicted by the equilibrium separation coefficient. Table 3 below compares the calculated equilibrium parameter, K', with ratios of measured values of tau and ratios of measured values of diffusion coefficient.

TABLE 3

Comparison of Calculated K' with Ratio of $\tau$ and $D_e$ at Various Normality

| Resin | Soln Normality | Calc. Equilib. Separation Factor (K') | Measured Ratio of Tau's $\tau_{Na}$:$\tau_{Ca}$ | Measured Diff. Coeff. Ratios $D_{e,(Ca++)}$: $D_{e,(Na+)}$ |
|---|---|---|---|---|
| Dowex 575C | 4.00 | 1.95 | 1.96 | 1.96 |
| Dowex 575C | 5.50 | 1.45 | 1.72 | 1.69 |
| Dowex 650C | 4.00 | 1.59 | 1.56 | 1.56 |
| Dowex 650C | 5.50 | 1.18 | 1.22 | 1.20 |
| Dowex C-350 | 5.60 | 1.18 | 1.25 | 1.21 |
| Dow Marathon C | 5.45 | 1.04 | 1.10 | 1.09 |
| Dowex 99 Ca/320 | 4.20 | 1.32 | 1.14 | 1.06 |
| Dowex 99 Ca/320 | 5.40 | 0.98 | 1.04 | 0.97 |
| Dowex 650C, Ca(CN)2 | 3.70 | 1.59 | 1.37 | 1.48 |

From kinetic theory, the ratio of kinetic coefficients for elementary reactions is identical to the equilibrium coefficient. The conclusion that the equilibrium derived K' is related to the kinetic parameters tau and interparticle diffusion coefficient is consistent with kinetic theory for reaction rates in elementary chemical reactions. Recalling Reactions 1.1 and 1.2, counter-current IX flows force each reaction is a specific direction. The quotient of forward and reverse reaction rates for elementary reactions yields the equilibrium constant; in this case, the specific equilibrium coefficient is the separation factor for the specific conditions of ion exchange.

Table 3 demonstrates that the measured diffusion coefficient is related to mass action equilibrium parameters and supports the conclusion that by manipulating the equilibrium parameters of the resin solution system, the performance of the IX system can be controlled.

The most preferred resins for the benefit of method of design of this invention are ones that give ratios of tau or ratios of interparticle diffusion coefficients that are unity or as close as possible to a value of 1.0. For the benefit of this invention, high activity is not desirable. For embodiments of this invention, the preferred resin activity when using a saturated NaCl brine eluent is 2.0 eq/L or as close to this value as possible.

For the benefit of the design of this invention, the small column kinetic tests provide an effective means to evaluate the suitability of resins for use in the process of this invention and are preferred over standard "Breakthrough" analysis as known to those familiar with the art of ion exchange kinetic analysis.

D. Effect of Co-Ion (Non-Absorbed Anions) on Kinetics

Both in the laboratory work and the pilot plant, the kinetics were similar regardless of the feed co-ion. Considering that the process is cation exchange and inter-particle diffusion controlled IX, this was expected. Table 4 below compares measured diffusion coefficients for calcium exchange on sodium-loaded Dowex 650C resin.

TABLE 4

Measured Kinetic Parameters & Diffusion Coefficients w/Differing Co-Ions

| Resin | Soln. Conc. (meq/mL) | Kd (min-mL/meq) | τ (min) | $D_e$(Ca++) (cm$^2$/min × 10$^6$) |
|---|---|---|---|---|
| Dowex 650C, CaCl2 | 4.00 | 131 | 33 | 4.66 |
| Dowex 650C, Ca(CN)2 | 3.20 | 139 | 43 | 4.38 |
| Dowex 650C, Ca(CN)2 | 3.70 | 138 | 37 | 4.42 |

Impact of the Solution Phase Equilibrium Properties on Kinetics

Noting again that K'>1 favors absorption of divalent ions and K'<1 favors univalent absorption, and regarding calcium and sodium as examples, the equilibrium properties of the solution affects divalent ion absorption.

In the process to absorb divalent ions, selectivity is increased as concentration is lowered and high sodium product purity is relatively easier to obtain. In pilot operations by the inventor, high purity NaCN products are achievable from calcium cyanide feed solution even when the solution feeding the ion exchange media becomes diluted, which is the case in when rinsing the resin. Calcium feed concentration should be anything below that which gives a K'=1. For Marathon-C, any feed less than 5.5N (i.e., 22 wt % Ca(CN)$_2$) is acceptable.

Effect of Equilibrium Properties on Univalent Ion Absorption:

During the regeneration of the resin from the divalent-form (e.g., R$_2$—Ca) to the univalent form (e.g., R—Na), the value of K' should be less than or equal 1.0 so that the sodium absorption equilibrium is favored. By Eq. 7, this means that the Na+ feed concentration, dictating C$_0$ in the NaCl (or other univalent cation salt) loading section of the process, should be greater than the value required to make K' less than or equal to 1.0. When this condition is not met, axial dispersion of sodium salts in the countercurrent process is increased due to re-loading of eluted divalent ions in the zone occurs and requires additional univalent ions to follow. This is permissible, but will introduce inefficiencies in the process.

For the resins tested (and available), the requirement that K'≤1.0 can only closely be met when using concentrated sodium chloride as the eluent. Using the resin with the most favorable equilibrium properties, Marathon-C, in order to achieve K'≤1.0, an NaCl concentration of 5.65N would be required. Unfortunately, NaCl solutions have a maximum concentration of about 5.43 eq/L (corresponding to 26.4 wt. %). If, for example, sodium iodide were used instead, a much higher univalent ion feed concentration can be achieved such that K'<1, where univalent absorption is actually favored over divalent absorption.

For example, when a somewhat diluted solution of NaCl is fed to a bed of calcium-form resin, even in a counter-current flow rate regime, the divalent ion is still favored. For example, NaCl at 20 wt. % (about 4.0N) gives a K' of about 1.4 and the resin selectivity favors calcium (though not overwhelmingly). Elution of calcium from the resin is therefore slower because it re-loads even as it is being displaced. It ultimately will be eluted from the bed, but not fast enough to prevent an unintended percentage of calcium to remain in the resin after it leaves the Sodium Chloride absorption zone. A process artifact of this is that a mixed "Na-Form/Ca-Form" resin will enter the Calcium Absorption zone (i.e., Ca(CN)$_2$/NaCN area of the process) and functionally reduce the resin's capacity since there is less sodium absorbed on the resin when it enters the calcium absorption zone.

The direct conclusion is that saturated, or nearly saturated, solutions of sodium chloride are particularly useful as feed solutions in order to drive the separation coefficient toward unity. As is recognized, solutions that are not saturated, or nearly saturated, solutions of sodium chloride will still function in the methods described here but may reduce the purity and concentration of the product solutions.

An exemplary operating value of K' in univalent ion loading onto divalent-form resin is less than or equal to 1.0, but greater than 0.85. The lower limit on K' is set by and is a result of the molar volumetric properties of the counter-flowing resin and solution phases. The solution phase must be flowing at a rate that carries all eluted solutes in a net molar flow rate that exceeds the molar flow rate of solutes in the solution that is being carried countercurrently with the resin phase. If for example, by using a highly concentrated univalent solution, a value of K'=0.7 was achieved, solution countercurrent travel would not be sufficient to overcome the molar rate of solute flow with the resin-contained solution. Such a solution would require dilution to provide sufficient volumetric flow to carry eluted solutes forward to IX product discharge.

In systems where axial dispersion is largely absent, K' can be set as low as 0.9, noting that axial dispersion in real systems is never zero. In practical systems, given that the methods to control axial dispersion, discussed elsewhere in this document, are employed, the exact degree of axial dispersion cannot currently be predicted with great precision. However, the effect of insufficient solute travel due to axial dispersion is easily detected; eluted solute travel is in evidence when eluted counter ions are detected in the recovered feed solutions after rinsing. The remedy for this when K' is less than 1.0 is by dilution of the feed to lower concentration which increases the net molar rate of solutes countercurrent to the bulk resin flow.

Effect of Elevated Temperature on Preferred Process

Operation at elevated temperature in ion exchange processes increases the rate of exchange between 4% and 8% per degree centigrade by increasing the interparticle diffusion coefficient. (Helfferich, F, "Ion Exchange", 1$^{st}$ Ed., Dover Publications, NY, 1995, pp 308). Further, elevated temperature reduces ion exchanger selectivity toward the divalent ion, enhancing the sodium absorption process. Sulfonated polystyrene-DVB crosslinked IX resins will function well in elevated temperature environments up to 120 to 130 degrees C. A modest increase in operating temperature from 20 degrees C. to 30 degrees C. will nominally double IX rates; increasing to 40 degrees will nominally quadruple IX rates.

In ion exchange processes such as described in U.S. Pat. No. 6,649,136, the NaCl feed brine is heated to increase both reaction (IX) rates and to reduce the separation factor to favor sodium absorption, reduce operating resin volumetric requirements, and achieve higher product purity in an embodiment.

In an embodiment of the process of this invention, in the univalent ion absorption process on divalent-form resin, the univalent solution is heated to above 25 degrees C. and less than 120 degrees C.

Example Resin-Solution Optimized System

In a specific non-limiting example the divalent cation is calcium and the positively charged counter ion is sodium. In this specific non-limiting example the activity of the ideal resin matches the concentration of the univalent exchangeable ions in solution, namely, 5.43 eq/L, which represents the concentration of, saturated NaCl solution. In this specific non-limiting example the ideal resin activity is computed to be $A_r=Q\rho_r=2.0$ eq/L with a mass action equilibrium constant of 2.7 resulting in a separation coefficient K'=1.0. In this specific non-limiting example the calcium cyanide solution has a concentration of less than 5.43 equivalents per liter solution, giving a K'>1.0. In this specific non-limiting example the ideal resin has a crosslinking between 10% DVB and 14% DVB which prevents excessive shrinkage and preserves the physical properties of the ideal resin to the greatest degree. In this specific non-limiting example the resin is Dowex Marathon C. Similar performance can be expected using Purolite PFC 100 or Lanxess Lewatit MonoPlus S100. In this specific non-limiting example the bead size of the resin is below 600 microns. In this specific non-limiting example, the temperature of the NaCl feed to the sodium absorption zone is increased to between 30 degrees C. and 50 degrees C. In this specific non-limiting example the divalent cation-univalent anion effluent product solution is calcium chloride and the univalent cation-anion effluent product solution is sodium cyanide.

It is recognized that all the specifics in the exemplary process including concentration of the feed solution, crosslinking of the resin, resin composition, temperature of the solutions, bead size, and other values may be varied and changed and are still within the methods described here.

Process Operation

Figure 8A:
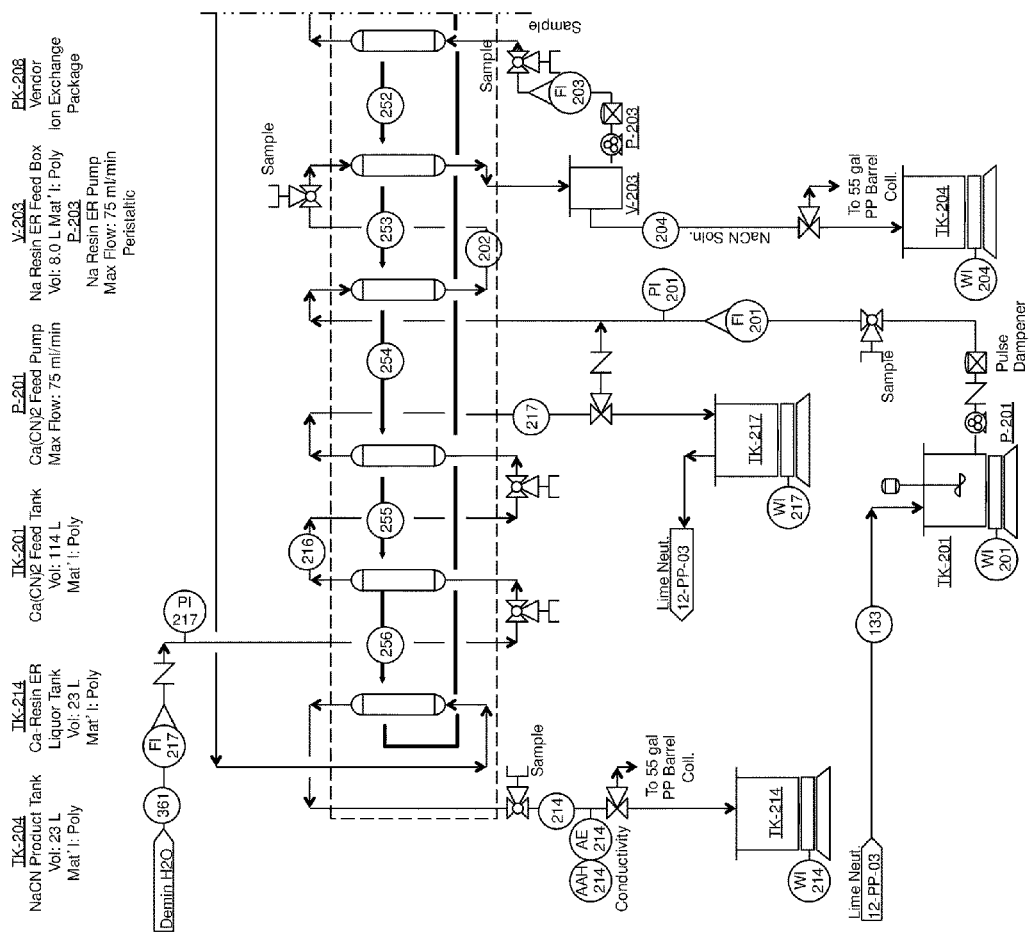
FIG. 8 (illustrated as FIGS. 8A and 8B) shows one specific exemplary configuration of a pilot plant useful in the processes described herein.
Figure 8B:
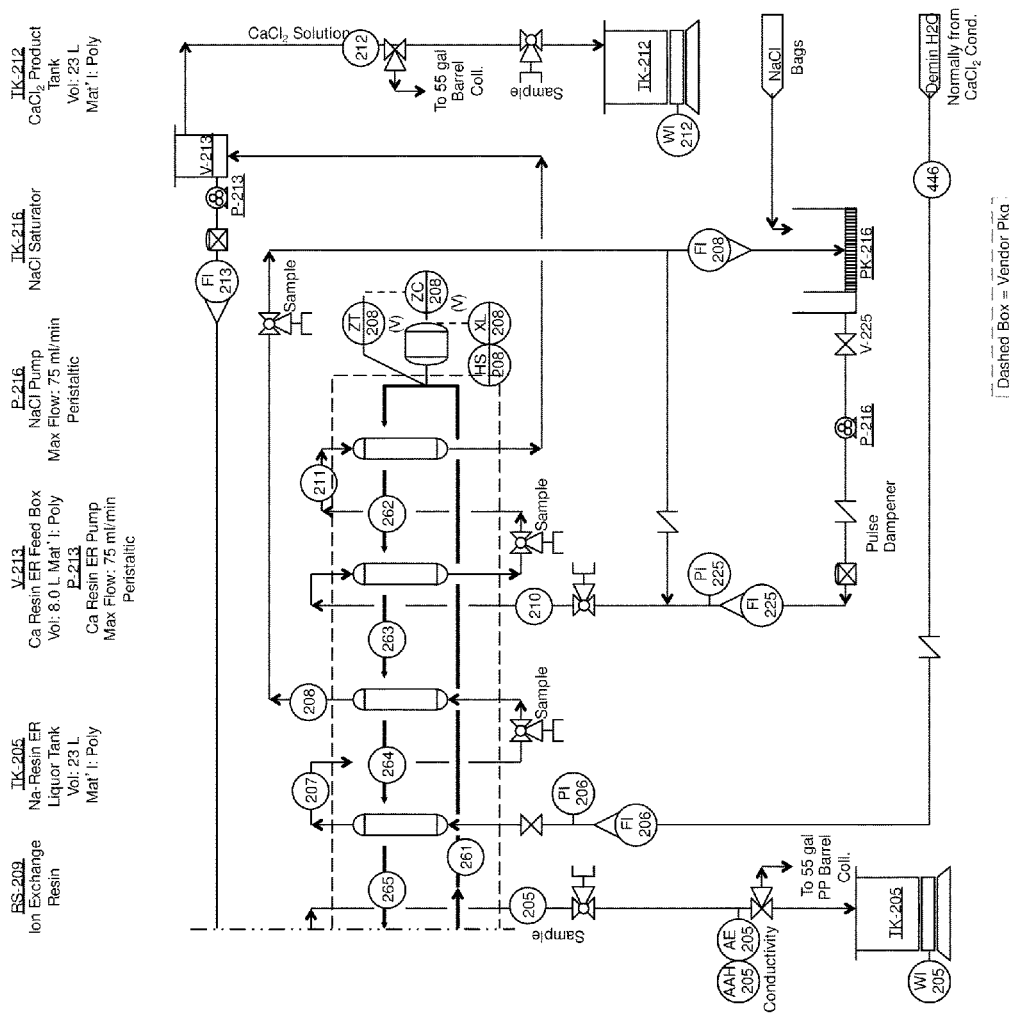
Figure 9A:
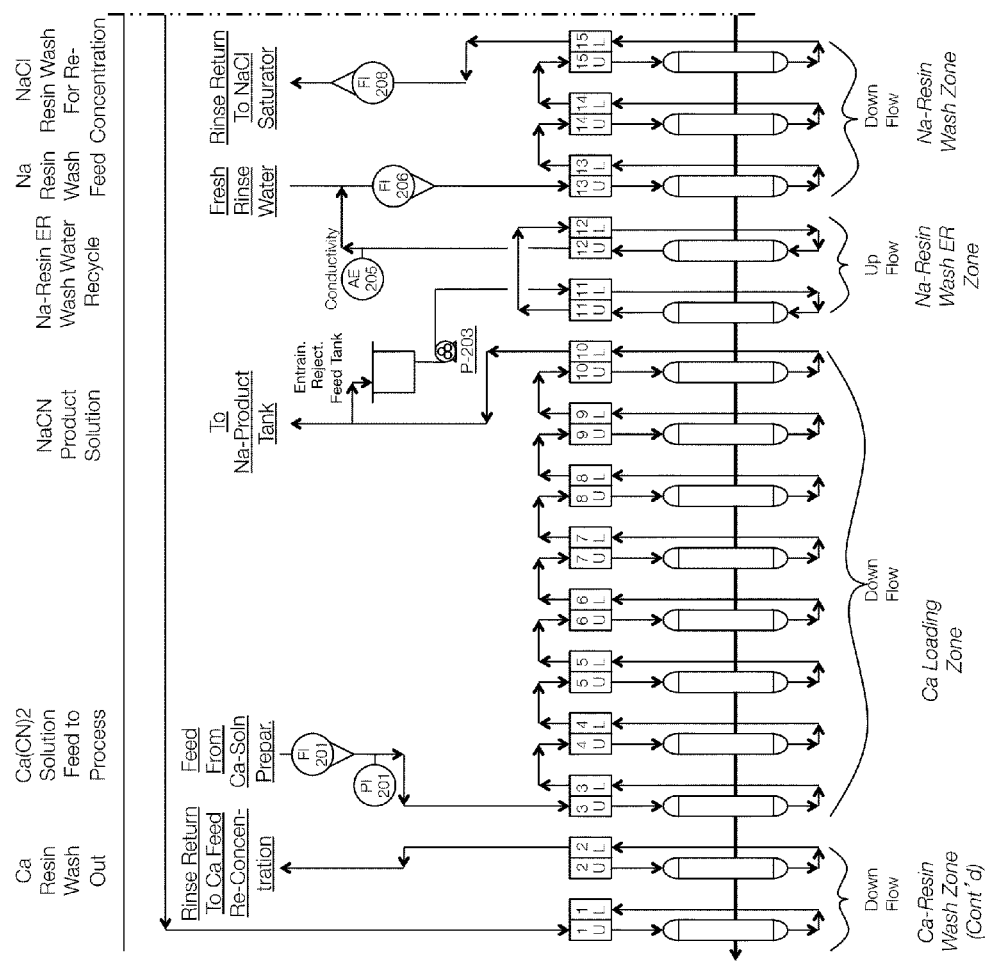
FIG. 9 (illustrated as FIGS. 9A and 9B) shows one specific exemplary configuration of a pilot plant useful in the processes described herein.
Figure 9B:
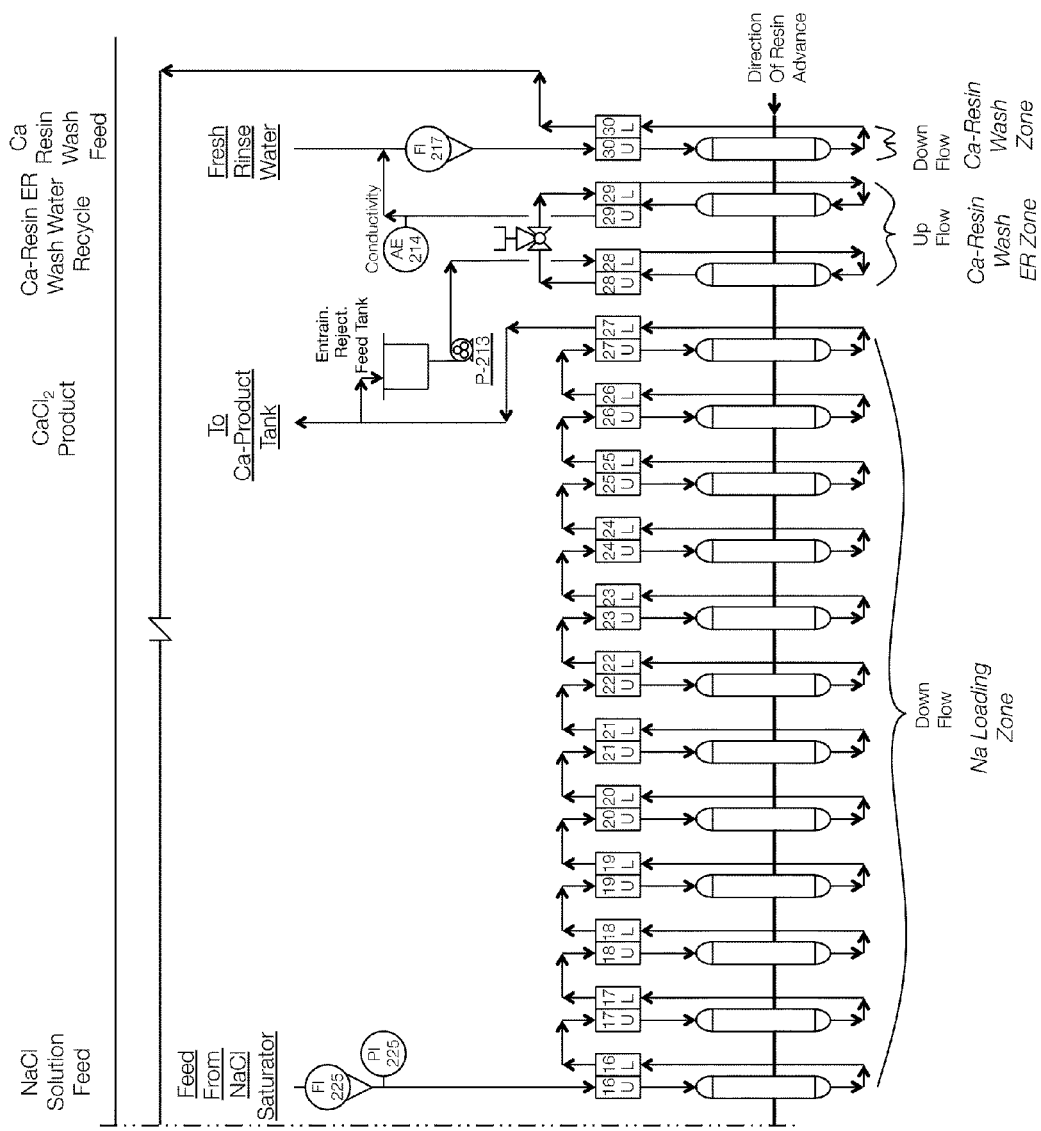

The process described here is a counter current ion exchange metathesis whereby in this example, a solution of calcium cyanide is contacted with an ion exchange media that has been loaded with a positive univalent sodium counter-ion to produce sodium cyanide. FIGS. 8 and 9 show example configurations that were used to demonstrate the process. The resin is advanced counter currently through rinse zone and then to a regeneration zone where the calcium loaded ion exchanger is contacted with NaCl to produce a calcium chloride product while re-loading the ion exchanger with sodium.

The selection of ion exchanger is optimized for the system of feed solutions to the process, choosing Dowex Marathon C (or alternatively, Dowex C-350). In choosing the optimum resin, back mixing of solutions within each stage is reduced by selecting a resin that exhibits low and acceptable shrinkage in concentrated brines. As described above, resin activity, moisture retention, and crosslinking are chosen to provide a separation factor as close to 1.0 as possible. In this case, using a saturated NaCl feed brine, K' is 1.10. The resin bead size of Marathon C is acceptable, though a resin of similar properties with a smaller bead size is also useful.

Highly concentrated products are achieved by operating such that the resin is completely converted to its full capacity from one form to another. Complete conversion avoids, to the greatest extent possible, cross contamination by introducing only the desired resin form into each ion exchange zone. Partial loading of the resin is to be avoided. For this metathesis process to work most efficiently, no ion exchange can be occurring in the column into which feed (regenerant) is introduced. Not choosing to use all of the resin capacity means that it is impossible to meet this requirement and contamination is inevitable. It is recognized that some contamination or other non-ideal conditions will likely occur as the methods are practiced. Although this is not desired, the processes and methods described herein will still work and are intended to be included even with non-ideal conditions.

High purity products are achievable by feeding saturated (or slightly under-saturated to as low as 5.0 M NaCl) sodium chloride regenerating solutions. There is no requirement that the divalent species (i.e., $Ca(CN)_2$) be saturated.

Rinsing of resin leaving the respective loading zones to recover feed solutions using low counter-current wash rates is employed to reduce dilution of products. The theoretical minimum required rinse water is equal to the quantity of mobile solution in each stage. The "mobile solution" is defined as the quantity of solution contained in the interstitial resin void space ($X_r$) plus the associated stage vessel freeboard space plus the stage's associated stationary piping. In this process the quantity of rinse water required to achieve at least 99.99% solute recovery is 120-150% of the resin stage mobile solution. Dilution of the IX product with rinse water from each loading phase eliminated by returning all rinse solution to the feed brine preparation area for re-concentration to full feed strength; rinse waters are not re-combined directly with concentrated feed solution as in other processes. Direct addition (recombination) of rinse solutions with the saturated feed brines is to be avoided in design since it results in dilution of the NaCl feed and shifts the separation coefficient to favor divalent ion absorption and therefore contributes to product impurity. For example NaCl rinse water from the Na-Resin rinse zone are returned to the NaCl feed brine saturator prior recycle into the Na-Loading zone.

This process increases the length of the rinse water entrainment rejection (ER) zone. This allows the resin column that will be advanced into the IX Product position (e.g., Column Nos. 10 and 22 in FIG. 8) to completely fill with IX product solution prior to the product solution leaving the system. Product purity and highest concentration is improved when the resin is saturated in the product brine and all wash water in the column freeboard and interconnecting piping has been displaced, improving both operability and process flexibility and reducing product dilution in both ion exchange products. An entrainment rejection of two stages is preferred over a single stage.

An additional means of controlling back mixing in this process is to include a device, such as bladder at the top of the resin bed that expands down to the top of the resin bed upon contraction in concentrated solutions.

In this process the each brine feed rate is controlled such that, at a minimum, eluted solutes must travel the length of at least two columns between resin advance events. Any eluted solutes that don't travel at least two full columns between switching will be carried with the bulk resin phase and result in or add to product impurity. The width of the residence-time distribution in this process is controlled to be narrow enough that the trailing "tail" does not travel with the resin flow.

EXAMPLES

Background

A pilot plant was constructed concurrent to laboratory investigations. The findings in both laboratory work and early pilot studies were incorporated into pilot plant configuration modifications over the course of program.

The central feature of the Pilot Plant was a 30-Column CCIX apparatus manufactured by Puritech. The apparatus consisted of a 30-position valve that had a total of 120 solution in-out ports that were piped appropriately to 25 mm diameter (1-inch) by 120 cm (47.25 inch), resin filled columns. Columns were clockwise advanced discretely on a time-based interval while solutions were advanced from column-to-column counter-clockwise.

FIGS. 8 and 9 depict one specific, but typical and illustrative, configuration of the pilot plant.

The earliest pilot runs were performed with Dowex 545C resin. After laboratory studies revealed its slow kinetic behavior, it was removed and replaced with Dowex 650C. Later, the resin was replaced with a small-bead diameter version of the same, Dowex C-350, before finally installing a preferred resin, Dowex Marathon-C.

Work with Surrogate Calcium Solutions

It was recognized that, theoretically, pilot testing of $Ca^{++}$/$Na^+$ ion exchange did not require the use of calcium cyanide to acquire pilot data. A substitute solution, calcium chloride, was proposed. In theory, the nature of the co-ion effects little change in the performance of an ion exchange resin. Side-by-side kinetic testing using Na-form Dowex 650C resin was performed to confirm that the use of $CaCl_2$ solutions as a surrogate for $Ca(CN)_2$ would be acceptable. See Table 4.

The measured values of the diffusion coefficient show that performance of the resin is similar irrespective of the identity of the co-ion and therefore, calcium chloride was deemed to be a useful surrogate for calcium cyanide solutions.

Feed Contamination Via Eluted Solute "Bleed-Back"

The countercurrent ("CC") travel of IX resin with respect to feed solution flow in the all of the commercially significant CCIX systems involves, at some point in the process, a discrete advance of a portion of resin from one discrete zone to the next. An unavoidable result is that the solution contained within the resin bed at the time of the switch gets carried with the resin en masse. Of itself, this is not a bad thing, but it should be considered when designing a CCIX system. However, it is important that eluted solutes have a net travel in the direction of liquid flow.

In pilot testing, the problem was manifest in contamination of IX feed with unwanted counter-ions. That is, for example, when regenerating calcium-form resin ($R_2$—Ca) with NaCl solution, backward travel of calcium ions with the resin phase would result in contamination of the NaCl feed solution recovered in the column rinse operation.

There are two primary mechanisms for counter ion contamination in the solution leaving Columns #2 and #15, ultimately contaminating the feeds to Columns #3 and #16;

Excessive Axial Dispersion of Solutes
Non-Optimal Equilibrium Properties of the Resin Axial dispersion sources of solute axial dispersion in the pilot equipment include: (1) Back mixing in the clear solution freeboard above the bed as the resin shrinks in concentrated brine, (2) small diameter tubing gives rise to an unavoidable laminar flow regime that naturally facilitates axial dispersion, which does not occur in larger commercial-scale systems, (3) the ratio of active volume of resin per column versus the total volume of each column system in the pilot was smaller than in commercial-scale systems, (4) the diameter of the columns were small, one inch, making wall effects much more important than they would be in a larger system, and (5) insufficient feed flow rate to support sufficient forward travel of feed and eluted solutes, which is a problem in the manually controlled pilot plant feed system not expected in automatically controlled commercial facilities.

As stated earlier, the equilibrium separation coefficient, K', depends not only on the properties of the resin, but on the solution concentration as well. The value of the separation coefficient K' should be greater than 1.0 for calcium loading on a Na-Form resin
less than 1.0 for loading sodium onto a Ca-Form resin In the pilot program, it was found that the problem of feed contamination was largely absent or minor in the calcium loading zone whereas more significant in the sodium loading zone.

For an ideal CCIX system, ion exchange should be complete to 100% by the time that the column to which the feed is being introduced is advanced out of the feed solution's loading zone. Referring to the "IX Skid Piping Connection Diagram" in FIG. 9, resin advancing from Column Position #3 to #2 (or from Position #16 to #15) must be completely converted. In order to achieve purest products and highest resin utilization efficiency, when the column advances from #3 to #2, the resin should be of the form $R_2$—Ca (uncontaminated with R—Na) and the solution in the column should be $Ca(CN)_2$ only. This requirement assures that no ion exchange will happen at the point of feed brine introduction in Column #2. If there is sodium-form resin remaining when the resin enters the feed position, #2, ion exchange continues to occur and as a result, the feed solution that is recovered from #2 will be contaminated with sodium. Any contaminated rinse solution ultimately is recycled to Column #3 and leads to inefficiency in resin utilization and impurities in the product.

A significant portion of the pilot work was spent on understanding the cause and means for remedying undesirable travel of eluted solutes with solution that is entrained (carried with) the resin. The following improvements were made to reduce solute bleed feed contamination:

Reduce Freeboard as Much as Possible

When initially loading the resin into the small diameter columns, the resin does not pack (orient) itself ideally. After the columns have been gone through a few shrink-swell cycles, the resin settles into a better packing arrangement, the columns are no longer "full" and the persistent void that develops is larger than need be. It was found that it was required to "top-off" the columns at least two times after the initial filling to get the columns close to properly filled. The columns should be filled with resin that has been converted to its lowest bulk density form before loading, namely sodium-form resin in fresh water. Freeboard in commercial resin columns should be minimized or eliminated by loading columns to full capacity with rinsed sodium-form resin. Commercial systems, owing to much larger resin cell diameter, are considerably less difficult to fill to their proper capacity.

Reduce Non-Active Volume as Much as Possible

In the pilot plant, the ends of each column, had an empty void. To reduce this non-active column volume, each void was filled with polypropylene BB's, reducing the void by 60-70%. In commercial columns, shallow-dish heads (e.g., 2.5:1) can be employed with bed-retaining (or hold-down) screens fitted to the column nozzles. Nozzles should be over-sized, as is evident to those familiar with packed-bed hydraulic engineering calculations, to minimize pressure drop at the entrance and exit of each column.

Reduce Interconnect Tubing Diameter

In pilot plant operations, there was nothing to be done about axial dispersion due to laminar flow in the interconnect tubing within the IX Unit; there is no practical velocity to pump the solution at to achieve plug flow. However, since the Puritech unit was shipped with 6 mm ID (0.235 in.) tubing throughout, and since that tubing was found to be significantly over-sized, the tubing was replaced with 0.13 inch ID tubing which reduced the non-active volume by a factor of nearly four as well as increasing the velocity. The non-active volume in commercial interconnect piping should be made as small as practical and will represent an even smaller fraction of non-active IX system volume.

Reduce Internal Back-Flow Upon Indexing

Since the configuration of IX columns had sections with differing numbers of columns in series (See piping schematic in FIG. 8) and differing flow rates depending upon service, the maximum pressure in each section was different. Upon indexing, the columns are all (briefly) hydraulically connected to one another. So, upon index, the pressure in all columns equalize when high pressure columns dump some of their solution into low pressure zones. This uncontrolled flow of material includes some degree of back-flow in each of the loading zones.

The problem was addressed by adding equipment and instrumentation to stop all in-flow and out-flow of solution during the index interval (about one second). This included adding backpressure regulators on the Entrainment Rejection discharge ports and solenoid shut-off valves on the Product Discharge ports (activated upon the initiation of the Puritech Multi-port Valve positioning drive). This is an important issue in the design of the commercial system, as it appears that the commercial valve will exhibit the same behavior.

Application of the Proper Resin Choice

The ideal resin has properties such that an equilibrium separation coefficient, K', of unity can be achieved. This property is a nascent issue in the industry as far as known. Some useful choices for the IX metathesis process were Dowex Marathon-C or alternatively Dowex C-350 (or similar) because of its very fast kinetics and having a value of K' that is only slightly further away from unity.

Apply the Proper Solution Concentration

As stated earlier, it is easier to achieve conditions that favor calcium absorption irrespective of resin choice. For loading sodium onto a calcium form resin, the best environment for loading is a sodium chloride solution that is at or very near saturation (e.g., greater than 5.4 N, or 26.4 wt. %).

Resin Utilization

As stated earlier, highest purity, highest concentration, and highest utilization efficiency is only achievable when complete conversion of resin from R—Na to $R_2$—Ca and vice versa is achieved. This approach requires a large volume of resin inventory in the system than a lesser approach. Using smaller diameter resins that have acceptable chemical/physical properties, for example, the nominal 350-micron diameter Dowex C350, can reduce total resin volumetric requirements.

Figure 5:
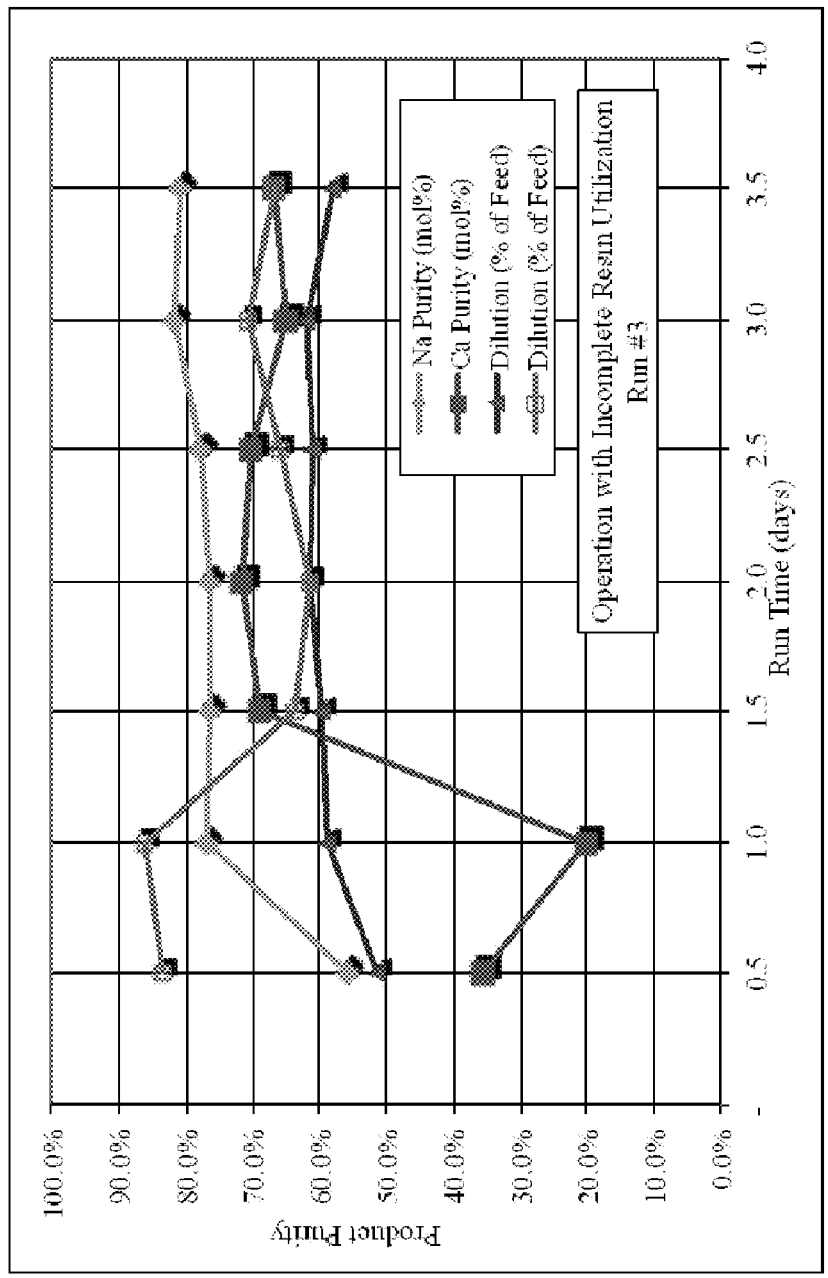
FIG. 5 shows exemplary Resin Utilization and Product Dilution.
Figure 6:
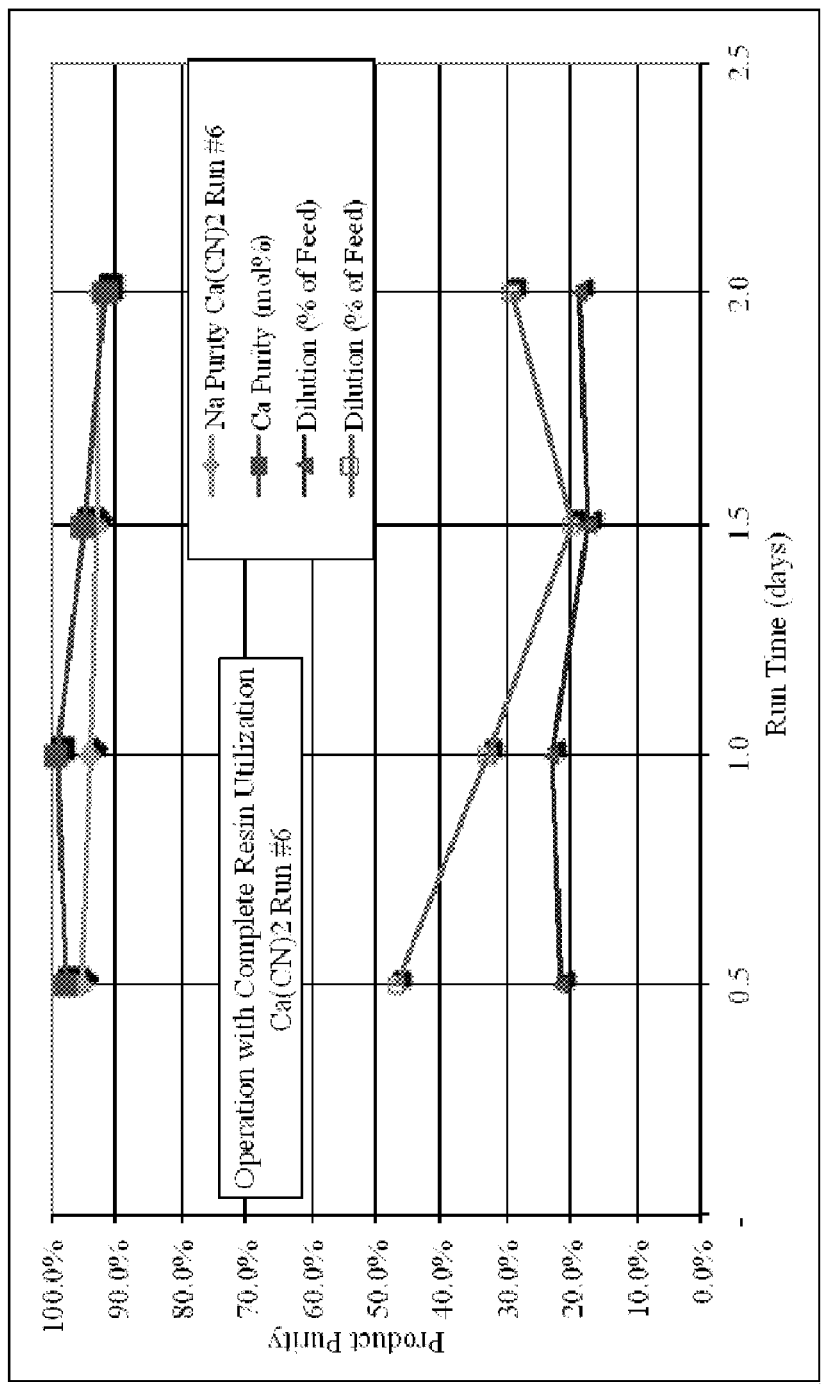
FIG. 6 shows exemplary Resin Utilization and Product Dilution in a Ca(CN)2 Run.
Figure 7:
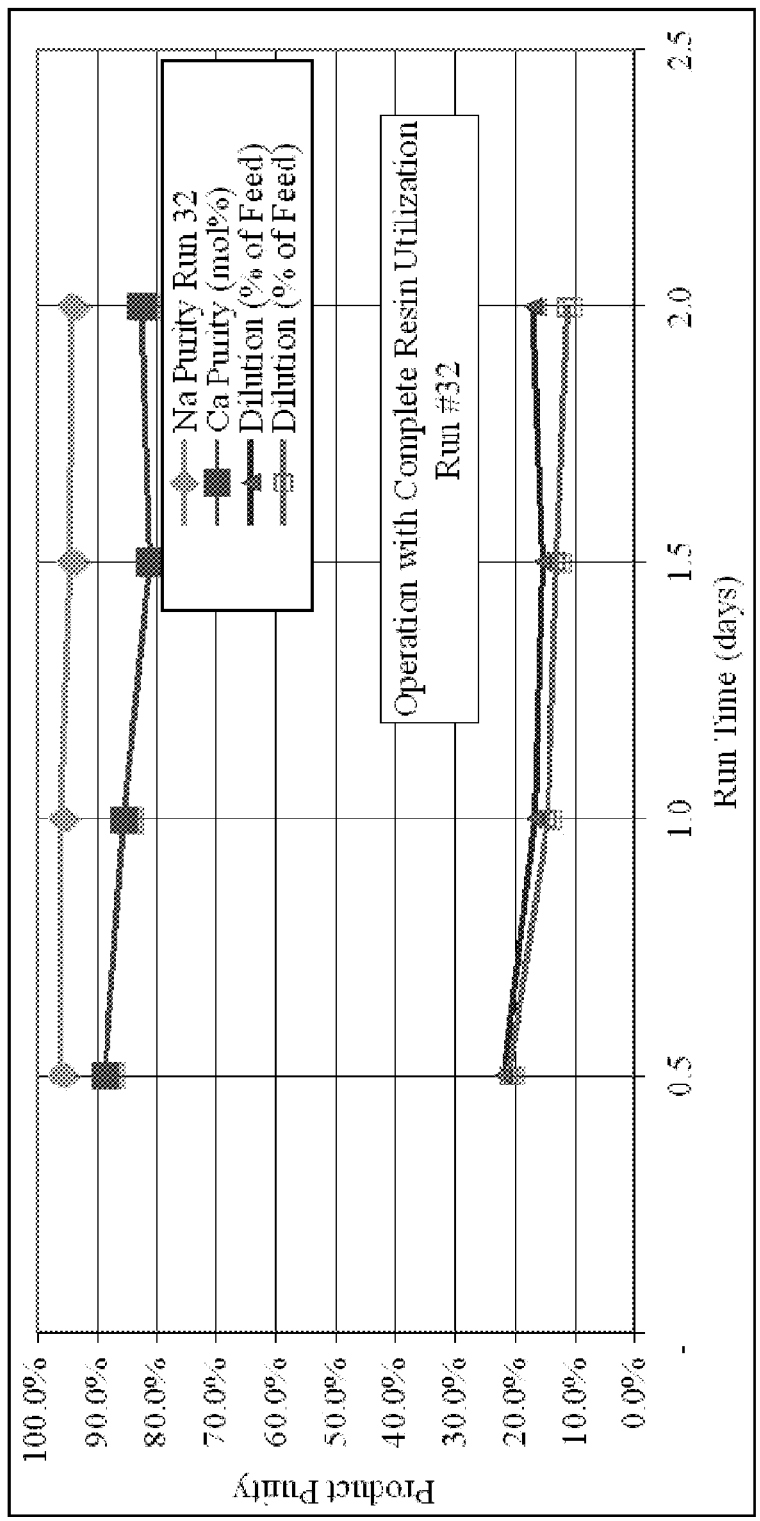
FIG. 7 shows exemplary Resin Utilization and Product Dilution results.

Incomplete resin utilization results in both lower product concentration and lower product purity. FIG. 5 shows the effect of operating at conditions where resin utilization (Run #3) was less than 100%. Product purity "lined-out" poorly at 80% NaCN and 65-70% CaCl2. For comparison, FIGS. 6 and 7 show significantly better product purity when targeting 100% resin utilization. The product purity and product dilution are plotted together vs. run time.

In Run #3, the feed solution rates were held at somewhat more than half the countercurrent resin advance rate and solutes were advanced forward with the resin with elevated rinse rates. As a result, the resin leaving a loading zone would contain a mixed-form resin that had concentrations of both calcium-form ($R_2$—Ca) and sodium-form (R—Na) resin. When the resin advances into the next zone, product contamination is unavoidable. Since the resin is not being completely utilized, lower product concentration is a consequence because the resin has a lower effective activity; By running the process at a lower operating activity, Eq. 12 for maximum concentration applies, undesirably, resulting in a more dilute product.

In FIG. 6, the pilot plant was operated with concentrated calcium cyanide feed (ca. 4.3N) and saturated sodium chloride regeneration. Product purity is above 90% and product dilution with rinse water was 20-30%.

Listed with FIG. 6 is a table of measured resin utilization, calculated from material balance of molar quantity of solutes in solution fed/eluted and the resin rate. The discrepancy between utilization and activity is in part due to uncertainties in the quantity of resin in each column when placed in concentrated brine service and analytical uncertainty.

Run 32, in FIG. 7, shows lower levels of product dilution and higher sodium product purity. Calcium product purity was reasonable at between 80 and 90% due, mainly to over-feeding of sodium chloride feed, which contaminated the calcium chloride product with NaCl.

In Runs #32 and $Ca(CN)_2$ Run #6, the target flow rates of both the calcium and the NaCl feeds were set to match the molar countercurrent resin advance rate. When operating this way, the main cause of impurities is either over- or under-feeding solution to the ion exchanger. Since this pilot plant was largely a manual operation (without feedback controls), matching the feed solution rate to the resin rate was very difficult. Nonetheless, the figures show the marked improvement in both product purity and product concentration (low dilution).

In Run #32, overfeed of NaCl caused $CaCl_2$ product purity to fall off as the run progressed, but the sodium product purity stayed high because the feed and resin rates happened to be fairly closely matched. Run #32 shows that product dilution was and can be controlled. In Ca(CN)2 Run #6, there was less overfeed of both $Ca(CN)_2$ and NaCl, resulting in good product purity, In this run however, no special measures to prevent product dilution were made; even so, product dilution was significantly less that in the Run #3 case.

Rinsing Efficiency

Rinsing efficiency was found to be very good and is the result of the physical chemistry of ion exchange resins.

Referring to the Piping Schematic in FIG. 8, a column leaving the feed loading zones, (Column switching from position #3 to position #2 or position #16 to #15), contains fully loaded resin plus fresh feed (e.g., $R_2Ca$ and calcium cyanide feed solution) in the resin and interstitial voids.

The $Ca(CN)_2$ feed solution is effectively displaced from the resin with a single displacement volume of rinse water. Additionally, mobile feed solutes in the resin itself are effectively rejected from the bead interior when the resin swelling pressure increased in fresh water. The accompanying increase in the Donnan potential rejects unabsorbed ions into the bulk solution, which are then swept away with the balance of the recovered feed solution.

In pilot plant operations, process conductivity meters were used to monitor the rinse and were calibrated with distilled water and 20,000 µS calibration standards. Properly applied rinsing achieved removal of all solutes typically down to less than 25 micro-siemens or 0.001 wt. %, expressed as NaCl. When rinse rates are properly applied, recovered feed solution is diluted by between 20 and 30%. Since water must be added to the feed that is recovered with the rinse in order to provide fresh feeds, the IX metathesis the process easily tolerates this degree of dilution.

Dilution Control in Recovered Feed Re-Concentration

Feeds are introduced to the loading sections for each $Ca(CN)_2$ and NaCl at full strength, undiluted. The feed that is recovered in the resin rinse zones is returned for re-concentration before recycling back to the loading feed zones. No dilution of products is expected as a result of rinsing.

Dilution Through Wash Water Entrainment Rejection

A significant cause for dilution of product solutions arises when a column enters the loading zone, filled with rinse water. (Refer to the Piping Schematic in FIG. 8). Unless rinse water is removed from a column entering Position #10 (or Position #27), the contained rinse water will mix with the product, diluting it.

The means of preventing dilution with entrained rinse water is to reserve 2-3 columns to provide for a Wash Water Entrainment Rejection zone where an amount of product solution is used to displace and replace the wash water with product. In a preferred embodiment, two columns should be provided to allow a more complete displacement of wash water and obviate break-through of product solution into the recovered wash water. The most effective rejection includes a zone that not only rejects rinse water by displacement, but also saturates the bead with product solution.

Dilution in the commercial process is expected to be in the neighborhood of 10%, leading to $CaCl_2$ concentrations of 21-22 weight percent and NaCN concentrations in the neighborhood of 20-21 weight percent. The Table 5 below includes run data that compares feed and product concentrations.

TABLE 5

Performance Data: Percent Dilution, Product Purity, Product Concentration

| | | Run #30 | Run #30 | Run #31 | Run #31 | Run #32 | Run #28 |
|---|---|---|---|---|---|---|---|
| | | | | Day of Run | | | |
| | | Day # 2 | Day # 2 | Day # 2 | Day # 3 | Day # 4 | Day # 3 |
| Calcium Loading Zone | | | | | | | |
| Ca(CN)2 (Equiv.) Feed | (wt. %) | 20.5% | 20.5% | 20.5% | 20.7% | 20.5% | 22.9% |
| NaCN (Equiv.) Prod. | (wt. %) | 20.2% | 20.1% | 19.3% | 19.4% | 18.7% | 19.8% |
| Ca++ Feed | (eq/L) | 5.05 | 5.05 | 5.05 | 5.10 | 5.05 | 5.71 |
| Na+ Product | (eq/L) | 4.57 | 4.55 | 4.34 | 4.37 | 4.19 | 4.47 |
| Na Product Dilution | (%) | 9.6% | 10.0% | 14.2% | 14.3% | 17.1% | 21.8% |
| Na Product Purity | (% Na) | 89.0% | 93.4% | 98.5% | 96.3% | 94.9% | 91.3% |
| Sodium Loading Zone | | | | | | | |
| NaCl Feed | (wt. %) | 26.0% | 26.6% | 26.0% | 26.0% | 26.2% | 25.7% |
| CaCl2 Prod. | (wt. %) | 20.6% | 20.6% | 21.5% | 22.5% | 22.1% | 21.4% |
| Na+ Feed | (eq/L) | 5.35 | 5.48 | 5.35 | 5.35 | 5.38 | 5.26 |
| Ca++ Product | (eq/L) | 4.39 | 4.41 | 4.63 | 4.89 | 4.78 | 4.59 |
| Ca Product Dilution | (%) | 17.9% | 19.6% | 13.5% | 8.7% | 11.1% | 12.7% |
| Ca Product Purity | (% Ca) | 84.3% | 87.1% | 77.4% | 73.0% | 80.3% | 92.3% |

* In the above pilot runs, product dilution was controlled in the Wash Water Entrainment rejection zone (See FIG. 2). The consistency of this operation was limited due to the manual nature of its control. The runs shown in the table did not use an $Ca(CN)_2$ feed, rather, a calcium chloride surrogate solution was used instead.
The term "Equiv." in the table is used to denote the equivalent calcium cyanide feed concentration.

As shown earlier (Maximum Product Concentration), product dilution due to wash water entrainment rejection will be less than 15% and probably in the range of 10% or less.

Solution Travel (Solution-Resin Treatment Ratio)

For highest purity products, the molar flow rate of ion exchange sites must match the molar counter-flow rate of exchangeable ions. This makes the solution-to-resin treatment ratio fixed. In a CCIX process the "solution travel" requirement between indexes represents an important constraint. "Solution travel" is defined here as the distance that a differential element of solution travels through an aggregate length of resin bed over the interval between advance of a fixed volume of resin (i.e., movement of a resin column). At a minimum, solution must travel two full columns in order for the exchanged ions to be advanced in the proper direction.

Table 6 below illustrates the effect of several variables on solution travel:

Rows 2-7 include the calculation basis and relevant properties. A liter of resin contains 0.32 liters of void volume and 0.26 liters of solution inside the bead.

Row 8 shows the treatment ratio (i.e., the volume of solution per volume of volume of resin), which is based upon matching the molar quantity of resin with the molar quantity of exchangeable ions in solution.

Row 12 gives the feed solution flow rate required to enter the ion exchange beds (Rows 10+11) assuming no shrinkage occurs. Row 9 gives the amount of solution that gets carried counter-currently with the resin. This amount must be added to the feed solution to replace the solution that is entrained with the resin. It is assumed that no ion exchange is taking place in the column where the feed is introduced.

Row 17 gives the feed solution flow rate required to enter the ion exchange beds when a clear solution freeboard void forms upon shrinkage (Rows 11+15+16)

Row 18 gives the feed rate required if the resin shrinks, but the void is eliminated.

Row 20 gives the number of columns that an element of solution will travel before a liter of resin is advanced if there was no shrink-swell cycle. (This does not happen.)

Row 21 gives the solution travel when a clear solution freeboard develops above the resin. Solution travel is significantly reduced. In addition, the freeboard gives significant opportunity for Back mixing, and thus increased axial dispersion.

Row 22 gives the solution travel if a means of eliminating the freeboard after a resin were developed; solution travel would be greatly enhanced. (Underscoring the importance of column design in this process.)

The solution travel calculation does not take Back mixing into account in Row 21. If nothing is done to prevent Back mixing in the freeboard, it may be advantageous to dilute the NaCl feed to something less than 5.4 N.

TABLE 6

Calculation of Solution Travel

| | | Ca(CN)2 | NaCl |
|---|---|---|---|
| (1) | Calculation Basis: | | |
| (2) | IX Resin Flow (Lr/min) | 1.0 | 1.0 |
| (3) | Column Advance Interval (min) | 1.0 | 1.0 |
| (4) | Resin Bed Void Fraction (Lv/Lr) | 0.36 | 0.36 |
| (5) | Resin Bead Liquid Fraction (Ls/Lr) | 0.26 | 0.26 |
| (6) | Solution Concentration (eq/Ls) | 5.00 | 5.40 |
| (7) | Resin Activity (eq/Lr) | 2.18 | 2.18 |
| (8) | Treatment Ratio (Ls/Lr) | 0.44 | 0.40 |
| (9) | Calc. of Feed Soln Rate (Neglecting Shrinkage) | | |
| (10) | Feed in Resin Counter-Flow (Ls/min) | 0.62 | 0.62 |
| (11) | Net Solution Flow (Ls/min) | 0.44 | 0.40 |
| (12) | Total Solution Rate (Ls/min) | 1.06 | 1.02 |
| (13) | Calculation of Solution Rates with Shrinkage | | |
| (14) | Shrinkage (%) | 7% | 7% |
| (15) | Freeboard Volume (Ls/min) | 0.07 | 0.07 |
| (16) | Feed in Bed (Ls/min) | 0.58 | 0.58 |
| (17) | Total Feed Rate (Ls/min) | 1.08 | 1.05 |
| (18) | Feed Rate w/Shrinkage, w/o (Ls/min) Freeboard | 1.01 | 0.98 |
| (19) | Solution Travel Between Index | | |
| (20) | Assuming No Shrinkage (no of cols) | 2.93 | 2.84 |
| (21) | Shrinkage w/Freeboard (no of cols) | 2.52 | 2.44 |
| (22) | Shrinkage w/o Freeboard (no of cols) | 2.81 | 2.72 |

Key:
Lv = Liters of Void Vol,
Ls = Liters Solution,
Lr = Bulk Liters Resin

When axial dispersion is substantially eliminated, or significantly reduced, and the separation coefficient is near unity, then solution travel will be sufficient to carry all eluted solutes forward with solution flow rather than backward with resin-phase.

Laboratory Program

Background: Ion Exchange Resin Evaluation/Selection

The following strong-acid cation (SAC) resins were procured early in the program, thought to be promising candidates: Dowex 545C, 575C, and 650C. Additionally, a weak-acid cation (WAC) resin, Dowex MAC-3 was procured for its apparent high activity. The pilot was first loaded with 545C for its high activity with the goal of achieving very high ion exchange product concentration. Subsequent laboratory testing found it was not the best performing resin due to slow kinetics and unfavorable equilibrium properties.

As knowledge developed regarding behavior in high concentration solutions from both laboratory and pilot work, the following additional resins were added to the study: M-31 (macroreticular SAC), C-350, Marathon-C, and 99 Ca/320.

Early Work (Break-Through Analysis)

The earliest kinetic studies on IX resins involved attempts to run standard "break-through" analysis. Breakthrough tests are normally applied to dilute processes. The solution strength used in this IX metathesis process is 2½ to 5 times stronger than that of even the regenerant solutions in typical IX processes. Because of these factors, the "small column" kinetic tests described earlier in this document were performed instead of breakthrough analysis.

Advances in Resin Analytical and Kinetic Methods

Figure 4:
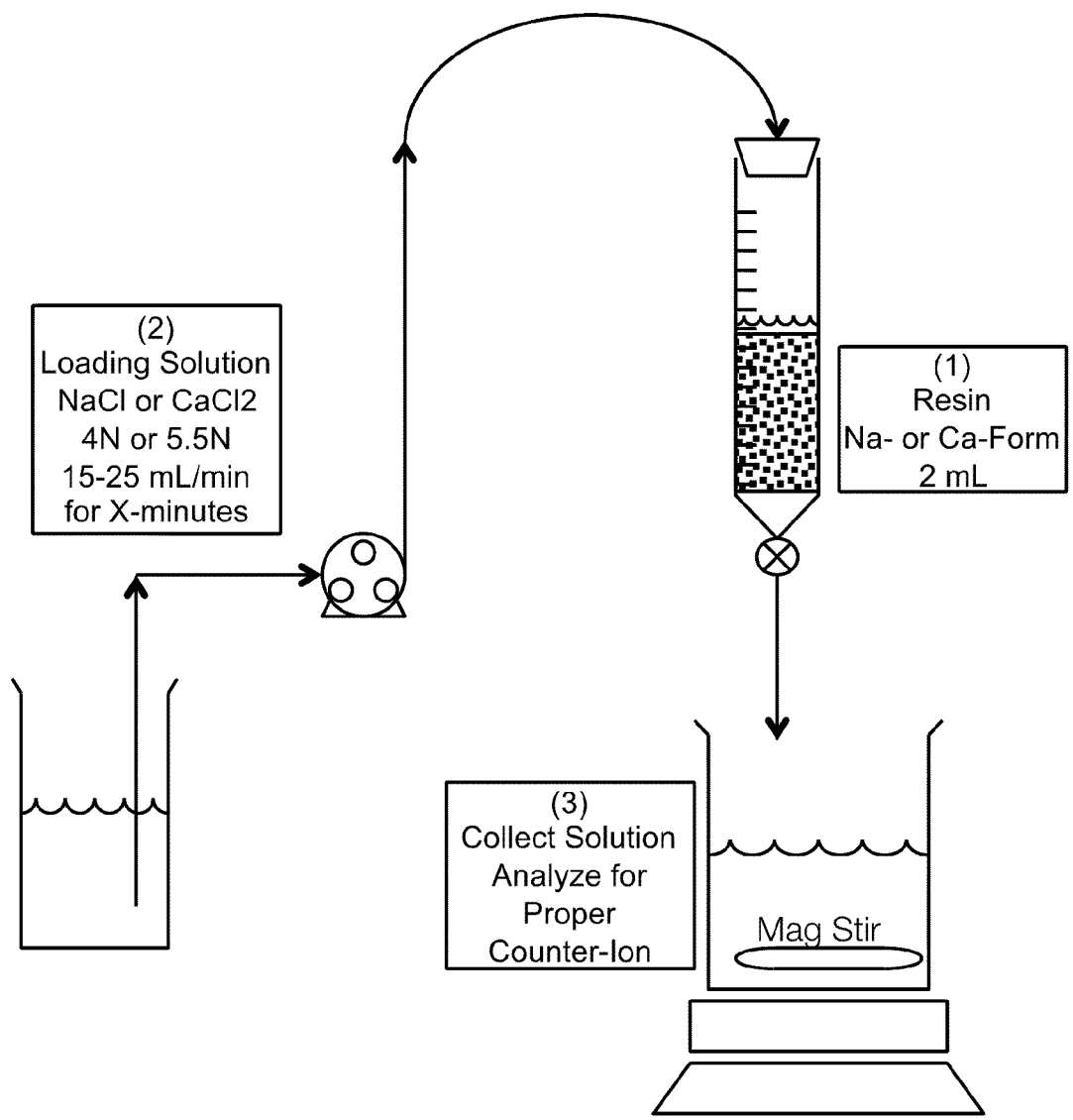
FIG. 4 provides one exemplary schematic of a laboratory IX Kinetic Apparatus.

The results presented below arise from small-column kinetic tests using the apparatus described in FIG. 4. The method of the test is summarized as follows:

a. A small column is loaded with an accurately measured 2 mL of ion exchange resin that has been prepared to be 100% in one of the two forms: univalent or divalent.

b. A solution of the appropriate counter-ion was pumped through the resin for a prescribed amount of time. The solution strength and flow rate was chosen such that the solution concentration both into and out of the column was for all purposes, the same.

c. The effluent solution was collected, volume recorded, and then analyzed for the eluted counter-ion. The total amount of counter-ion recovered from the resin was then used to compute fractional conversion of the resin.

d. The experiment was repeated at 2-4 different run-times. Values with knowledge of the conversion and total contact time in the flow system, a value of τ could be computed. Once τ was known, the other properties, namely, $K_d$, $D_e$ could be computed.

Another laboratory test that was performed for each resin was the Activity (or capacity) in milli-equivalents of resin active sites per milli-liter of bulk resin. Although a reasonable guess could be made from the vendor nameplate value, vendor specifications are, according to the vendor, nominal only and actual measured values from the actual resin samples were recommended for the kinetic calculation. Activity was determined for resins that were received in their proton forms by immersing a known volume resin into a stirred solution with a known quantity of NaOH.

An example of the data entry and computation sheet for the kinetic tests (with results for Dowex 650C) is shown in Table 7 below:

TABLE 7

Kinetic Data Sheet with Data for Tests with Dowex 650C

Sodium Loading on a Ca-Form 650C Resin

| Loading Soln: | | (meq NaCl) | | 4.0 | Resin Qty: | (mL) | | 2.0 |
|---|---|---|---|---|---|---|---|---|
| Resin: | 650C | Resin Activity | | 2.32 | Flow Rate | (mL/min) | | 25 |

| Time (min) | Ca++ Assay (mg/mL) | Sample Vol. vol (mL) | Ca++ (mg) | Ca++ (meq) | % loading X | (1 − X) | Tau (D) | $K_D$ |
|---|---|---|---|---|---|---|---|---|
| 6 | 0.321 | 153 | 49.113 | 2.455 | 52.9% | 47.1% | 47.62 | 190.5 |
| 12 | 0.217 | 300 | 65.1 | 3.254 | 70.1% | 29.9% | 46.70 | 186.8 |
| 24 | 0.131 | 610 | 79.91 | 3.995 | 86.1% | 13.9% | 50.75 | 203.0 |
| 36 | 0.096 | 920 | 88.32 | 4.415 | 95.2% | 4.8% | 51.57 | 206.3 |

Calcium Loading on a Na-Form 650C Resin

| Loading Soln: | | (meq CaCl2) | | 4.0 | Resin Qty: | (mL) | | 2.0 |
|---|---|---|---|---|---|---|---|---|
| Resin: | 650C | Resin Activty | | 2.32 | Flow Rate | (mL/min) | | 25 |

| Time (min) | Na+ Assay (mg/mL) | sample vol (mL) | Na+ (mg) | Na+ (meq) | % loading X | (1 − X) | Tau (D) | $K_D$ |
|---|---|---|---|---|---|---|---|---|
| 2 | 0.42 | 102 | 42.84 | 1.863 | 40.2% | 59.8% | 30.09 | 120.4 |
| 6 | 0.216 | 305 | 65.88 | 2.866 | 61.8% | 38.2% | 32.56 | 130.2 |
| 12 | 0.138 | 615 | 84.87 | 3.692 | 79.6% | 20.4% | 32.62 | 130.5 |
| 24 | 0.084 | 1200 | 100.8 | 4.385 | 94.5% | 5.5% | 35.50 | 142.0 |

Sodium Loading on a Ca-Form 650C Resin

| Loading Soln: | | (meq NaCl) | | 5.4 | Resin Qty: | (mL) | | 2.0 |
|---|---|---|---|---|---|---|---|---|
| Resin: | 650C | Resin Activty | | 2.32 | Flow Rate | (mL/min) | | 25 |

| Time (min) | Ca++ Assay (mg/mL) | Sample Vol. vol (mL) | Ca++ (mg) | Ca++ (meq) | % loading X | (1 − X) | Tau (D) | $K_D$ |
|---|---|---|---|---|---|---|---|---|
| 12 | 0.155 | 320 | 49.6 | 2.480 | 53.4% | 46.6% | 93.01 | 502 |
| 24 | 0.110 | 600 | 66 | 3.299 | 71.1% | 28.9% | 89.98 | 486 |

Calcium Loading on a Na-Form 650C Resin

| Loading Soln: | | (meq CaCl2) | | 5.5 | Resin Qty: | 2 | | (mL) |
|---|---|---|---|---|---|---|---|---|
| Resin: | 650C | Resin Activty | | 2.32 | Flow Rate | (mL/min) | | 25 |

| Time (min) | Na+ Assay (mg/mL) | sample vol (mL) | Na (mg) | Na+ (meq) | % loading X | (1 − X) | Tau (D) | $K_D$ |
|---|---|---|---|---|---|---|---|---|
| 12 | 0.24 | 290 | 69.6 | 3.028 | 65.2% | 34.8% | 56.56 | 311 |
| 24 | 0.145 | 595 | 86.275 | 3.753 | 80.9% | 19.1% | 62.06 | 341 |
| 12 | 0.236 | 290 | 68.44 | 2.977 | 64.2% | 35.8% | 59.07 | 325 |
| 24 | 0.137 | 595 | 81.515 | 3.546 | 76.4% | 23.6% | 73.49 | 404 |

The table shows the accepted/observed value of resin capacity (as Na-Form), the concentration of the solution feed to the resin, and resin particle diameter. The quantities $K_d$ and $\tau$ are computed from the pore-diffusion model kinetic equations, Eq. 13 and Eq. 14.

The results show values of $\tau$ and Kd that are nearly constant for the test conditions, confirming that the kinetic rates are pore diffusion limited.

It is interesting to note that the results for Dowex 99 Ca/320, which shrinks significantly over during conversion and shows increasing $\tau$ and $K_d$ with conversion. It shows that the resin properties actually change as the resin loses free water on loading, which increases the diffusion coefficient, which is manifest in the variable $K_d$. See Table 8 below:

TABLE 8

Non-Linear "$\tau$" and "$K_d$" in Dowex 99 Ca/320:

Sodium Loading on a Ca-Form Dowex 99-Ca/320 Resin

| Loading Soln: | | (meq NaCl) | | 4.15 | Resin Qty: | (mL) | | 2.0 |
|---|---|---|---|---|---|---|---|---|
| Resin: | 99-Ca/320 | Resin Activty | | 1.920 | Flow Rate | (mL/min) | | 25 |

| Time (min) | Ca++ Assay (mg/mL) | Sample Vol. vol (mL) | Ca++ (mg) | Ca++ (meq) | % loading X | (1 − X) | Tau (D) | $K_D$ |
|---|---|---|---|---|---|---|---|---|
| 3 | 1.365 | 44 | 60.06 | 3.002 | 78.2% | 21.8% | 8.59 | 36 |
| 9 | 0.520 | 134 | 69.68 | 3.483 | 90.7% | 9.3% | 15.78 | 65 |

TABLE 8-continued

Non-Linear "τ" and "$K_d$" in Dowex 99 Ca/320:

| 3 | 1.390 | 44  | 61.16  | 3.057 | 79.6% | 20.4% | 8.14  | 34 |
| 9 | 0.526 | 134 | 70.484 | 3.523 | 91.8% | 8.2%  | 15.08 | 63 |

Resin Evaluation Discussion

Dowex MAC-3 was chosen for evaluation purely for its high activity (3.8 eq/L in H-Form). Since it is a weak acid cation exchanger, when converted to the Na-Form, it shrinks significantly . . . by a little better than 70%, making its activity similar to the strong acid cation resins; about 2.2 eq/L. Because of the swings in resin volume between the four resin states the resin was not tested further.

Dowex 545C was chosen for testing due to it being the highest strong-acid cation resin (2.5 eq/L in H-Form). In addition, it is a highly cross-linked resin and, with the high activity, therefore experiences a relatively smaller degree of shrink/swell behavior. This resin was installed in the Pilot Plant IX apparatus, before it was found to have other unfavorable kinetic and equilibrium properties. 545C's high capacity, while allowing for production of very highly concentrated solutions, also gave rise to slow kinetics. The structure leads to a very tightly constrained structure that retains very little free water and results in a relatively low diffusion coefficient. The result was that this resin had unacceptably slow kinetics. The high activity of 545C also leads to unfavorable equilibrium in strong solutions, showing a relatively stronger favoritism for calcium.

Dowex Monosphere 650C was chosen for its reasonably high capacity (nominally 2.2 eq/L in Na-Form), uniform particle distribution, swelling characteristics, and durability. Its particle size is normal for commercial uniform particle resins, but is on the large side for the IX metathesis applications. It was used in the pilot plant to replace the 545C that was originally installed.

Dowex 575C was chosen for testing as a compromise between 545C and 650C, with a value of resin activity right between the two at nominally 2.35 eq/L. The kinetics were similar, if somewhat slower than 650C, particularly with regard to sodium loading. Its particle size is somewhat smaller and improves kinetics, but it was not studied further because of its high activity and unfavorable equilibrium properties.

Dowex M-31 was chosen in order to determine whether a macroreticular (macroporous) resin might provide improved kinetics at high concentrations due to its more open structure coupled with its high degree of cross-linking. Its behavior was different compared to others tested (all gel-type). It was determined that the macropores can become fouled if lime or other salts were to be precipitated in the ion-exchanger. This does not happen in the gel-type resins because the passageways are a couple of magnitudes smaller and the co-ions are largely excluded.

Dowex C-350 appears to have properties that are very similar to 650C, but is about half the diameter. As expected, the loading kinetics were measured to be roughly four times faster. Although it exhibits a similar preference for calcium at the solution strengths in the process, the loading rate was expected to improve or eliminate bleed of calcium with the sodium-loaded resin. It was found that that was not the case.

Dowex Marathon C was chosen for its somewhat lower activity in order to more closely match the NaCl feed solution concentration. It was chosen with the expectation that it would have more favorable equilibrium properties. Indications from laboratory and pilot studies seem to confirm this. Pilot testing confirmed that it would be suitable for commercial use. If this resin were available in a smaller diameter, similar to C-350, it would be the optimum resin for commercial applications.

Dowex 99 Ca/320 has a 320 micron particle size and a proton activity of 1.5 eq/L. It has a lower degree of cross-linking than the other resins tested and shows considerably greater shrinkage (about 20% between the washed and brine-saturated conditions.) The bead size is also very small, 0.320 mm and exhibited lightning-fast kinetics, particularly at the onset of loading. It has a large magnitude of the shrink-swell cycle, however.

Included below in Tables 9-17 are results of some of the pilot plant data collected from equipment configured per FIGS. 8 and 9. In Tables 9 through 15, the process of this invention was demonstrated using calcium chloride as the divalent IX metathesis feed and sodium chloride was used as the univalent IX feed.

Using Table 11 as the example:
1. Each set of columns of data represents daily data taken from pilot operations, normally after having been operated at target conditions starting the previous day. For example, Run #9 started on April 26 and the first set of full measurements were taken on April 27, after running overnight.
2. "Ca++Feed/Na+ Product Concentrations": The first eight lines of data give the concentrations in grams/liter (or equivalently, mg/mL) and gram-mol/L (or equivalently, millimol/mL) for the univalent and divalent species in both IX feed and product solutions for the Divalent Ion Loading on Univalent-Loaded Resin.
3. "Na+ Feed/Ca++ Product Concentrations": The second eight lines of data give the concentrations in grams/liter and gram-mol/L for the univalent and divalent species in both IX feed and product solutions for the Univalent Ion Loading on Divalent-Loaded Resin.
4. "Liquid & Resin Rates": The third block of eleven lines of data list flow rate data in mL/min for solution rates and the number of seconds between counter-current column advance steps. Each column is 1200 mm long by 25 mm in diameter.
5. Ca++ Feed/Na+ Product Molar Flows: The fourth block of five lines of data give the calculated molar flow rates of the divalent feed and univalent products from the above concentration and rate data.
6. Na+ Feed/Ca++ Product Molar Flows: The fifth block of five lines of data give the calculated molar flow rates of the univalent feed and divalent products from the above concentration and rate data.
7. The resin rate is calculated from the volume of resin in each column divided by the "Step Time".
8. From material balance calculation of flows given above, the rows "Calcium/Sodium Loaded" has the quantity of divalent (calcium) loaded in the divalent loading zone in the left-hand cell and the quantity of univalent (sodium) loaded onto the resin in the right-hand cell.
9. From material balance calculation of flows given above, the rows "CaCl2/NaCl Unloaded" has the quantity of divalent (calcium) eluted from the univalent loading zone in the left-hand cell and the quantity of univalent (sodium) eluted from the resin in the right-hand cell.
10. The final two rows are used to calculate the measured resin activity based upon material balance information above.

Runs #3 and #9 and Ca(CN)2 Run #2 were operated without re-saturating the feed solutions; each directly recombined recovered rinse water with fresh feed. When operated in this manner the "Conc. Calcium Feed Rate" and "Conc. Sodium Feed Rate" were smaller than the "Calcium Rinse Rate" and "Sodium rinse Rate". For material balance, the net feed was the "Conc. Calcium Feed Rate" and the product rate was the sum of "Na Product Rate" and "ER Out".

In all other pilot runs, all rinse waters that were recovered were removed from the system and recycled back to feed preparation and used to prepare new feed solution. The net feed for material balance is the "Conc. Calcium Feed Rate" minus the "Calcium Rinse Rate" and the net IX product is the sum of the "Na Product Rate" and the "ER Out".

TABLE 9

Pilot Plant Run #3 Operation on CaCl2 Surrogate Feed

| | | Run #3 | | | | | | | |
|---|---|---|---|---|---|---|---|---|---|
| | | 18-Apr | | 18-Apr | | 19-Apr | | 19-Apr | |
| | | Time | | | | | | | |
| | | 9:00 hrs | | 17:00 hrs | | 9:00 hrs | | 17:00 hrs | |
| | | Species: | | | | | | | |
| | Units | Ca | Na | Ca | Na | Ca | Na | Ca | Na |
| Ca++ Feed/Na+ Product Concentrations: | | | | | | | | | |
| Ca Feed (Conc) | (mg/mL) | 86.250 | | 92.900 | 0.003 | 85.200 | 0.005 | 91.700 | 0.011 |
| Ca Feed | (mg/mL) | 67.200 | 14.900 | 57.400 | 4.450 | 66.200 | 2.840 | 63.500 | 5.320 |
| Na Product | (mg/mL) | 18.600 | 26.800 | 8.800 | 33.900 | 8.110 | 30.100 | 8.380 | 31.000 |
| Ca Wash ER | (mg/mL) | 0.973 | 0.792 | 0.224 | 0.229 | 0.211 | 0.300 | 0.527 | 0.150 |
| Ca Feed (Conc) | (meq/mL) | 4.312 | — | 4.644 | 0.000 | 4.259 | 0.000 | 4.584 | 0.000 |
| Ca Feed | (meq/mL) | 3.359 | 0.648 | 2.869 | 0.194 | 3.309 | 0.124 | 3.174 | 0.231 |
| Na Product | (meq/mL) | 0.930 | 1.166 | 0.440 | 1.475 | 0.405 | 1.309 | 0.419 | 1.348 |
| Ca Wash ER | (meq/mL) | 0.049 | 0.034 | 0.011 | 0.010 | 0.011 | 0.013 | 0.026 | 0.007 |
| Na+ Feed/Ca++ Product Concentrations: | | | | | | | | | |
| Na Feed (Conc) | (mg/mL) | | 127.000 | 0.005 | 129.000 | 0.006 | 126.000 | 0.004 | 133.000 |
| Na Feed | (mg/mL) | 13.400 | 96.600 | 7.900 | 56.200 | 9.150 | 54.600 | 9.950 | 85.500 |
| Ca Product | (mg/mL) | 6.420 | 13.500 | 3.170 | 14.400 | 27.600 | 14.300 | 32.000 | 14.700 |
| Na Wash ER | (mg/mL) | 0.976 | 1.520 | 0.246 | 0.249 | 0.230 | 0.175 | 0.316 | 1.490 |
| Na Feed (Conc) | (meq/mL) | — | 5.524 | 0.000 | 5.611 | 0.000 | 5.481 | 0.000 | 5.785 |
| Na Feed | (meq/mL) | 0.670 | 4.202 | 0.395 | 2.445 | 0.457 | 2.375 | 0.497 | 3.719 |
| Ca Product | (meq/mL) | 0.321 | 0.587 | 0.158 | 0.626 | 1.380 | 0.622 | 1.600 | 0.639 |
| Na Wash ER | (meq/mL) | 0.049 | 0.066 | 0.012 | 0.011 | 0.011 | 0.008 | 0.016 | 0.065 |
| Liquid & Resin Rates: | | | | | | | | | |
| Step Time | (sec) | 480 | | 480 | | 480 | | 480 | |
| Ca++ Soln. Feed Flow Rate | (ml/min) | 25 | | 25 | | 25 | | 25 | |
| Ca Resin Rinse Flow Rate | (ml/min) | 70 | | 70 | | 70 | | 70 | |
| ER Flow Rate | (ml/min) | 29 | | 29 | | 29 | | 29 | |
| Na Effluent Rate | (ml/min) | 95 | | 95 | | 95 | | 95 | |
| Na Product Rate | (ml/min) | 66 | | 66 | | 66 | | 66 | |
| NaCl Feed Brine Flow Rate | (ml/min) | 22.5 | | 22.5 | | 22.5 | | 23.5 | |
| Na Resin Rinse Flow Rate | (ml/min) | 70 | | 70 | | 70 | | 70 | |
| ER Flow Rate | (ml/min) | 29 | | 29 | | 29 | | 29 | |
| Ca Effluent Rate | (ml/min) | 92.5 | | 92.5 | | 92.5 | | 92.5 | |
| Ca Product Rate | (ml/min) | 63.5 | | 63.5 | | 63.5 | | 63.5 | |
| Conc Calcium Feed Rate | (meq/min) | 107.79 | — | 116.10 | 0.00 | 106.48 | 0.01 | 114.60 | 0.01 |
| Calcium Rinse Rate | (meq/min) | 319.14 | 61.57 | 272.60 | 18.39 | 314.39 | 11.74 | 301.56 | 21.98 |
| Na Prod Effl Rate | (meq/min) | 88.33 | 110.75 | 41.79 | 140.09 | 38.51 | 124.39 | 39.80 | 128.10 |
| Na Product Rate | (meq/min) | 61.37 | 76.94 | 29.03 | 97.32 | 26.76 | 86.42 | 27.65 | 89.00 |
| ER Out | (meq/min) | 1.41 | 1.00 | 0.32 | 0.29 | 0.31 | 0.38 | 0.76 | 0.19 |
| Na Product Purity | (meq/min) | Ca++ | 55.6% | Ca++ | 77.0% | Ca++ | 76.4% | Ca++ | 76.3% |
| Na+ Feed/Ca+ Product Molar Flows | | | | | | | | | |
| Conc. Sodium Feed Rate | (meq/min) | — | 124.30 | 0.01 | 126.26 | 0.01 | 123.32 | 0.00 | 135.96 |
| Sodium Rinse Return | (meq/min) | 61.96 | 388.69 | 36.53 | 226.13 | 42.31 | 219.69 | 46.01 | 344.02 |
| Ca Prod Effl Rate | (meq/min) | 29.69 | 54.32 | 14.66 | 57.94 | 127.62 | 57.54 | 147.97 | 59.15 |
| Ca Product Rate | (meq/min) | 20.38 | 37.29 | 10.06 | 39.78 | 87.61 | 39.50 | 101.58 | 40.60 |
| ER Out | (meq/min) | 1.41 | 1.92 | 0.36 | 0.31 | 0.33 | 0.22 | 0.46 | 1.88 |
| Ca Product Purity | (meq/min) | Na+ | 35.3% | Na+ | 20.2% | Na+ | 68.9% | Na+ | 71.4% |
| Resin Rate | (meq/min) | 106.11 | | 106.11 | | 106.11 | | 106.11 | |
| Calcium/Sodium Loaded | (meq/min) | 45.01 | 86.01 | 86.71 | 86.19 | 79.39 | 83.44 | 86.50 | 95.16 |
| CaCl2/NaCl Unloaded | (meq/min) | 21.79 | 78.86 | 10.38 | 97.64 | 87.91 | 86.63 | 102.34 | 90.87 |
| Activity Ca/Na on Loading | (meq/mL) | 0.64 | 1.23 | 1.24 | 1.23 | 1.13 | 1.19 | 1.23 | 1.36 |
| Activity Ca/Na on Un-Load | (meq/mL) | 0.31 | 1.12 | 0.15 | 1.39 | 1.25 | 1.24 | 1.46 | 1.30 |

TABLE 9-continued

Pilot Plant Run #3 Operation on CaCl2 Surrogate Feed

|  |  | Run #3 | | | | | |
|---|---|---|---|---|---|---|---|
|  |  | 20-Apr | | 20-Apr | | 21-Apr | |
|  |  | | | Time | | | |
|  |  | 9:00 hrs | | 16:00 hrs | | 9:00 hrs | |
|  |  | | | Species: | | | |
|  | Units | Ca | Na | Ca | Na | Ca | Na |
| Ca++ Feed/Na+ Product Concentrations: | | | | | | | |
| Ca Feed (Conc) | (mg/mL) | 92.600 | 0.007 | 83.000 | 0.007 | 87.700 | 0.012 |
| Ca Feed | (mg/mL) | 64.900 | 3.970 | 58.400 | 4.102 | 65.500 | 3.670 |
| Na Product | (mg/mL) | 8.020 | 32.438 | 5.760 | 29.847 | 7.050 | 34.500 |
| Ca Wash ER | (mg/mL) | 0.451 | 0.121 | 0.440 | 0.112 | 0.509 | 0.161 |
| Ca Feed (Conc) | (meq/mL) | 4.629 | 0.000 | 4.149 | 0.000 | 4.384 | 0.001 |
| Ca Feed | (meq/mL) | 3.244 | 0.173 | 2.919 | 0.178 | 3.274 | 0.160 |
| Na Product | (meq/mL) | 0.401 | 1.411 | 0.288 | 1.298 | 0.352 | 1.501 |
| Ca Wash ER | (meq/mL) | 0.023 | 0.005 | 0.022 | 0.005 | 0.025 | 0.007 |
| Na+ Feed/Ca++ Product Concentrations: | | | | | | | |
| Na Feed (Conc) | (mg/mL) | 0.022 | 141.000 | 0.019 | 141.000 | 0.003 | 136.000 |
| Na Feed | (mg/mL) | 8.350 | 68.600 | 6.380 | 61.600 | 7.530 | 62.200 |
| Ca Product | (mg/mL) | 29.500 | 14.400 | 23.500 | 14.500 | 26.300 | 15.100 |
| Na Wash ER | (mg/mL) | 0.282 | 1.090 | 0.176 | 0.861 | 0.204 | 1.060 |
| Na Feed (Conc) | (meq/mL) | 0.001 | 6.133 | 0.001 | 6.133 | 0.000 | 5.916 |
| Na Feed | (meq/mL) | 0.417 | 2.984 | 0.319 | 2.680 | 0.376 | 2.706 |
| Ca Product | (meq/mL) | 1.475 | 0.626 | 1.175 | 0.631 | 1.315 | 0.657 |
| Na Wash ER | (meq/mL) | 0.014 | 0.047 | 0.009 | 0.037 | 0.010 | 0.046 |
| Liquid & Resin Rates: | | | | | | | |
| Step Time | (sec) | 480 | | 480 | | 480 | |
| Ca++ Soln. Feed Flow Rate | (ml/min) | 25 | | 25 | | 25 | |
| Ca Resin Rinse Flow Rate | (ml/min) | 70 | | 70 | | 70 | |
| ER Flow Rate | (ml/min) | 29 | | 30 | | 30 | |
| Na Effluent Rate | (ml/min) | 95 | | 95 | | 95 | |
| Na Product Rate | (ml/min) | 66 | | 65 | | 65 | |
| NaCl Feed Brine Flow Rate | (ml/min) | 23 | | 22 | | 22 | |
| Na Resin Rinse Flow Rate | (ml/min) | 70 | | 70 | | 70 | |
| ER Flow Rate | (ml/min) | 29 | | 30 | | 30 | |
| Ca Effluent Rate | (ml/min) | 93 | | 92 | | 92 | |
| Ca Product Rate | (ml/min) | 64 | | 62 | | 62 | |
| Conc Calcium Feed Rate | (meq/min) | 115.73 | 0.01 | 103.73 | 0.01 | 109.60 | |
| Calcium Rinse Rate | (meq/min) | 308.21 | 16.41 | 277.34 | 16.95 | 311.06 | 15.17 |
| Na Prod Effl Rate | (meq/min) | 38.09 | 134.05 | 27.35 | 123.34 | 33.48 | 142.57 |
| Na Product Rate | (meq/min) | 26.46 | 93.13 | 18.72 | 84.39 | 22.91 | 97.55 |
| ER Out | (meq/min) | 0.65 | 0.15 | 0.66 | 0.15 | 0.76 | 0.21 |
| Na Product Purity | (meq/min) | $Ca^{++}$ | 77.9% | $Ca^{++}$ | 81.8% | $Ca^{++}$ | 81.0% |
| Na+ Feed/Ca+ Product Molar Flows | | | | | | | |
| Conc. Sodium Feed Rate | (meq/min) | 0.03 | 141.07 | 0.02 | 134.93 | 0.00 | 130.15 |
| Sodium Rinse Return | (meq/min) | 38.82 | 277.52 | 29.34 | 246.52 | 34.63 | 248.92 |
| Ca Prod Effl Rate | (meq/min) | 137.15 | 58.25 | 108.08 | 58.03 | 120.96 | 60.43 |
| Ca Product Rate | (meq/min) | 94.38 | 40.09 | 72.84 | 39.11 | 81.51 | 40.72 |
| ER Out | (meq/min) | 0.41 | 1.38 | 0.26 | 1.12 | 0.31 | 1.38 |
| Ca Product Purity | (meq/min) | $Na^+$ | 70.2% | $Na^+$ | 65.1% | $Na^+$ | 66.7% |
| Resin Rate | (meq/min) | 106.11 | | 106.11 | | 106.11 | |
| Calcium/Sodium Loaded | (meq/min) | 88.86 | 100.83 | 84.75 | 95.68 | 86.39 | 89.22 |
| CaCl2/NaCl Unloaded | (meq/min) | 95.01 | 94.50 | 73.47 | 85.51 | 82.27 | 98.93 |
| Activity Ca/Na on Loading | (meq/mL) | 1.27 | 1.44 | 1.21 | 1.36 | 1.23 | 1.27 |
| Activity Ca/Na on Un-Load | (meq/mL) | 1.35 | 1.35 | 1.05 | 1.22 | 1.17 | 1.41 |

TABLE 10

Pilot Plant Run #9 Operation on CaCl2 Surrogate Feed

| | | Run #9 | | | |
|---|---|---|---|---|---|
| | | 27-Apr | | 27-Apr | |
| | | Time | | | |
| | | 7:10 hrs | | 18:00 hrs | |
| | | Species: | | | |
| | Units | Ca | Na | Ca | Na |
| Ca++ Feed/Na+ Product Concentrations: | | | | | |
| Ca Feed (Conc) | (mg/mL) | 86.200 | 0.023 | 86.600 | 0.024 |
| Ca Feed | (mg/mL) | 79.400 | 0.023 | 75.200 | 0.024 |
| Na Product | (mg/mL) | 5.530 | 54.000 | 2.550 | 60.300 |
| Ca Wash ER | (mg/mL) | 0.841 | 1.090 | 0.986 | 0.818 |
| Ca Feed (Conc) | (meq/mL) | 4.309 | 0.001 | 4.329 | 0.001 |
| Ca Feed | (meq/mL) | 3.969 | 0.001 | 3.759 | 0.001 |
| Na Product | (meq/mL) | 0.276 | 2.349 | 0.127 | 2.623 |
| Ca Wash ER | (meq/mL) | 0.042 | 0.047 | 0.049 | 0.036 |
| Na+ Feed/Ca++ Product Concentrations: | | | | | |
| Na Feed (Conc) | (mg/mL) | 0.004 | 125.000 | 0.002 | 122.000 |
| Na Feed | (mg/mL) | 0.993 | 88.400 | 3.370 | 88.500 |
| Ca Product | (mg/mL) | 44.700 | 22.000 | 42.500 | 11.700 |
| Na Wash ER | (mg/mL) | 0.369 | 1.110 | 0.725 | 1.190 |
| Na Feed (Conc) | (meq/mL) | 0.000 | 5.437 | 0.000 | 5.307 |
| Na Feed | (meq/mL) | 0.050 | 3.845 | 0.168 | 3.850 |
| Ca Product | (meq/mL) | 2.235 | 0.957 | 2.125 | 0.509 |
| Na Wash ER | (meq/mL) | 0.018 | 0.048 | 0.036 | 0.052 |
| Liquid & Resin Rates: | | | | | |
| Step Time | (sec) | 1200 | | 1200 | |
| Ca++ Soln. Feed Flow Rate | (ml/min) | 17 | 17 | 17 | |
| Ca ResinRinse Flow Rate | (ml/min) | 25 | 25 | 23 | |
| ER Flow Rate | (ml/min) | 14 | 13 | 14 | |
| Na Effluent Rate | (ml/min) | 42 | | 40 | |
| Na Product Rate | (ml/min) | 28 | | 26 | |
| NaCl Feed Brine Flow Rate | (ml/min) | 14 | 13 | 14 | |
| Na ResinRinse Flow Rate | (ml/min) | 27 | 25 | 27 | |
| ER Flow Rate | (ml/min) | 13.5 | 13 | 13.5 | |
| Ca Effluent Rate | (ml/min) | 41 | | 41 | |
| Ca Product Rate | (ml/min) | 27.5 | | 27.5 | |
| Conc Calcium Feed Rate | (meq/min) | 73.26 | 0.02 | 73.60 | 0.02 |
| Calcium Rinse Rate | (meq/min) | 166.71 | 0.04 | 150.37 | 0.04 |
| Na Prod Effl Rate | (meq/min) | 11.61 | 98.66 | 5.10 | 104.92 |
| Na Product Rate | (meq/min) | 7.74 | 65.77 | 3.31 | 68.20 |
| ER Out | (meq/min) | 0.59 | 0.66 | 0.69 | 0.50 |
| Na ProductPurity | (meq/min) | Ca++ | 89.5% | Ca++ | 95.4% |
| Na+ Feed/Ca+ Product Molar Flows | | | | | |
| Conc. Sodium Feed Rate | (meq/min) | 0.00 | 76.12 | 0.00 | 74.30 |
| Sodium Rinse Return | (meq/min) | 2.04 | 157.66 | 6.91 | 157.84 |
| Ca Prod Effl Rate | (meq/min) | 91.62 | 39.24 | 87.11 | 20.87 |
| Ca Product Rate | (meq/min) | 61.45 | 26.32 | 58.43 | 14.00 |
| ER Out | (meq/min) | 0.25 | 0.65 | 0.49 | 0.70 |
| Ca ProductPurity | (meq/min) | Na+ | 70.0% | Na+ | 80.7% |
| Resin Rate | (meq/min) | 62.06 | | 62.06 | |
| Calcium/Sodium Loaded | (meq/min) | 65.27 | 49.14 | 69.79 | 59.80 |
| CaCl2/NaCl Unloaded | (meq/min) | 62.04 | 66.41 | 59.11 | 68.88 |
| Activity Ca/Na on Loading | (meq/mL) | 2.37 | 1.78 | 2.53 | 2.17 |
| Activity Ca/Na on Un-Load | (meq/mL) | 2.25 | 2.41 | 2.14 | 2.50 |

TABLE 11

Pilot Plant Run #19 Operation on CaCl2 Surrogate Feed

| | | Run #19 | | | | | | | |
|---|---|---|---|---|---|---|---|---|---|
| | | 6-Jun | | 6-Jun | | 7-Jun | | 8-Jun | |
| | | Time | | | | | | | |
| | | 8:10 hrs | | 16:30 hrs | | 8:30 hrs | | 7:30 hrs | |
| | | Species: | | | | | | | |
| | Units | Ca | Na | Ca | Na | Ca | Na | Ca | Na |
| Ca++ Feed/Na+ Product Concentrations: | | | | | | | | | |
| Ca Feed (Conc) | (mg/mL) | 112.000 | 0.001 | 110.000 | 0.001 | 109.000 | 0.001 | 110.000 | 0.001 |
| Ca Feed | (mg/mL) | 83.300 | 0.304 | 80.000 | 0.439 | 75.900 | 0.330 | 68.500 | 1.130 |
| Na Product | (mg/mL) | 8.030 | 65.400 | 6.540 | 61.900 | 6.280 | 49.300 | 2.610 | 57.200 |
| Ca Wash ER | (mg/mL) | 0.638 | 0.043 | 0.081 | 0.018 | 0.150 | 0.010 | 0.201 | 0.040 |
| Ca Feed (Conc) | (meq/mL) | 5.599 | 0.000 | 5.499 | 0.000 | 5.449 | 0.000 | 5.499 | 0.000 |
| Ca Feed | (meq/mL) | 4.164 | 0.013 | 3.999 | 0.019 | 3.794 | 0.014 | 3.424 | 0.049 |
| Na Product | (meq/mL) | 0.401 | 2.845 | 0.327 | 2.693 | 0.314 | 2.145 | 0.130 | 2.488 |
| Ca Wash ER | (meq/mL) | 0.032 | 0.002 | 0.004 | 0.001 | 0.007 | 0.000 | 0.010 | 0.002 |
| Na+ Feed/Ca++ Product Concentrations: | | | | | | | | | |
| Na Feed (Conc) | (mg/mL) | 0.002 | 127.000 | 0.002 | 126.000 | — | 125.000 | 0.006 | 122.000 |
| Na Feed | (mg/mL) | 3.430 | 72.600 | 4.330 | 78.300 | 3.660 | 67.000 | 6.770 | 47.700 |
| Ca Product | (mg/mL) | 44.000 | 11.700 | 43.200 | 5.970 | 46.400 | 5.800 | 40.900 | 6.620 |
| Na Wash ER | (mg/mL) | 0.014 | 1.430 | 0.005 | 0.077 | — | 0.150 | 0.004 | 0.060 |
| Na Feed (Conc) | (meq/mL) | 0.000 | 5.524 | 0.000 | 5.481 | — | 5.437 | 0.000 | 5.307 |
| Na Feed | (meq/mL) | 0.171 | 3.158 | 0.216 | 3.406 | 0.183 | 2.914 | 0.338 | 2.075 |

TABLE 11-continued

Pilot Plant Run #19 Operation on CaCl2 Surrogate Feed

| | | Run #19 | | | | | | | |
|---|---|---|---|---|---|---|---|---|---|
| | | 6-Jun | | 6-Jun | | 7-Jun | | 8-Jun | |
| | | | | | Time | | | | |
| | | 8:10 hrs | | 16:30 hrs | | 8:30 hrs | | 7:30 hrs | |
| | | | | | Species: | | | | |
| | Units | Ca | Na | Ca | Na | Ca | Na | Ca | Na |
| Ca Product | (meq/mL) | 2.200 | 0.509 | 2.160 | 0.260 | 2.320 | 0.252 | 2.045 | 0.288 |
| Na Wash ER | (meq/mL) | 0.001 | 0.062 | 0.000 | 0.003 | — | 0.007 | 0.000 | 0.003 |
| | | | | Liquid & Resin Rates: | | | | | |
| Step Time | (sec) | 1200 | | 1200 | | 1200 | | 1200 | |
| Ca++ Soln. Feed Flow Rate | (ml/min) | 12.4 | | 12.77 | | 12.31 | | 12.28 | |
| Ca Resin Rinse Flow Rate | (ml/min) | 24.8 | | 24.89 | | 30.09 | | 32.5 | |
| ER Flow Rate | (ml/min) | 15 | | 13.45 | | 14.7 | | 15.42 | |
| Na Effluent Rate | (ml/min) | 37.2 | | 37.66 | | 42.4 | | 44.78 | |
| Na Product Rate | (ml/min) | 22.2 | | 24.21 | | 27.7 | | 29.36 | |
| NaCl Feed Brine Flow Rate | (ml/min) | 12.7 | | 12.74 | | 12.6 | | 12.62 | |
| Na Resin Rinse Flow Rate | (ml/min) | 29.1 | (est) | 24.52 | (est) | 28.1 | (est) | 30.73 | (est) |
| ER Flow Rate | (ml/min) | 15.6 | | 13.31 | | 13.9 | | 14.08 | |
| Ca Effluent Rate | (ml/min) | 41.8 | | 37.26 | | 40.7 | | 43.35 | |
| Ca Product Rate | (ml/min) | 26.2 | | 23.95 | (est) | 26.8 | (est) | 29.27 | (est) |
| Conc Calcium Feed Rate | (meq/min) | 69.43 | 0.00 | 70.22 | 0.00 | 67.08 | 0.00 | 67.53 | 0.00 |
| Calcium Rinse Rate | (meq/min) | 154.91 | 0.49 | 150.61 | 0.72 | 160.88 | 0.61 | 153.34 | 2.20 |
| Na Prod Effl Rate | (meq/min) | 14.93 | 105.83 | 12.31 | 101.40 | 13.31 | 90.93 | 5.84 | 111.42 |
| Na Product Rate | (meq/min) | 8.91 | 63.16 | 7.92 | 65.19 | 8.70 | 59.40 | 3.83 | 73.05 |
| ER Out | (meq/min) | 0.48 | 0.03 | 0.05 | 0.01 | 0.11 | 0.01 | 0.15 | 0.03 |
| Na Product Purity | (meq/min) | $Ca^{++}$ | 87.6% | $Ca^{++}$ | 89.2% | $Ca^{++}$ | 87.2% | $Ca^{++}$ | 95.0% |
| | | | Na+ Feed/Ca+ Product Molar Flows | | | | | | |
| Conc. Sodium Feed Rate | (meq/min) | 0.00 | 70.16 | 0.00 | 69.83 | — | 68.51 | 0.00 | 66.97 |
| Sodium Rinse Return | (meq/min) | 7.17 | 132.01 | 8.07 | 126.91 | 7.45 | 118.62 | 14.67 | 89.95 |
| Ca Prod Effl Rate | (meq/min) | 91.94 | 21.27 | 80.47 | 9.68 | 94.41 | 10.27 | 88.63 | 12.48 |
| Ca Product Rate | (meq/min) | 57.63 | 13.33 | 51.72 | 6.22 | 62.16 | 6.76 | 59.85 | 8.43 |
| ER Out | (meq/min) | 0.01 | 0.97 | 0.00 | 0.04 | — | 0.09 | 0.00 | 0.04 |
| Ca Product Purity | (meq/min) | $Na^+$ | 81.2% | $Na^+$ | 89.3% | $Na^+$ | 90.2% | $Na^+$ | 87.7% |
| Resin Rate | (meq/min) | 62.06 | | 62.06 | | 62.06 | | 62.06 | |
| Calcium/Sodium Loaded | (meq/min) | 60.50 | 56.80 | 62.30 | 63.60 | 58.38 | 61.74 | 63.69 | 58.52 |
| CaCl2/NaCl Unloaded | (meq/min) | 58.11 | 64.13 | 51.77 | 65.23 | 62.27 | 59.49 | 60.00 | 73.09 |
| Activity Ca/Na on Loading | (meq/mL) | 2.19 | 2.06 | 2.26 | 2.31 | 2.12 | 2.24 | 2.31 | 2.12 |
| Activity Ca/Na on Un-Load | (meq/mL) | 2.11 | 2.32 | 1.88 | 2.36 | 2.26 | 2.16 | 2.18 | 2.65 |

TABLE 12

Pilot Plant Run #21-22 Operation on CaCl2 Surrogate Feed.

| | | Run 21-22 | | | | | |
|---|---|---|---|---|---|---|---|
| | | 17-Jun | | 18-Jun | | 19-Jun | |
| | | | | Time | | | |
| | | 8:10 hrs | | 7:30 hrs | | 7:30 hrs | |
| | | | | Species: | | | |
| | Units | Ca | Na | Ca | Na | Ca | Na |
| | | Ca++ Feed/Na+ Product Concentrations: | | | | | |
| Ca Feed (Conc) | (mg/mL) | 110.000 | 0.003 | 109.000 | 0.004 | 110.000 | 0.003 |
| Ca Feed | (mg/mL) | 77.700 | 0.113 | 80.400 | 0.484 | 76.600 | 0.011 |
| Na Product | (mg/mL) | 4.130 | 55.400 | 6.840 | 49.000 | 7.520 | 48.700 |
| Ca Wash ER | (mg/mL) | 0.442 | 0.018 | 0.314 | 0.037 | 0.137 | 0.202 |
| Ca Feed (Conc) | (meq/mL) | 5.499 | 0.000 | 5.449 | 0.000 | 5.499 | 0.000 |
| Ca Feed | (meq/mL) | 3.884 | 0.005 | 4.019 | 0.021 | 3.829 | 0.000 |
| Na Product | (meq/mL) | 0.206 | 2.410 | 0.342 | 2.131 | 0.376 | 2.118 |
| Ca Wash ER | (meq/mL) | 0.022 | 0.001 | 0.016 | 0.002 | 0.007 | 0.009 |
| | | Na+ Feed/Ca++ Product Concentrations: | | | | | |
| Na Feed (Conc) | (mg/mL) | 0.003 | 125.000 | 0.003 | 123.000 | 0.004 | 122.000 |
| Na Feed | (mg/mL) | 1.870 | 67.800 | 2.280 | 58.700 | 2.250 | 55.300 |
| Ca Product | (mg/mL) | 49.900 | 9.270 | 44.700 | 6.020 | 38.000 | 8.950 |
| Na Wash ER | (mg/mL) | 0.010 | 0.656 | 0.012 | 0.344 | 0.009 | 0.132 |

TABLE 12-continued

Pilot Plant Run #21-22 Operation on CaCl2 Surrogate Feed.

| | | Run 21-22 | | | | | |
|---|---|---|---|---|---|---|---|
| | | 17-Jun | | 18-Jun | | 19-Jun | |
| | | | | Time | | | |
| | | 8:10 hrs | | 7:30 hrs | | 7:30 hrs | |
| | | | | Species: | | | |
| | Units | Ca | Na | Ca | Na | Ca | Na |
| Na Feed (Conc) | (meq/mL) | 0.000 | 5.437 | 0.000 | 5.350 | 0.000 | 5.307 |
| Na Feed | (meq/mL) | 0.093 | 2.949 | 0.114 | 2.553 | 0.112 | 2.405 |
| Ca Product | (meq/mL) | 2.495 | 0.403 | 2.235 | 0.262 | 1.900 | 0.389 |
| Na Wash ER | (meq/mL) | 0.000 | 0.029 | 0.001 | 0.015 | 0.000 | 0.006 |
| | | Liquid & Resin Rates: | | | | | |
| Step Time | (sec) | 1400 | | 0 | | 58.673265 | |
| Ca++ Soln. Feed Flow Rate | (ml/min) | 10.67 | | 9.4 | | 9.36 | |
| Ca Resin Rinse Flow Rate | (ml/min) | 23.43 | | 21.7 | | 22.74 | |
| ER Flow Rate | (ml/min) | 11 | | 9.5 | | 9.5 | |
| Na Effluent Rate | (ml/min) | 34.1 | | 31.1 | | 32.1 | |
| Na Product Rate | (ml/min) | 23.1 | | 21.6 | | 22.6 | |
| NaCl Feed Brine Flow Rate | (ml/min) | 10.9 | | 9.7 | | 9.7 | |
| Na Resin Rinse Flow Rate | (ml/min) | 21 | (est) | 20.8 | (est) | 22.4 | (est) |
| ER Flow Rate | (ml/min) | 11 | | 8.9 | | 8.6 | |
| Ca Effluent Rate | (ml/min) | 31.9 | | 30.5 | | 32.1 | |
| Ca Product Rate | (ml/min) | 20.9 | | 21.6 | | 23.5 | |
| Conc Calcium Feed Rate | (meq/min) | 58.67 | 0.00 | 51.22 | 0.00 | 51.47 | 0.00 |
| Calcium Rinse Rate | (meq/min) | 132.45 | 0.17 | 125.00 | 0.65 | 122.92 | 0.02 |
| Na Prod Effl Rate | (meq/min) | 7.04 | 82.18 | 10.63 | 66.29 | 12.07 | 68.00 |
| Na Product Rate | (meq/min) | 4.77 | 55.67 | 7.39 | 46.04 | 8.50 | 47.88 |
| ER Out | (meq/min) | 0.24 | 0.01 | 0.15 | 0.02 | 0.07 | 0.08 |
| Na Product Purity | (meq/min) | $Ca^{++}$ | 92.1% | $Ca^{++}$ | 86.2% | $Ca^{++}$ | 84.9% |
| | | Na+ Feed/Ca+ Product Molar Flows | | | | | |
| Conc. Sodium Feed Rate | (meq/min) | 0.00 | 59.27 | 0.00 | 51.90 | 0.00 | 51.48 |
| Sodium Rinse Return | (meq/min) | 2.98 | 94.08 | 3.48 | 77.88 | 3.61 | 77.22 |
| Ca Prod Effl Rate | (meq/min) | 79.57 | 12.86 | 68.15 | 7.99 | 60.98 | 12.50 |
| Ca Product Rate | (meq/min) | 52.14 | 8.43 | 48.27 | 5.66 | 44.64 | 9.15 |
| ER Out | (meq/min) | 0.01 | 0.31 | 0.01 | 0.13 | 0.00 | 0.05 |
| Ca Product Purity | (meq/min) | $Na^+$ | 86.1% | $Na^+$ | 89.5% | $Na^+$ | 83.0% |
| Resin Rate | (meq/min) | 58.57 | | 51.25 | | 51.25 | |
| Calcium/Sodium Loaded | (meq/min) | 53.90 | 50.83 | 43.83 | 46.23 | 42.97 | 42.24 |
| CaCl2/NaCl Unloaded | (meq/min) | 52.38 | 55.98 | 48.41 | 46.17 | 44.70 | 47.92 |
| Activity Ca/Na on Loading | (meq/mL) | 2.14 | 2.01 | 1.98 | 2.09 | 1.95 | 1.91 |
| Activity Ca/Na on Un-Load | (meq/mL) | 2.07 | 2.22 | 2.19 | 2.09 | 2.02 | 2.17 |

TABLE 13

Pilot Plant Run #25 Operation on CaCl2 Surrogate Feed

| | | Run 25 | | | | | |
|---|---|---|---|---|---|---|---|
| | | 27-Jun | | 28-Jun | | 29-Jun | |
| | | | | Time | | | |
| | | 8:00 hrs | | 8:00 hrs | | 7:20 hrs | |
| | | | | Species: | | | |
| | Units | Ca | Na | Ca | Na | Ca | Na |
| | | Ca++ Feed/Na+ Product Concentrations: | | | | | |
| Ca Feed (Conc) | (mg/mL) | 111.000 | 0.091 | 112.000 | 0.089 | 112.000 | 0.377 |
| Ca Feed | (mg/mL) | 85.400 | 0.539 | 80.100 | 0.265 | 75.700 | 0.539 |
| Na Product | (mg/mL) | 11.400 | 88.600 | 6.420 | 94.400 | 5.040 | 94.600 |
| Ca Wash ER | (mg/mL) | 1.490 | 0.048 | 2.120 | 0.045 | 2.200 | 0.060 |
| Ca Feed (Conc) | (meq/mL) | 5.549 | 0.004 | 5.599 | 0.004 | 5.599 | 0.016 |
| Ca Feed | (meq/mL) | 4.269 | 0.023 | 4.004 | 0.012 | 3.784 | 0.023 |
| Na Product | (meq/mL) | 0.570 | 3.854 | 0.321 | 4.106 | 0.252 | 4.115 |
| Ca Wash ER | (meq/mL) | 0.074 | 0.002 | 0.106 | 0.002 | 0.110 | 0.003 |
| | | Na+ Feed/Ca++ Product Concentrations: | | | | | |
| Na Feed (Conc) | (mg/mL) | 0.002 | 123.000 | 0.004 | 123.000 | 0.003 | 125.000 |
| Na Feed | (mg/mL) | 4.720 | 90.000 | 5.490 | 90.500 | 5.440 | 83.300 |

TABLE 13-continued

Pilot Plant Run #25 Operation on CaCl2 Surrogate Feed

| | | Run 25 | | | | | |
|---|---|---|---|---|---|---|---|
| | | 27-Jun | | 28-Jun | | 29-Jun | |
| | | | | Time | | | |
| | | 8:00 hrs | | 8:00 hrs | | 7:20 hrs | |
| | | | | Species: | | | |
| | Units | Ca | Na | Ca | Na | Ca | Na |
| Ca Product | (mg/mL) | 71.100 | 26.900 | 74.600 | 18.200 | 76.600 | 19.100 |
| Na Wash ER | (mg/mL) | 0.042 | 2.720 | 0.023 | 2.570 | 0.017 | 2.430 |
| Na Feed (Conc) | (meq/mL) | 0.000 | 5.350 | 0.000 | 5.350 | 0.000 | 5.437 |
| Na Feed | (meq/mL) | 0.236 | 3.915 | 0.274 | 3.937 | 0.272 | 3.623 |
| Ca Product | (meq/mL) | 3.554 | 1.170 | 3.729 | 0.792 | 3.829 | 0.831 |
| Na Wash ER | (meq/mL) | 0.002 | 0.118 | 0.001 | 0.112 | 0.001 | 0.106 |
| Liquid & Resin Rates: | | | | | | | |
| Step Time | (sec) | 3000 | | 3000 | | 3000 | |
| Ca++ Soln. Feed Flow Rate | (ml/min) | 13.43 | | 13.23 | | 13.35 | |
| Ca ResinRinse Flow Rate | (ml/min) | 10.42 | | 10.27 | | 10.58 | |
| ER Flow Rate | (ml/min) | 6.13 | | 5.98 | | 5.95 | |
| Na Effluent Rate | (ml/min) | 23.85 | | 23.5 | | 23.93 | |
| Na Product Rate | (ml/min) | 7.3 | | 7.23 | | 7.77 | |
| NaCl Feed Brine Flow Rate | (ml/min) | 13.74 | | 13.74 | | 13.7 | |
| Na ResinRinse Flow Rate | (ml/min) | 9.75 | | 9.45 | | 9.92 | |
| ER Flow Rate | (ml/min) | 6.01 | | 6.3 | | 5.66 | |
| Ca Effluent Rate | (ml/min) | 13.6 | | 13.9 | | 13.23 | |
| Ca Product Rate | (ml/min) | 7.59 | | 7.6 | | 7.57 | |
| Conc Calcium Feed Rate | (meq/min) | 74.52 | 0.05 | 74.07 | 0.05 | 74.75 | 0.22 |
| Calcium Rinse Rate | (meq/min) | 44.48 | 0.24 | 41.12 | 0.12 | 40.04 | 0.25 |
| Na Prod Effl Rate | (meq/min) | 13.59 | 91.92 | 7.54 | 96.50 | 6.03 | 98.47 |
| Na Product Rate | (meq/min) | 4.16 | 28.13 | 2.32 | 29.69 | 1.96 | 31.97 |
| ER Out | (meq/min) | 0.46 | 0.01 | 0.63 | 0.01 | 0.65 | 0.02 |
| Na ProductPurity | (meq/min) | $Ca^{++}$ | 87.1% | $Ca^{++}$ | 92.8% | $Ca^{++}$ | 94.2% |
| Na+ Feed/Ca+ Product Molar Flows | | | | | | | |
| Conc. Sodium Feed Rate | (meq/min) | 0.00 | 73.51 | 0.00 | 73.51 | 0.00 | 74.49 |
| Sodium Rinse Return | (meq/min) | 2.30 | 38.17 | 2.59 | 37.20 | 2.70 | 35.94 |
| Ca Prod Effl Rate | (meq/min) | 48.34 | 15.91 | 51.84 | 11.00 | 50.66 | 10.99 |
| Ca Product Rate | (meq/min) | 26.98 | 8.88 | 28.34 | 6.02 | 28.99 | 6.29 |
| ER Out | (meq/min) | 0.01 | 0.71 | 0.01 | 0.70 | 0.00 | 0.60 |
| Ca ProductPurity | (meq/min) | $Na^+$ | 75.2% | $Na^+$ | 82.5% | $Na^+$ | 82.2% |
| Resin Rate | (meq/min) | 27.33 | | 27.33 | | 27.33 | |
| Calcium/Sodium Loaded | (meq/min) | 25.86 | 26.45 | 30.62 | 30.28 | 32.75 | 32.24 |
| CaCl2/NaCl Unloaded | (meq/min) | 29.73 | 29.04 | 31.57 | 30.46 | 32.34 | 32.60 |
| Activity Ca/Na on Loading | (meq/mL) | 2.20 | 2.25 | 2.60 | 2.57 | 2.78 | 2.74 |
| Activity Ca/Na on Un-Load | (meq/mL) | 2.52 | 2.46 | 2.68 | 2.59 | 2.74 | 2.77 |

TABLE 14

Pilot Plant Run #32 Operation on CaCl2 Surrogate Feed

| | | Run 32 | | | | | | | |
|---|---|---|---|---|---|---|---|---|---|
| | | 8-Aug | | 9-Aug | | 10-Aug | | 10-Aug | |
| | | | | | | Time | | | |
| | | 11:15 hrs | | SG | | 7:55 hrs | | 17:00 hrs | |
| | | | | | | Species: | | | |
| | Units | Ca | Na | Ca | Na | Ca | Na | Ca | Na |
| Ca++ Feed/Ca+ Product Concentrations: | | | | | | | | | |
| Ca Feed (Conc) | (mg/mL) | 101.000 | 0.254 | 101.000 | 0.180 | 100.000 | 0.160 | 101.000 | 0.138 |
| Ca Feed | (mg/mL) | 66.500 | 0.286 | 73.000 | 0.216 | 73.400 | 0.327 | 71.600 | 0.341 |
| Na Product | (mg/mL) | 3.120 | 87.400 | 3.470 | 92.800 | 4.840 | 91.700 | 4.850 | 90.800 |
| Ca Wash ER | (mg/mL) | 0.806 | 0.022 | 1.140 | 0.030 | 1.660 | 0.029 | 1.420 | 0.029 |
| Ca Feed (Conc) | (meq/mL) | 5.049 | 0.011 | 5.049 | 0.008 | 4.999 | 0.007 | 5.049 | 0.006 |
| Ca Feed | (meq/mL) | 3.324 | 0.012 | 3.649 | 0.009 | 3.669 | 0.014 | 3.579 | 0.015 |
| Na Product | (meq/mL) | 0.156 | 3.802 | 0.173 | 4.037 | 0.242 | 3.989 | 0.242 | 3.950 |
| Ca Wash ER | (meq/mL) | 0.040 | 0.001 | 0.057 | 0.001 | 0.083 | 0.001 | 0.071 | 0.001 |

TABLE 14-continued

Pilot Plant Run #32 Operation on CaCl2 Surrogate Feed

| | | Run 32 | | | | | | | |
|---|---|---|---|---|---|---|---|---|---|
| | | 8-Aug | | 9-Aug | | 10-Aug | | 10-Aug | |
| | | 11:15 hrs | | SG | | 7:55 hrs | | 17:00 hrs | |
| | Units | Ca | Na | Ca | Na | Ca | Na | Ca | Na |
| Na+ Feed/Ca++ Product Concentrations: | | | | | | | | | |
| Na Feed (Conc) | (mg/mL) | 0.003 | 122.000 | 0.004 | 123.000 | 2.720 | 120.000 | 3.140 | 120.000 |
| Na Feed | (mg/mL) | 5.780 | 79.000 | 7.370 | 87.800 | 7.390 | 85.400 | 8.020 | 80.100 |
| Ca Product | (mg/mL) | 74.300 | 11.000 | 78.100 | 15.400 | 75.600 | 20.300 | 78.800 | 19.300 |
| Na Wash ER | (mg/mL) | 0.009 | 1.880 | 0.002 | 2.150 | 0.047 | 2.930 | 0.050 | 3.000 |
| Na Feed (Conc) | (meq/mL) | 0.000 | 5.307 | 0.000 | 5.350 | 0.136 | 5.220 | 0.157 | 5.220 |
| Na Feed | (meq/mL) | 0.289 | 3.436 | 0.368 | 3.819 | 0.369 | 3.715 | 0.401 | 3.484 |
| Ca Product | (meq/mL) | 3.714 | 0.478 | 3.904 | 0.670 | 3.779 | 0.883 | 3.939 | 0.840 |
| Na Wash ER | (meq/mL) | 0.000 | 0.082 | 0.000 | 0.094 | 0.002 | 0.127 | 0.002 | 0.130 |
| Liquid & Resin Rates: | | | | | | | | | |
| Step Time | (sec) | 2700 | | 2700 | | 2700 | | 2700 | |
| Ca++ Soln. Feed Flow Rate | (ml/min) | 15.37 | | 15.11 | | 15.26 | | 15.14 | |
| Ca ResinRinse Flow Rate | (ml/min) | 12.95 | | 11.78 | | 11.83 | | 11.96 | |
| ER Flow Rate | (ml/min) | 6.55 | | 6.57 | | 6.74 | | 6.75 | |
| Na Effluent Rate | (ml/min) | 15.53 | | 15.06 | | 15.11 | | 14.92 | |
| Na Product Rate | (ml/min) | 8.98 | | 8.49 | | 8.37 | | 8.17 | |
| NaCl Feed Brine Flow Rate | (ml/min) | 15.01 | | 14.94 | | 15.46 | | 15.31 | |
| Na ResinRinse Flow Rate | (ml/min) | 12.34 | | 11.59 | | 11.87 | | 11.52 | |
| ER Flow Rate | (ml/min) | 6.42 | | 6.86 | | 6.95 | | 7.13 | |
| Ca Effluent Rate | (ml/min) | 14.64 | | 14.44 | | 15.51 | | 15.74 | |
| Ca Product Rate | (ml/min) | 8.22 | | 7.58 | | 8.56 | | 8.61 | |
| Conc Calcium Feed Rate | (meq/min) | 77.60 | 0.17 | 76.29 | 0.12 | 76.28 | 0.11 | 76.44 | 0.09 |
| Calcium Rinse Rate | (meq/min) | 43.05 | 0.16 | 42.99 | 0.11 | 43.41 | 0.17 | 42.81 | 0.18 |
| Na Prod Effl Rate | (meq/min) | 2.42 | 59.04 | 2.61 | 60.79 | 3.66 | 60.27 | 3.62 | 58.93 |
| Na Product Rate | (meq/min) | 1.40 | 34.14 | 1.47 | 34.27 | 2.03 | 33.39 | 1.98 | 32.27 |
| ER Out | (meq/min) | 0.26 | 0.01 | 0.37 | 0.01 | 0.56 | 0.01 | 0.48 | 0.01 |
| Na ProductPurity | (meq/min) | $Ca^{++}$ | 96.1% | $Ca^{++}$ | 95.9% | $Ca^{++}$ | 94.3% | $Ca^{++}$ | 94.2% |
| Na+ Feed/Ca+ Product Molar Flows | | | | | | | | | |
| Conc. Sodium Feed Rate | (meq/min) | 0.00 | 79.66 | 0.00 | 79.93 | 2.10 | 80.70 | 2.40 | 79.92 |
| Sodium Rinse Return | (meq/min) | 3.57 | 42.41 | 4.27 | 44.26 | 4.39 | 44.09 | 4.62 | 40.14 |
| Ca Prod Effl Rate | (meq/min) | 54.38 | 7.01 | 56.38 | 9.67 | 58.62 | 13.70 | 62.00 | 13.21 |
| Ca Product Rate | (meq/min) | 30.53 | 3.93 | 29.59 | 5.08 | 32.35 | 7.56 | 33.92 | 7.23 |
| ER Out | (meq/min) | 0.00 | 0.53 | 0.00 | 0.64 | 0.02 | 0.89 | 0.02 | 0.93 |
| Ca ProductPurity | (meq/min) | $Na^+$ | 88.6% | $Na^+$ | 85.4% | $Na^+$ | | $Na^+$ | 82.4% |
| Resin Rate | (meq/min) | 28.80 | | 28.80 | | 28.80 | | 28.80 | |
| Calcium/Sodium Loaded | (meq/min) | 33.15 | 33.31 | 31.83 | 30.58 | 30.84 | 29.04 | 31.63 | 32.54 |
| CaCl2/NaCl Unloaded | (meq/min) | 34.36 | 34.66 | 34.24 | 34.91 | 35.19 | 34.33 | 36.61 | 33.29 |
| | | 30.80 | 34.67 | 29.97 | 34.91 | 32.91 | 34.27 | 34.40 | 33.20 |
| Activity Ca/Na on Loading | (meq/mL) | 2.53 | 2.54 | 2.43 | 2.34 | 2.36 | 2.22 | 2.42 | 2.49 |
| Activity Ca/Na on Un-Load | (meq/mL) | 2.62 | 2.65 | 2.62 | 2.67 | 2.69 | 2.62 | 2.80 | 2.54 |

TABLE 15

Pilot Plant Run #33 Operation on CaCl2 Surrogate Feed

| | | Run 33 | | | | | | | |
|---|---|---|---|---|---|---|---|---|---|
| | | 22-Aug | | 23-Aug | | 24-Aug | | 25-Aug | |
| | | 8:30 hrs | | 8:30 hrs | | 8:30 hrs | | 6:30 hrs | |
| | Units | Ca | Na | Ca | Na | Ca | Na | Ca | Na |
| Ca++ Feed/Na+ Product Concentrations: | | | | | | | | | |
| Ca Feed (Conc) | (mg/mL) | 99.400 | 0.014 | 99.700 | 0.023 | 101.000 | 0.041 | 101.000 | 0.036 |
| Ca Feed | (mg/mL) | 65.700 | 0.067 | 67.800 | 0.085 | 68.600 | 2.070 | 62.000 | 8.270 |
| Na Product | (mg/mL) | 0.290 | 87.300 | 2.440 | 84.700 | 3.730 | 87.100 | 4.170 | 86.100 |
| Ca Wash ER | (mg/mL) | 1.093 | 0.061 | 1.150 | 0.026 | 3.000 | 0.065 | 2.740 | 0.171 |

TABLE 15-continued

Pilot Plant Run #33 Operation on CaCl2 Surrogate Feed

| | | Run 33 | | | | | | | |
|---|---|---|---|---|---|---|---|---|---|
| | | 22-Aug | | 23-Aug | | 24-Aug | | 25-Aug | |
| | | Time | | | | | | | |
| | | 8:30 hrs | | 8:30 hrs | | 8:30 hrs | | 6:30 hrs | |
| | | Species: | | | | | | | |
| | Units | Ca | Na | Ca | Na | Ca | Na | Ca | Na |
| Ca Feed (Conc) | (meq/mL) | 4.969 | 0.001 | 4.984 | 0.001 | 5.049 | 0.002 | 5.049 | 0.002 |
| Ca Feed | (meq/mL) | 3.284 | 0.003 | 3.389 | 0.004 | 3.429 | 0.090 | 3.099 | 0.360 |
| Na Product | (meq/mL) | 0.014 | 3.797 | 0.122 | 3.684 | 0.186 | 3.789 | 0.208 | 3.745 |
| Ca Wash ER | (meq/mL) | 0.055 | 0.003 | 0.057 | 0.001 | 0.150 | 0.003 | 0.137 | 0.007 |
| | | Na+ Feed/Ca++ Product Concentrations: | | | | | | | |
| Na Feed (Conc) | (mg/mL) | 0.003 | 121.000 | 0.002 | 125.000 | 0.002 | 123.000 | 0.002 | 125.000 |
| Na Feed | (mg/mL) | 0.020 | 78.800 | 3.820 | 78.900 | 5.400 | 82.500 | 5.400 | 78.600 |
| Ca Product | (mg/mL) | 62.000 | 26.200 | 68.800 | 12.900 | 75.800 | 12.100 | 76.600 | 12.100 |
| Na Wash ER | (mg/mL) | 0.002 | 2.780 | 0.012 | 2.880 | 0.037 | 5.130 | 0.039 | 5.290 |
| Na Feed (Conc) | (meq/mL) | 0.000 | 5.263 | 0.000 | 5.437 | 0.000 | 5.350 | 0.000 | 5.437 |
| Na Feed | (meq/mL) | 0.001 | 3.428 | 0.191 | 3.432 | 0.270 | 3.589 | 0.270 | 3.419 |
| Ca Product | (meq/mL) | 3.099 | 1.140 | 3.439 | 0.561 | 3.789 | 0.526 | 3.829 | 0.526 |
| Na Wash ER | (meq/mL) | 0.000 | 0.121 | 0.001 | 0.125 | 0.002 | 0.223 | 0.002 | 0.230 |
| | | Liquid & Resin Rates: | | | | | | | |
| Step Time | (sec) | 2700 | | Calcium Rinse Rate | | 0.0367183 | | 0.0482144 | |
| Ca++ Soln. Feed Flow Rate | (ml/min) | 15.19 | | 15.06 | | 14.53 | | 14.58 | |
| Ca ResinRinse Flow Rate | (ml/min) | 12.58 | | 13.04 | | 13.25 | | 13.23 | |
| ER Flow Rate | (ml/min) | 6.29 | | 6.56 | | 7.13 | | 7.03 | |
| Na Effluent Rate | (ml/min) | 15.09 | | 14.95 | | 14.4 | | 14.68 | |
| Na Product Rate | (ml/min) | 8.8 | | 8.39 | | 7.27 | | 7.65 | |
| NaCl Feed Brine Flow Rate | (ml/min) | 14.74 | | 14.92 | | 15 | | 14.99 | |
| Na ResinRinse Flow Rate | (ml/min) | 10.88 | | 12.96 | | 12.88 | | 12.92 | |
| ER Flow Rate | (ml/min) | 6.49 | | 6.83 | | 7.49 | | 7.26 | |
| Ca Effluent Rate | (ml/min) | 14.76 | | 15.04 | | 15.21 | | 15.11 | |
| Ca Product Rate | (ml/min) | 8.27 | | 8.21 | | 7.72 | | 7.85 | |
| Conc Calcium Feed Rate | (meq/min) | 75.48 | 0.01 | 75.06 | 0.02 | 73.36 | 0.03 | 73.61 | 0.02 |
| Calcium Rinse Rate | (meq/min) | 41.32 | 0.04 | 44.20 | 0.05 | 45.44 | 1.19 | 41.00 | 4.76 |
| Na Prod Effl Rate | (meq/min) | 0.22 | 57.30 | 1.82 | 55.08 | 2.69 | 54.56 | 3.06 | 54.98 |
| Na Product Rate | (meq/min) | 0.13 | 33.42 | 1.02 | 30.91 | 1.36 | 27.54 | 1.59 | 28.65 |
| ER Out | (meq/min) | 0.34 | 0.02 | 0.38 | 0.01 | 1.07 | 0.02 | 0.96 | 0.05 |
| Na ProductPurity | | $Ca^{++}$ | 99.6% | $Ca^{++}$ | 96.8% | $Ca^{++}$ | 95.3% | $Ca^{++}$ | |
| | | Na+ Feed/Ca+ Product Molar Flows | | | | | | | |
| Conc. Sodium Feed Rate | (meq/min) | 0.00 | 77.58 | 0.00 | 81.13 | 0.00 | 80.26 | 0.00 | 81.51 |
| Sodium Rinse Return | (meq/min) | 0.01 | 37.29 | 2.47 | 44.48 | 3.48 | 46.22 | 3.49 | 44.17 |
| Ca Prod Effl Rate | (meq/min) | 45.75 | 16.82 | 51.73 | 8.44 | 57.63 | 8.01 | 57.86 | 7.95 |
| Ca Product Rate | (meq/min) | 25.63 | 9.43 | 28.24 | 4.61 | 29.25 | 4.06 | 30.06 | 4.13 |
| ER Out | (meq/min) | 0.00 | 0.78 | 0.00 | 0.86 | 0.01 | 1.67 | 0.01 | 1.67 |
| Ca ProductPurity | (meq/min) | $Na^+$ | 73.1% | $Na^+$ | 86.0% | $Na^+$ | 87.8% | $Na^+$ | 87.9% |
| Resin Rate | (meq/min) | 27.49 | | 27.49 | | 27.49 | | 27.49 | |
| Calcium/Sodium Loaded | (meq/min) | 34.03 | 30.85 | 29.83 | 32.03 | 26.55 | 29.95 | 31.00 | 33.15 |
| CaCl2/NaCl Unloaded | (meq/min) | 25.98 | 34.23 | 31.09 | 31.80 | 33.80 | 30.38 | 34.51 | 35.06 |
| | | 25.98 | 34.20 | 28.61 | 31.77 | 30.32 | 29.22 | 31.02 | 30.32 |
| Activity Ca/Na on Loading | (meq/mL) | 2.60 | 2.36 | 2.28 | 2.45 | 2.03 | 2.29 | 2.37 | 2.53 |
| Activity Ca/Na on Un-Load | (meq/mL) | 1.99 | 2.61 | 2.37 | 2.43 | 2.58 | 2.32 | 2.64 | 2.68 |

TABLE 16

Pilot Plant Run Ca(CN)2 Run #2 Operation on CaCl2 Surrogate Feed

| | | Ca(CN)2 Run #2 | | | | | | | | | |
|---|---|---|---|---|---|---|---|---|---|---|---|
| | | 30-Apr | | 30-Apr | | 30-Apr | | 1-May | | 1-May | |
| | | | | | | Time | | | | | |
| | | 1:40 hrs | | 6:30 hrs | | 16:30 hrs | | 2:25 hrs | | 12:30 hrs | |
| | | | | | | Species: | | | | | |
| | Units | Ca | Na | Ca | Na | Ca | Na | Ca | Na | Ca | Na |
| | | Ca++ Feed/Na+ Product Concentrations: | | | | | | | | | |
| Ca Feed (Conc) | (mg/mL) | 62.900 | 0.161 | 67.200 | 0.160 | 64.200 | 0.162 | 73.300 | 0.050 | 75.000 | 0.055 |
| Ca Feed | (mg/mL) | 53.900 | 0.148 | 60.900 | 0.159 | 56.900 | 1.160 | 60.700 | 1.300 | 71.200 | 0.244 |
| Na Product | (mg/mL) | 2.440 | 39.400 | 2.200 | 46.700 | 4.360 | 44.400 | 6.710 | 48.700 | 6.130 | 47.900 |
| Ca Wash ER | (mg/mL) | 0.737 | 0.381 | 0.657 | 0.765 | 0.889 | 0.779 | 1.100 | 0.910 | 0.935 | 0.573 |
| Ca Feed (Conc) | (meq/mL) | 3.144 | 0.007 | 3.359 | 0.007 | 3.209 | 0.007 | 3.664 | 0.002 | 3.749 | 0.002 |
| Ca Feed | (meq/mL) | 2.694 | 0.006 | 3.044 | 0.007 | 2.844 | 0.050 | 3.034 | 0.057 | 3.559 | 0.011 |
| Na Product | (meq/mL) | 0.122 | 1.714 | 0.110 | 2.031 | 0.218 | 1.931 | 0.335 | 2.118 | 0.306 | 2.084 |
| Ca Wash ER | (meq/mL) | 0.037 | 0.017 | 0.033 | 0.033 | 0.044 | 0.034 | 0.055 | 0.040 | 0.047 | 0.025 |
| | | Na+ Feed/Ca++ Product Concentrations: | | | | | | | | | |
| Na Feed (Conc) | (mg/mL) | 0.001 | 121.000 | 0.002 | 126.000 | — | 125.000 | — | 117.000 | 0.006 | 127.000 |
| Na Feed | (mg/mL) | 1.380 | 94.000 | 2.790 | 97.200 | 4.510 | 87.400 | 5.480 | 110.000 | 5.600 | 73.000 |
| Ca Product | (mg/mL) | 36.100 | 21.200 | 49.700 | 7.540 | 49.800 | 9.370 | 47.800 | 12.500 | 56.900 | 11.400 |
| Na Wash ER | (mg/mL) | 0.302 | 1.350 | 0.122 | 1.450 | 0.320 | 1.730 | 0.430 | 2.230 | 0.317 | 1.440 |
| Na Feed (Conc) | (meq/mL) | 0.000 | 5.263 | 0.000 | 5.481 | — | 5.437 | — | 5.089 | 0.000 | 5.524 |
| Na Feed | (meq/mL) | 0.069 | 4.089 | 0.139 | 4.228 | 0.225 | 3.802 | 0.274 | 4.785 | 0.280 | 3.175 |
| Ca Product | (meq/mL) | 1.805 | 0.922 | 2.485 | 0.328 | 2.490 | 0.408 | 2.390 | 0.544 | 2.844 | 0.496 |
| Na Wash ER | (meq/mL) | 0.015 | 0.059 | 0.006 | 0.063 | 0.016 | 0.075 | 0.021 | 0.097 | 0.016 | 0.063 |
| | | Liquid & Resin Rates: | | | | | | | | | |
| Step Time | (sec) | 1200 | | 1200 | | 1200 | | 1200 | | 1200 | |
| Ca++ Soln. Feed Flow Rate | (ml/min) | 20 | | 20 | | 20 | | 20 | | 20 | |
| Ca ResinRinse Flow Rate | (ml/min) | 25 | | 25 | | 25 | | 24 | | 24 | |
| ER Flow Rate | (ml/min) | 12 | | 12 | | 12 | | 13 | | 13 | |
| Na Effluent Rate | (ml/min) | 45 | | 45 | | 45 | | 44 | | 44 | |
| Na Product Rate | (ml/min) | 33 | | 33 | | 33 | | 31 | | 31 | |
| NaCl Feed Brine Flow Rate | (ml/min) | 13 | | 13 | | 13 | | 14 | | 14 | |
| Na ResinRinse Flow Rate | (ml/min) | 25 | | 25 | | 25 | | 24 | | 23 | |
| ER Flow Rate | (ml/min) | 12 | | 12 | | 12 | | 13 | | 13 | |
| Ca Effluent Rate | (ml/min) | 38 | | 38 | | 38 | | 38 | | 37 | |
| Ca Product Rate | (ml/min) | 26 | | 26 | | 26 | | 25 | | 24 | |
| Conc Calcium Feed Rate | (meq/min) | 62.89 | 0.14 | 67.19 | 0.14 | 64.19 | 0.14 | 73.29 | 0.04 | 74.99 | 0.05 |
| Calcium Rinse Rate | (meq/min) | 121.25 | 0.29 | 137.00 | 0.31 | 128.00 | 2.27 | 133.51 | 2.49 | 156.61 | 0.47 |
| Na Prod Effl Rate | (meq/min) | 5.49 | 77.12 | 4.95 | 91.41 | 9.81 | 86.91 | 14.76 | 93.21 | 13.48 | 91.68 |
| Na Product Rate | (meq/min) | 4.03 | 56.56 | 3.63 | 67.04 | 7.19 | 63.73 | 10.40 | 65.67 | 9.50 | 64.59 |
| ER Out | (meq/min) | 0.44 | 0.20 | 0.39 | 0.40 | 0.53 | 0.41 | 0.71 | 0.51 | 0.61 | 0.32 |
| Na ProductPurity | (meq/min) | $Ca^{++}$ | 93.4% | $Ca^{++}$ | 94.9% | $Ca^{++}$ | 89.9% | $Ca^{++}$ | 86.3% | $Ca^{++}$ | 87.2% |
| | | Na+ Feed/Ca+ Product Molar Flows | | | | | | | | | |
| Conc. Sodium Feed Rate | (meq/min) | 0.00 | 68.42 | 0.00 | 71.25 | — | 70.69 | — | 71.25 | 0.00 | 77.34 |
| Sodium Rinse Return | (meq/min) | 2.62 | 155.38 | 5.30 | 160.67 | 8.57 | 144.47 | 10.41 | 181.83 | 10.36 | 117.49 |
| Ca Prod Effl Rate | (meq/min) | 68.58 | 35.04 | 94.41 | 12.46 | 94.60 | 15.49 | 90.80 | 20.66 | 105.24 | 18.35 |
| Ca Product Rate | (meq/min) | 46.92 | 23.98 | 64.60 | 8.53 | 64.73 | 10.60 | 59.74 | 13.59 | 68.27 | 11.90 |
| ER Out | (meq/min) | 0.18 | 0.70 | 0.07 | 0.76 | 0.19 | 0.90 | 0.28 | 1.26 | 0.21 | 0.81 |
| Ca ProductPurity | (meq/min) | $Na^+$ | 66.2% | $Na^+$ | 88.3% | $Na^+$ | 85.9% | $Na^+$ | 81.5% | $Na^+$ | 85.2% |
| Resin Rate | (meq/min) | 62.06 | | 62.06 | | 62.06 | | 62.06 | | 62.06 | |
| Calcium/Sodium Loaded | (meq/min) | 58.68 | 44.25 | 63.48 | 62.32 | 56.80 | 59.68 | 62.61 | 57.14 | 65.28 | 65.12 |
| CaCl2/NaCl Unloaded | (meq/min) | 47.36 | 57.12 | 64.99 | 67.65 | 65.26 | 64.50 | 60.45 | 66.89 | 68.87 | 65.36 |
| Activity Ca/Na on Loading | (meq/mL) | 2.13 | 1.60 | 2.30 | 2.26 | 2.06 | 2.16 | 2.27 | 2.07 | 2.37 | 2.36 |
| Activity Ca/Na on Un-Load | (meq/mL) | 1.72 | 2.07 | 2.36 | 2.45 | 2.37 | 2.34 | 2.19 | 2.43 | 2.50 | 2.37 |

TABLE 17

Pilot Plant Run Ca(CN)2 Run #6 Operation on CaCl2 Surrogate Feed

| | | Ca(CN)2 Run #6 | | | | | | | |
|---|---|---|---|---|---|---|---|---|---|
| | | 31-Aug | | 31-Aug | | 1-Sep | | 2-Sep | |
| | | Time | | | | | | | |
| | | 7:15 hrs | | 15:00 hrs | | 11:00 hrs | | 11:00 hrs | |
| | | Species: | | | | | | | |
| | Units | Ca | Na | Ca | Na | Ca | Na | Ca | Na |
| Ca++ Feed/Na+ Product Concentrations: | | | | | | | | | |
| Ca Feed (Conc) | (mg/mL) | 83.800 | 0.105 | 87.100 | 0.124 | 85.900 | 0.133 | 85.800 | 0.421 |
| Ca Feed | (mg/mL) | 57.600 | 0.558 | 47.900 | 0.733 | 53.000 | 1.800 | 49.400 | 2.090 |
| Na Product | (mg/mL) | 3.010 | 72.400 | 4.000 | 72.700 | 5.010 | 76.200 | 5.190 | 74.500 |
| Ca Wash ER | (mg/mL) | 2.920 | 0.014 | 0.866 | 0.006 | 1.580 | 0.011 | 1.560 | 0.036 |
| Ca Feed (Conc) | (meq/mL) | 4.189 | 0.005 | 4.354 | 0.005 | 4.294 | 0.006 | 4.289 | 0.018 |
| Ca Feed | (meq/mL) | 2.879 | 0.024 | 2.395 | 0.032 | 2.649 | 0.078 | 2.470 | 0.091 |
| Na Product | (meq/mL) | 0.150 | 3.149 | 0.200 | 3.162 | 0.250 | 3.315 | 0.259 | 3.241 |
| Ca Wash ER | (meq/mL) | 0.146 | 0.001 | 0.043 | 0.000 | 0.079 | 0.000 | 0.078 | 0.002 |
| Na+ Feed/Ca++ Product Concentrations: | | | | | | | | | |
| Na Feed (Conc) | (mg/mL) | 0.002 | 122.000 | 0.001 | 123.000 | 0.002 | 117.000 | 0.001 | 122.000 |
| Na Feed | (mg/mL) | 4.620 | 81.700 | 5.130 | 68.900 | 6.330 | 70.900 | 6.290 | 72.800 |
| Ca Product | (mg/mL) | 55.200 | 1.690 | 71.300 | 0.854 | 77.400 | 4.900 | 69.000 | 7.190 |
| Na Wash ER | (mg/mL) | 0.022 | 1.860 | 0.011 | 2.390 | 0.038 | 5.090 | 0.029 | 3.690 |
| Na Feed (Conc) | (meq/mL) | 0.000 | 5.307 | 0.000 | 5.350 | 0.000 | 5.089 | 0.000 | 5.307 |
| Na Feed | (meq/mL) | 0.231 | 3.554 | 0.256 | 2.997 | 0.316 | 3.084 | 0.314 | 3.167 |
| Ca Product | (meq/mL) | 2.759 | 0.074 | 3.564 | 0.037 | 3.869 | 0.213 | 3.449 | 0.313 |
| Na Wash ER | (meq/mL) | 0.001 | 0.081 | 0.001 | 0.104 | 0.002 | 0.221 | 0.001 | 0.161 |
| Liquid & Resin Rates: | | | | | | | | | |
| Step Time | (sec) | 2700 | | 2700 | | 2700 | | 2700 | |
| Ca++ Soln. Feed Flow Rate | (ml/min) | 16.09 | | 16.24 | | 15.82 | | 17.17 | |
| Ca ResinRinse Flow Rate | (ml/min) | 12.03 | | 13.61 | | 14.49 | | 12.87 | |
| ER Flow Rate | (ml/min) | 6.69 | | 5.87 | | 6.05 | | 6.08 | |
| Na Effluent Rate | (ml/min) | 17.16 | | 16.11 | | 14.84 | | 14.11 | |
| Na Product Rate | (ml/min) | 10.47 | | 10.24 | | 8.79 | | 8.03 | |
| NaCl Feed Brine Flow Rate | (ml/min) | 14.99 | | 14.7 | | 14.74 | | 14.8 | |
| Na ResinRinse Flow Rate | (ml/min) | 10.8 | | 13.39 | | 11.93 | | 12.45 | |
| ER Flow Rate | (ml/min) | 5.87 | | 6.36 | | 7.55 | | 6.65 | |
| Ca Effluent Rate | (ml/min) | 14.17 | | 15.18 | | 16.03 | | 9.59 | |
| Ca Product Rate | (ml/min) | 8.3 | | 8.82 | | 8.48 | | 8.48 | |
| Conc Calcium Feed Rate | (meq/min) | 67.40 | 0.07 | 70.71 | 0.09 | 67.93 | 0.09 | 73.64 | 0.31 |
| Calcium Rinse Rate | (meq/min) | 34.64 | 0.29 | 32.59 | 0.43 | 38.39 | 1.13 | 31.78 | 1.17 |
| Na Prod Effl Rate | (meq/min) | 2.58 | 54.04 | 3.22 | 50.95 | 3.72 | 49.19 | 3.66 | 45.73 |
| Na Product Rate | (meq/min) | 1.58 | 32.97 | 2.05 | 32.38 | 2.20 | 29.14 | 2.08 | 26.02 |
| ER Out | (meq/min) | 0.98 | 0.00 | 0.25 | 0.00 | 0.48 | 0.00 | 0.47 | 0.01 |
| Na ProductPurity | (meq/min) | $Ca^{++}$ | 95.4% | $Ca^{++}$ | 94.1% | $Ca^{++}$ | 93.0% | $Ca^{++}$ | 92.6% |
| Na+ Feed/Ca+ Product Molar Flows | | | | | | | | | |
| Conc. Sodium Feed Rate | (meq/min) | 0.00 | 79.55 | 0.00 | 78.65 | 0.00 | 75.02 | 0.00 | 78.54 |
| Sodium Rinse Return | (meq/min) | 2.49 | 38.38 | 3.43 | 40.13 | 3.78 | 36.79 | 3.91 | 39.43 |
| Ca Prod Effl Rate | (meq/min) | 39.10 | 1.04 | 54.11 | 0.56 | 62.02 | 3.42 | 33.08 | 3.00 |
| Ca Product Rate | (meq/min) | 22.90 | 0.61 | 31.44 | 0.33 | 32.81 | 1.81 | 29.25 | 2.65 |
| ER Out | (meq/min) | 0.01 | 0.47 | 0.00 | 0.66 | 0.01 | 1.67 | 0.01 | 1.07 |
| Ca ProductPurity | (meq/min) | $Na^+$ | 97.4% | $Na^+$ | 99.0% | $Na^+$ | 94.8% | $Na^+$ | 91.7% |
| Resin Rate | (meq/min) | 28.80 | | 28.80 | | 28.80 | | 28.80 | |
| Calcium/Sodium Loaded | (meq/min) | 31.18 | 40.55 | 36.07 | 38.19 | 27.33 | 36.41 | 39.77 | 36.45 |
| CaCl2/NaCl Unloaded | (meq/min) | 26.37 | 33.67 | 35.12 | 33.39 | 37.06 | 31.85 | 33.64 | 27.95 |
| | | 23.88 | 33.45 | 31.69 | 33.04 | 33.29 | 30.81 | 29.72 | 27.09 |
| Activity Ca/Na on Loading | (meq/mL) | 2.38 | 3.10 | 2.76 | 2.92 | 2.09 | 2.78 | 3.04 | 2.78 |
| Activity Ca/Na on Un-Load | (meq/mL) | 2.01 | 2.57 | 2.68 | 2.55 | 2.83 | 2.43 | 2.57 | 2.13 |

REFERENCES

U.S. Pat. Nos. 6,649,136; 4,732,609; 4,895,659; 4,321,145; 4,357,143; 5,254,153; 4,267,159; 2,533,593; 5,078,977; 4,708,804; 3,847,765; 7,459,088; WO00/36185.

INCORPORATION BY REFERENCE

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups, including any equivalently performing compounds, isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds and devices are intended to be exemplary, as it is known that one of ordinary skill in the art can name the same compounds or devices differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, synthetic methods, temperatures and concentrations other than those specifically exemplified can be employed in the practice of the invention without resort to undue experimentation. All art-known functional equivalents, of any such methods, device elements, starting materials, synthetic methods, temperatures and concentration are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended exemplary claims and description herein.

In general the terms and phrases used herein have their art-recognized meaning, which can be found by reference to standard texts, journal references and contexts known to those skilled in the art. The following definitions are provided to clarify their specific use in the context of the invention.

One skilled in the art readily appreciates that the present invention is well adapted to carry out the objects and obtain the ends and advantages mentioned, as well as those inherent in the present invention. The methods, components, materials and dimensions described herein as currently representative of preferred embodiments are provided as examples and are not intended as limitations on the scope of the invention. Changes therein and other uses which are encompassed within the spirit of the invention will occur to those skilled in the art, are included within the scope of the claims and the description herein.

Although the description herein contains certain specific information and examples, these should not be construed as limiting the scope of the invention, but as merely providing illustrations of some of the embodiments of the invention. Thus, additional embodiments are within the scope of the invention and within the exemplary claims.

We claim:

1. A method of cation exchange comprising:
contacting a divalent cation-feed solution with a strong acid cation ion exchange resin having a crosslinking of between 4 and 15% divinylbenzene (DVB) that has been initially loaded with a univalent charged counter ion, wherein the strong acid cation ion exchange resin has been loaded to greater than 90% of the resin capacity with the univalent charged counter ion, and wherein the univalent-loaded ion exchange resin has an initial ionic equivalent composition, the divalent cation-feed solution has a specified ionic equivalent composition, and the resin has a specified activity such that a separation coefficient K' defined by the ion exchange reaction of divalent ion with univalent-loaded ion exchange resin is greater than or equal to 1.0;

exchanging the divalent cation with the univalent charged counter ion on the resin to produce a univalent counter ion-product solution and a divalent cation loaded resin, wherein the univalent counter ion-product solution has an ionic equivalent composition that is substantially the same as the initial ionic equivalent composition of the initial univalent-loaded ion exchange resin, and wherein before the last exchanging step, the divalent cation loaded resin is at least 90% divalent-ion form;

advancing the divalent cation loaded resin counter currently with respect to solution flow through a rinse zone wherein unreacted divalent cation-feed solution is recovered;

advancing the divalent cation loaded resin to a regeneration zone where the divalent cation loaded resin is contacted with a solution having a univalent exchangeable cation, wherein the divalent cation loaded resin has an initial ionic equivalent composition, the solution having a univalent exchangeable cation has a specified ionic equivalent composition, and the resin has a specified activity such that the separation coefficient, K', is less than or equal to 1.0, where K' is defined by the ion exchange reaction of divalent ion with univalent-loaded ion exchange resin, wherein the resin with capacity Q, in gram-equivalents-per-kg, resin bulk density $\rho_r$, in kg-per-liter, resin mass action equilibrium constant K for the ion exchange equilibrium defined by absorption of the divalent ion on univalent-form ion exchange resin; and the total normality $C_0$, in gram-equivalents-per-liter, of all cations in the divalent cation feed solution or the total solution normality of all cations in the univalent cation feed solution are given by:

$$K' = K\frac{Q\rho_r}{C_0} \quad (Eq.\ 1)$$

where K' is:

$$K' = \frac{\left(1 - \frac{C_{Ca}}{C_0}\right)^2 \left(\frac{q_{Ca}}{Q}\right)}{\left(\frac{C_{Ca}}{C_0}\right)\left(1 - \frac{q_{Ca}}{Q}\right)^2} \quad (Eq.\ 2)$$

wherein $C_{ca}$, in gram-equivalents-per-liter, is the solution normality of the divalent cation and $q_{Ca}$, in gram-equivalents-per-kg, is the concentration of divalent species in the resin phase;

exchanging the divalent cation on the divalent cation loaded resin with the univalent exchangeable cation, producing a resin loaded with the univalent cation and a divalent cation product solution, wherein the divalent cation product solution has an ionic equivalent composition that is substantially the same as the initial ionic equivalent composition of the divalent cation loaded resin.

2. The method of claim 1, wherein the strong acid cation ion exchange resin has been loaded to 100% of the resin capacity with the univalent charged counter ion.

3. The method of claim 1, wherein the strong acid cation ion exchange resin has been loaded to greater than 98% of the resin capacity with the univalent charged counter ion.

4. The method of claim 1, wherein the value of K' in univalent ion loading onto divalent-form resin is greater than 0.85.

5. The method of claim 1, wherein the value of K' in univalent ion loading onto divalent-form resin is less than 1.2.

6. The method of claim 1 wherein the resin activity has a value that is within 10 percent of a calculated ideal value.

7. The method of claim 1, wherein before the last exchanging step, the divalent cation loaded resin is at least 99% divalent-ion form.

8. The method of claim 1, wherein the resin activity $(A_r = Q\rho_r)$, is matched with the solution having a univalent exchangeable cation total normality $C_0$, to provide the predetermined value of K' as given in Equation 1.

9. The method of claim 1, wherein
K'≥1.0 when exchanging divalent ions onto the resin and
K'≤1.0 when exchanging univalent ions onto the resin.

10. The method of claim 1 wherein K' is minimized when exchanging univalent ions onto divalent-loaded resin by maximizing the concentration of the univalent ions in the feed solution.

11. The method of claim 1, wherein the resin activity $(A_r = Q\rho_r)$ is provided by:

$$Q = \frac{K'C_0}{K\rho_r}\text{(gram-equivalents/kg), or equivalently} \quad (Eq.\ 3)$$

$$A_r = \frac{K'C_0}{K}\text{(gram-equivalents/L)} \quad (Eq.\ 4)$$

where K' is set to unity and K and $\rho_r$ (in kg-per-liter) are known, and $C_0$ (in gram-equivalents-per-liter) is set by the desired feed conditions.

12. The method of claim 1, wherein shrinkage of the resin when placed in brine is not greater than 8% as compared after the rinse zone and after the regeneration zone.

13. The method of claim 1, wherein the divalent cation feed solution is a cyanide solution where the concentration of the cyanide solution is 4-6.5 gram-equivalents per liter solution.

14. The method of claim 1, wherein the resin is sulfonated polystyrene and has a divinylbenzene crosslinking of between 10 and 14%.

15. The method of claim 1, wherein the resin is a gel resin.

16. The method of claim 1, wherein the resin has a divinylbenzene crosslinking of between 8 and 12% and a volume change of 6-8% when immersed in concentrated brine as compared after the rinse zone and after the regeneration zone.

17. The method of claim 1, wherein the resin has a divinylbenzene crosslinking of 12%±4%.

18. The method of claim 1, wherein the resin is contained in a fixed volume column and the resin has a divinylbenzene crosslinking greater than 10%.

19. The method of claim 1, wherein the resin is contained in a variable volume resin vessels that contracts the contained resin volume upon shrinkage of the resin, and expands the contained resin volume upon swelling of the resin.

20. The method of claim 1, wherein the feed solution is heated to above 25 degrees C. and less than 120 degrees C.

21. The method of claim 1, wherein the divalent cation in the divalent cation feed solution is calcium.

22. The method of claim 1, wherein the univalent exchangeable cation in the solution having a univalent exchangeable cation is selected from sodium or potassium.

23. The method of claim 1, wherein average bead diameter of the resin is less than 1200 microns.

24. The method of claim 1, wherein average bead diameter of the resin is less than 750 microns.

25. The method of claim 1 wherein the divalent ion solution feed ion exchange with univalent-form resin is considered dilute, where K'>>1.0 and the univalent ion solution feed ion exchange with divalent-form resin is operated where K' is within 10% of the ideal value as calculated by Equations 3 or 4.

26. The method of claim 1, wherein the resin activity $(A_r = Q\rho_r)$ is less than 2.4 gram-equivalents per liter.

27. The method of claim 26, wherein the resin activity is matched with the divalent cation-feed solution having a total normality $C_0$ to provide the predetermined value of K' as given in Equation 1 that is greater than or equal to 1.0.

28. The method of claim 1, wherein the univalent cation feed solution is saturated or nearly saturated.

29. The method of claim 28, wherein the solution having a univalent exchangeable cation is saturated sodium chloride.

30. The method of claim 1, wherein average bead diameter of the resin is less than 650 microns.

31. The method of claim 30, wherein average bead diameter of the resin is 325+/−25 microns.

* * * * *